US012486214B2

(12) United States Patent
Jon et al.

(10) Patent No.: US 12,486,214 B2
(45) Date of Patent: Dec. 2, 2025

(54) ROSMARINIC ACID DERIVATIVE, ROSMARINIC ACID-DERIVED PARTICLES, COMPOSITION CONTAINING SAME FOR TREATING INFLAMMATORY DISEASE

(71) Applicant: KOREA ADVANCED INSTITUTE OF SCIENCE AND TECHNOLOGY, Daejeon (KR)

(72) Inventors: Sang Yong Jon, Daejeon (KR); Chan Ho Chung, Sejong (KR); Wonsik Jung, Daejeon (KR); Afia Tasnim Rahman, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1119 days.

(21) Appl. No.: 17/417,486

(22) PCT Filed: Apr. 6, 2021

(86) PCT No.: PCT/KR2021/004302
§ 371 (c)(1),
(2) Date: Jun. 23, 2021

(87) PCT Pub. No.: WO2021/206428
PCT Pub. Date: Oct. 14, 2021

(65) Prior Publication Data
US 2021/0395181 A1 Dec. 23, 2021

(30) Foreign Application Priority Data
Apr. 6, 2020 (KR) ........................ 10-2020-0041792

(51) Int. Cl.
| | | |
|---|---|---|
| A61P 29/00 | (2006.01) | |
| A61K 9/00 | (2006.01) | |
| C07C 59/52 | (2006.01) | |
| A61K 9/14 | (2006.01) | |
| A61K 9/16 | (2006.01) | |
| A61K 31/216 | (2006.01) | |
| A61K 47/12 | (2006.01) | |
| A61K 47/60 | (2017.01) | |
| A61K 47/61 | (2017.01) | |
| A61K 47/69 | (2017.01) | |
| C07C 69/157 | (2006.01) | |
| C07C 69/732 | (2006.01) | |
| C08B 37/08 | (2006.01) | |
| C08L 5/08 | (2006.01) | |

(52) U.S. Cl.
CPC .............. C07C 59/52 (2013.01); A61P 29/00 (2018.01); A61K 9/0019 (2013.01)

(58) Field of Classification Search
CPC ..... C07C 59/52; C07C 69/732; C07C 69/157; A61P 29/00; A61K 9/0019; A61K 9/145; A61K 9/1617; A61K 47/60; A61K 47/61; A61K 31/216; A61K 47/6935; A61K 47/6939; A61K 47/12; C08B 37/003; C08B 37/0072; C08L 5/08
See application file for complete search history.

(56) References Cited

U.S. PATENT DOCUMENTS

| | | | | |
|---|---|---|---|---|
| 8,105,636 B2 * | 1/2012 | Wong | ................... | A61P 29/00 |
| | | | | 514/732 |
| 2010/0137433 A1 * | 6/2010 | Kott | ..................... | A61K 36/534 |
| | | | | 426/77 |

FOREIGN PATENT DOCUMENTS

| | | |
|---|---|---|
| CN | 1923803 A | 3/2007 |
| EP | 2535087 A2 | 12/2012 |
| KR | 10-2000-0072988 A | 12/2000 |
| KR | 10-2005-0078743 A | 8/2005 |
| KR | 10-2010-0087099 A | 8/2010 |
| KR | 10-1743399 B1 | 6/2017 |

OTHER PUBLICATIONS

Placha D, Jampilek J. Chronic Inflammatory Diseases, Anti-Inflammatory Agents and Their Delivery Nanosystems. Pharmaceutics. Jan. 6, 2021;13(1):64. doi: 10.3390/pharmaceutics13010064. PMID: 33419176; PMCID: PMC7825503. (Year: 2021).*
Luo C, Zou L, Sun H, Peng J, Gao C, Bao L, Ji R, Jin Y, Sun S. A Review of the Anti-Inflammatory Effects of Rosmarinic Acid on Inflammatory Diseases. Front Pharmacol. Feb. 28, 2020;11:153. doi: 10.3389/fphar.2020.00153. PMID: 32184728; PMCID: PMC7059186. (Year: 2020).*
D'souza AA, Shegokar R. Polyethylene glycol (PEG): a versatile polymer for pharmaceutical applications. Expert Opin Drug Deliv. Sep. 2016;13(9):1257-75. doi: 10.1080/17425247.2016.1182485. Epub May 17, 2016. PMID: 27116988. (Year: 2016).*
Buckley C, Murphy EJ, Montgomery TR, Major I. Hyaluronic Acid: A Review of the Drug Delivery Capabilities of This Naturally Occurring Polysaccharide. Polymers (Basel). Aug. 23, 2022;14(17):3442. doi: 10.3390/polym14173442. PMID: 36080515; PMCID: PMC9460006. (Year: 2022).*
Zheng W, Sun C, Bai B. Molecular Dynamics Study on the Effect of Surface Hydroxyl Groups on Three-Phase Wettability in Oil-Water-Graphite Systems. Polymers (Basel). Aug. 18, 2017;9(8):370. doi: 10.3390/polym9080370. PMID: 30971049; PMCID: PMC6418591. (Year: 2017).*
Parisi, O. I., et al.; "Safety and Efficacy of Dextran-Rosmarinic Acid Conjugates as Innovative Polymeric Antioxidants in Skin Whitening: What Is the Evidence?" Cosmetics, 2017, 4, 28, pp. 1-15.
Office Action from corresponding Korean Patent Application No. 10-2021-0044880, dated Sep. 22, 2023.

(Continued)

Primary Examiner — Bruck Kifle
Assistant Examiner — Kevin S Martin
(74) Attorney, Agent, or Firm — Harness, Dickey & Pierce, P.L.C.

(57) ABSTRACT

The present disclosure relates to a rosmarinic acid derivative, rosmarinic acid-derived particles, and a composition containing same for treating an inflammatory disease. The use of the rosmarinic acid derivative and rosmarinic acid-derived particles of the present disclosure enables the utilization of rosmarinic acid, which has been restricted in the utilization thereof due to low water solubility and low bioavailability, for a medicinal purpose.

2 Claims, 62 Drawing Sheets

(56) References Cited

OTHER PUBLICATIONS

Adomako-Bonsu, A. G. et al., Antioxidant activity of rosmarinic acid and its principal metabolites in chemical and cellular systems: Importance of physico-chemical characteristics. Toxicol In Vitro 2017, 40, 248-255.
Zhu, F. et al., Rosmarinic acid extract for antioxidant, antiallergic, and alpha-glucosidase inhibitory activities, isolated by supramolecular technique and solvent extraction from Perilla leaves. J Agric Food Chem 2014, 62 (4), 885-92.
International Search Report from corresponding PCT Patent Application No. PCT/KR2021/004302, issued on Jul. 27, 2021.
Li, Puwang et al. Self-assembled nano-vesicles based on mPEG-NH2 modified carboxymethyl chitosan-graft-eleostearic acid conjugates for delivery of spinosad for Helicoverpa armigera. Reactive and Functional Polymers. 2020, vol. 146, pp. 104438(published online on Nov. 27, 2019).

\* cited by examiner

ROSMARINIC ACID DERIVATIVE, ROSMARINIC ACID-DERIVED PARTICLES, COMPOSITION CONTAINING SAME FOR TREATING INFLAMMATORY DISEASE

CROSS-REFERENCE TO RELATED APPLICATIONS

This application is a national phase application of PCT Application No. PCT/KR2021/004302 filed on Apr. 6, 2021, which claims the benefit of and priority to Korean Patent Application No. 10-2020-0041792 filed on Apr. 6, 2020. The entire disclosures of the applications identified in this paragraph are incorporated herein by references.

TECHNICAL FIELD

The present disclosure was made with the support of the Ministry of Science and ICT, Republic of Korea, under project identification No. 171108210, project No. 2018M3A9B5023527, which was conducted in the research project named "(EZBARO) Development of Tumor Microenvironment Targeting and Sensitive Drug Delivery Platform Technology (2019)" in the research program titled "Source Technology Development Program", by the Korea Advanced Institute of Science and Technology, under management of the National Research Foundation of Korea, from 1 Jan. 2019 to 31 Dec. 2019.

The present disclosure was also made with the support of the Ministry of Science and ICT, Republic of Korea, under project identification No. 1711088059, project No. 2018R1A3B1052661, which was conducted in the research project named "(EZBARO) Development of Tumor Microenvironment Targeting and Sensitive Precision Bio-Nanomedicine Research Center (2019)" in the research program titled "Basic Research Project in Field of Science and Engineering", by the Korea Advanced Institute of Science and Technology, under management of the National Research Foundation of Korea, from 1 Mar. 2019 to 29 Feb. 2020.

The present disclosure relates to a rosmarinic acid derivative, rosmarinic acid-derived particles, and a composition containing the same for treating an inflammatory disease.

BACKGROUND ART

Rosmarinic acid (RA), which is an active ingredient found in many plants including rosemary, is one of the most important polyphenolic antioxidants. In fact, enormous efforts have been made to demonstrate the potential of RA as a therapeutic agent for treating various diseases. RA has been demonstrated to have antiinflammatory, anticancer and antimicrobial actions due to an antioxidative and immunomodulatory ability thereof. Despite such a high potential, RA faces problems of poor water solubility and low bioavailability that causes a bad influence on other biologically active compounds with small molecules, and has a restriction on its clinical potential.

PRIOR ART DOCUMENTS

Non-Patent Documents

Adomako-Bonsu, A. G. et al., Antioxidant activity of rosmarinic acid and its principal metabolites in chemical and cellular systems: Importance of physico-chemical characteristics. Toxicol In Vitro 2017, 40, 248-255.

Zhu, F. et al., Rosmarinic acid extract for antioxidant, antiallergic, and alpha-glucosidase inhibitory activities, isolated by supramolecular technique and solvent extraction from Perilla leaves. J Agric Food Chem 2014, 62 (4), 885-92.

SUMMARY

Technical Problem

The present inventors conducted intensive research to develop a method for solving low water-solubility and low bioavailability of rosmarinic acid and using such a rosmarinic acid for various purposes. As a result, the present inventors prepared a compound obtained by modifying rosmarinic acid with a hydrophilic modifier, and verified that this compound is self-assembled in an aqueous system to form particles and that these particles have an antiinflammatory effect and an antioxidative effect and have a potential as a drug carrier, and therefore completed the present disclosure.

Accordingly, an aspect of the present disclosure is to provide a rosmarinic acid derivative represented by the following chemical formula:

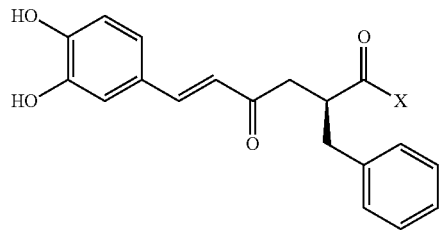

Another aspect of the present disclosure is to provide microparticles containing the rosmarinic acid derivative.

Still another aspect of the present disclosure is to provide a drug delivery composition containing the microparticles.

Still another aspect of the present disclosure is to provide an antiinflammatory pharmaceutical composition containing the microparticles as an active ingredient.

Still another aspect of the present disclosure is to provide a method for preparing the rosmarinic acid derivative.

Still another aspect of the present disclosure is to provide a method for manufacturing the microparticles.

Technical Solution

In accordance with an aspect of the present invention, there is provided a rosmarinic acid derivative represented by the following chemical formula:

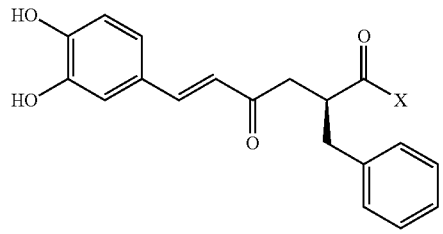

wherein —X is a hydrophilic group and is derived from H—X (H is hydrogen), a hydrophilic modifier.

In an embodiment of the present disclosure, the hydrophilic modifier H—X covalently binds to a carboxyl group (—COOH) of rosmarinic acid to form a rosmarinic acid derivative containing the hydrophilic group —X.

In another embodiment of the present disclosure, the hydrophilic modifier H—X is H—(Y—Z); —Y— is a linkage group capable of covalently binding to a carboxyl group (—COOH) of rosmarinic acid and also covalently binding to —Z; —Z is derived from an H—Z compound (H is hydrogen), and binds to the carboxyl group of rosmarinic acid through the linkage group —Y— to form a rosmarinic acid derivative containing the hydrophilic group —(Y—Z); and the H—Z compound is selected from the group consisting of dextran, carbodextran, dextrin, heparin, heparan sulfate, chitosan, chitin, chondroitin sulfate, dermatan sulfate, keratan sulfate, collagen, gelatin, acacia gum, fibrin, hyaluronic acid, pectin, agarose, galactomannan, xanthan gum, carboxymethylcellulose, carboxyethylcellulose, hydroxymethylcellulose, hydroxyethylcellulose, regenerated cellulose, maltodextrin, alginic acid, polysaccharides, cyclodextran, pluronics, cellulose, starch, glycogen, carbohydrates, monosaccharides, disaccharides, oligosaccharides, amino acids, polypeptides, polyphosphazene, polymaleic acid, polymaleic acid derivatives, polyalkylcyanoacrylates, polyhydroxybutylate, polycarbonates, polyorthoesters, polyethyleneglycol (PEG), methoxy polyethyleneglycol (m PEG), polypropylene glycol, polyethylenimine, poly-L-lysine, polyglycolide, polymetacrylate, polyvinylpyrrolidone, poly(acrylates), poly(acrylamide), poly(vinylester), poly(vinyl alcohol), polyoxides, polyelectrolytes, poly(N-vinyl pyrrolidone), poly(vinyl amine), poly(beta-hydroxyethylmethacrylate), polyethyleneoxide, poly(ethylene oxide-b-propyleneoxide), and polylysine, but is not limited thereto.

In an embodiment of the present disclosure, the linkage group —Y— may be a linkage group that is linked to at least one —Z—, as a repeating unit, which is derived from the above-described hydrophilic modifier H—Z compound.

In an embodiment of the present disclosure, the linkage group —Y— may be a linkage group that binds to at least one type, as a repeating unit, selected from the group consisting of polyethylene glycol (PEG), polyacrylic acid (PAA), polyacrylonitrile (PAN), polyethylene oxide (PEO), polyvinyl acetate (PVAc), polyvinyl alcohol (PVA), or derivatives thereof, but is not limited thereto.

In still another embodiment of the present disclosure, the hydrophilic modifier H—X is selected from the group consisting of dextran, carbodextran, dextrin, heparin, heparan sulfate, hyaluronic acid, chitosan, chitin, chondroitin sulfate, dermatan sulfate, keratan sulfate, collagen, gelatin, acacia gum, fibrin, pectin, agarose, galactomannan, xanthan gum, carboxymethylcellulose, carboxyethylcellulose, hydroxymethylcellulose, hydroxyethylcellulose, regenerated cellulose, maltodextrin, alginic acid, polysaccharides, cyclodextran, pluronics, cellulose, starch, glycogen, carbohydrates, monosaccharides, disaccharides, oligosaccharides, amino acids, polypeptides, polyphosphazene, polymaleic acid, polymaleic acid derivatives, polyalkylcyanoacrylates, polyhydroxybutylate, polycarbonates, polyorthoesters, polyethyleneglycol (PEG), methoxy polyethyleneglycol (mPEG), polypropylene glycol, polyethylenimine, poly-L-lysine, polyglycolide, polymetacrylate, polyvinylpyrrolidone, poly(acrylates), poly(acrylamide), poly(vinylester), poly(vinyl alcohol), polyoxides, polyelectrolytes, poly(N-vinyl pyrrolidone), poly(vinyl amine), poly(beta-hydroxyethylmethacrylate), polyethyleneoxide, poly(ethylene oxide-b-propyleneoxide), and polylysine, but is not limited thereto.

In an embodiment of the present disclosure, the H—Z compound or hydrophilic modifier H—X, constituting the hydrophilic modifier useable in the present disclosure, is collagen, chitosan, gelatin, acacia gum, dextran, fibrin, hyaluronic acid, pectin, agarose, galactomannan, xanthan gum, and alginate.

In an embodiment of the present disclosure, the chitosan is hydrophilic or low molecular weight chitosan. The hydrophilic or low molecular weight chitosan is prepared by fine fractionation of chitooligosaccharide.

In an embodiment of the present disclosure, the hydrophilic or low molecular weight chitosan may have a molecular weight of 3 kDa to 30 kDa, and more specifically, 3 kDa to 25 kDa, 3 kDa to 20 kDa, 3 kDa to 15 kDa, 3 kDa to 10 kDa, 5 kDa to 30 kDa, 5 kDa to 25 kDa, 5 kDa to 20 kDa, 5 kDa to 15 kDa, or 5 kDa to 10 kDa, but is not limited thereto. The molecular weight may be a number average molecular weight. The molecular weight includes not only integers between the above numerical ranges, but also numerical values corresponding to all decimal units.

In an embodiment of the present disclosure, the hyaluronic acid may have a molecular weight of 1 to 300 kDa, 1 to 250 kDa, 1 to 200 kDa, 1 to 150 kDa, 1 to 125 kDa, 1 to 100 kDa, 1 to 75 kDa, 1 to 50 kDa, 1 to 30 kDa, 30 to 300 kDa, 30 to 250 kDa, 30 to 200 kDa, 30 to 150 kDa, 30 to 125 kDa, 30 to 100 kDa, 30 to 75 kDa, 30 to 50 kDa, 50 to 300 kDa, 50 to 250 kDa, 50 to 200 kDa, 50 to 150 kDa, 50 to 125 kDa, 50 to 100 kDa, 50 to 75 kDa, 75 to 300 kDa, 75 to 250 kDa, 75 to 200 kDa, 75 to 150 kDa, 75 to 125 kDa, 75 to 100 kDa, 100 to 300 kDa, 100 to 250 kDa, 100 to 200 kDa, 100 to 150 kDa, 100 to 125 kDa, 125 to 300 kDa, 125 to 250 kDa, 125 to 200 kDa, 125 to 150 kDa, 150 to 300 kDa, 150 to 250 kDa, 150 to 200 kDa, 200 to 300 kDa, 200 to 250 kDa, 1 kDa, 10 kDa, 20 kDa, 30 kDa, 50 kDa, 75 kDa, 100 kDa, 150 kDa, 200 kDa, 250 kDa, or 300 kDa, but is not limited thereto. The molecular weight may be a number average molecular weight. The molecular weight includes not only integers between the above numerical ranges, but also numerical values corresponding to all decimal units.

In another embodiment of the present disclosure, the H—Z compound constituting the hydrophilic modifier usable in the present disclosure or the hydrophilic modifier H—X is a polypeptide composed of two or more (e.g., 2 to 50) amino acids. The amino acids encompass natural amino acids as well as non-natural amino acids. Examples of the hydrophilic amino acids are glutamine, aspartic acid, glutamic acid, threonine, asparagine, arginine, serine, and the like, and examples of the hydrophobic amino acids are phenylalanine, tryptophan, isoleucine, leucine, proline, methionine, valine, alanine, and the like. Examples of the non-coded hydrophilic amino acid may be Cit, hCys, and the like. A person skilled in the art can easily synthesize the hydrophilic peptides on the basis of such information and peptide synthesis techniques, and thus can use the hydrophilic peptides in the manufacturing of a rosmarinic acid-derived microparticles of the present disclosure.

In addition, the range of the hydrophilic polymer encompasses not only the above-mentioned polymers but also derivatives thereof.

In an embodiment of the present disclosure, the hydrophilic polymer is polyethylene glycol or a derivative thereof.

Examples of the polyethylene glycol derivative may include methoxy polyethylene glycol (PEG), succinimide of PEG propionic acid, succinimide of PEG butanoic acid, branched PEG-NHS, PEG succinimidyl succinate, succinimide of carboxymethylated PEG, benzotriazole carbonate of PEG, PEG-glycidyl ether, PEG-oxycarbonylim idazole, PEG nitrophenyl carbonates, PEG-aldehyde, PEG succinimidyl carboxymethyl ester, PEG succinimidyl ester, and the like.

In another embodiment of the present disclosure, the hydrophilic modifier is bound to a carboxyl group of rosmarinic acid to form an amphiphilic complex.

In an embodiment of the present disclosure, the rosmarinic acid derivative of the present disclosure may be prepared by a crosslinking reaction of rosmarinic acid and the hydrophilic modifier. The crosslinking reaction is conducted by a chemical crosslinker. Examples of the chemical crosslinker are 1-ethyl-3-(3-dimethylaminopropyl) carbodiimide hydrochloride (EDC), dicyclohexyl carbodiimide (DCC), N-hydroxysuccinimide (NHS), N-hydroxysulfosuccinimide (sulfo-NHS), imidoester-based crosslinkers, sulfo-succinimidyl 4-(N-maleimidomethyl)cyclohexane-1-carboxylate) (sulfo-SMCC), and the like, but are not limited thereto, and any chemical crosslinker that is commonly used in the field to which the present disclosure pertains can be used without limitation.

In another embodiment of the present disclosure, the rosmarinic acid or the hydrophilic modifier may have an amine group or may be modified to have an amine group.

In still another embodiment of the present disclosure, the hydrophilic modifier may have an amine group at a side chain or an end thereof, but is not limited thereto.

In an embodiment of the present disclosure, the weight ratio of rosmarinic acid and the hydrophilic modifier, which constitute the rosmarinic acid derivative, is 1:1 to 1:15, 1:1 to 1:10, 1:1 to 1:8, 1:1 to 1:7, 1:1 to 1:5, 1:1 to 1:4, 1:1 to 1:3, 1:1 to 1:2, 1:15, 1:10, 1:9, 1:8, 1:7, 1:6, 1:5, 1:4, 1:3, 1:2, or 1:1. The weight ratio includes not only integers between the above numerical ranges but also numerical values corresponding to all decimal units.

In accordance with another aspect of the present disclosure, there are provided microparticles containing the rosmarinic acid derivative.

The term "containing" means that the microparticles may be composed of only a rosmarinic acid derivative or the microparticles may be composed of the rosmarinic acid derivative as well as an additional material.

In an embodiment of the present disclosure, the microparticles containing the rosmarinic acid derivative, which are microparticles that are formed by self-assembly of the rosmarinic acid derivative, may be microparticles formed by self-assembly in an aqueous system.

In the rosmarinic acid derivative constituting the microparticles of the present disclosure, the hydrophilic modifier constitutes a hydrophilic moiety and the rosmarinic acid constitutes a hydrophobic moiety. The hydrophilic moiety means a hydrophilic polymer or small molecule, and the hydrophobic moiety means a hydrophobic polymer or small molecule. In the microparticles formed by self-assembly of a plurality of rosmarinic acid derivative molecules of the present disclosure, the rosmarinic acid constituting the hydrophobic moieties forms a micelle structure having a hydrophobic core, and chitosan constituting the hydrophilic moieties is oriented outside the core.

In an embodiment of the present disclosure, the microparticles containing the rosmarinic acid derivative may have a particle size of 10 to 5,000 nm, more specifically, 10 to 4,000 nm, 10 to 3,000 nm, 10 to 2,000 nm, 10 to 1,000 nm, 10 to 800 nm, 10 to 600 nm, 10 to 500 nm, 10 to 400 nm, 10 to 350 nm, 10 to 300 nm, 10 to 250 nm, 10 to 220 nm, 10 to 200 nm, 10 to 150 nm, 10 to 140 nm, 10 to 130 nm, 10 to 120 nm, 10 to 110 nm; 20 to 350 nm, 20 to 220 nm, 20 to 200 nm, 20 to 150 nm, 20 to 140 nm, 20 to 130 nm, 20 to 120 nm, 20 to 110 nm; 30 to 350 nm, 30 to 220 nm, 30 to 200 nm, 30 to 150 nm, 30 to 140 nm, 30 to 130 nm, 30 to 120 nm, 30 to 110 nm; 40 to 350 nm, 40 to 220 nm, 40 to 200 nm, 40 to 150 nm, 40 to 140 nm, 40 to 130 nm, 40 to 120 nm, 40 to 110 nm; 50 to 350 nm, 50 to 220 nm, 50 to 200 nm, 50 to 150 nm, 50 to 140 nm, 50 to 130 nm, 50 to 120 nm, 50 to 110 nm; 100 to 350 nm, 100 to 220 nm, 100 to 200 nm, 100 to 150 nm, 100 to 140 nm, 100 to 130 nm, 100 to 120 nm, or 100 to 110 nm, but is not limited thereto.

In an embodiment of the present disclosure, the size of the microparticles is a hydrodynamic diameter as measured by dynamic light scattering (DLS).

In accordance with another aspect of the present disclosure, there is provided a drug delivery composition containing the microparticles.

In an embodiment of the present disclosure, the microparticles containing the rosmarinic acid derivative of the present disclosure may encapsulate a cargo therein. When the cargo is a hydrophobic substance, the cargo may be encapsulated inside the nanoparticle, or may be integrated in a hydrophobic portion in the membrane constituting the microparticles of the present disclosure. Therefore, the term "encapsulation" as used herein is used in a broad concept encompassing the integration of cargo.

In one specific embodiment, the cargo is a drug. The drug encompasses all of hydrophilic drugs, hydrophobic drugs, chemical drugs, and bio-drugs. Examples of such drugs may be anticancer agents, antioxidants, antiinflammatory agents, painkillers, antiarthritic agents, sedatives, antidepressants, antipsychotics, tranquilizers, antianxiety agents, antiangiogenic inhibitors, immunosuppressants, antiviral agents, antibiotic agents, anorexigenic agent, antihistamines, hormone preparations, antithrombotic agents, diuretics, antihypertensive agents, cardiovascular therapeutic agents, vasodilators, and the like.

According to an embodiment of the present disclosure, the microparticles containing the rosmarinic acid derivative of the present disclosure can scavenge reactive oxygen species. As verified in the following examples, the microparticles of the present disclosure can scavenge reactive oxygen species and can be selectively accumulated in inflammatory tissues, and thus can be helpfully used to treat inflammation of the inflammatory tissues.

According to another embodiment of the present disclosure, the microparticles of the present disclosure are disassembled or disrupted while scavenging reactive oxygen species, upon contact with the reactive oxygen species, and thus the microparticles can release the encapsulated cargo to the periphery thereof.

In a particular example, when an antiinflammatory agent, such as dexamethasone, is encapsulated in the microparticles of the present disclosure, the microparticles of the present disclosure can be selectively accumulated in inflammatory tissues having an inflammatory response, and are disassembled or disrupted by a reaction with reactive oxygen species in an inflammatory site, thereby releasing an antiinflammatory agent into the inflammatory tissues, and thus can obtain a therapeutic effect on inflammatory diseases through the released antiinflammatory agent.

According to still another aspect of the present disclosure, there is provided a pharmaceutical composition for antiinflammation or inflammation relief, the composition containing: the rosmarinic acid derivative, microparticles containing the same, or a combination thereof; and a pharmaceutically acceptable carrier.

According to still another aspect of the present disclosure, there is provided a pharmaceutical composition for treating an inflammatory disease, the composition containing: the rosmarinic acid derivative, microparticles containing the same, or a combination thereof; and a pharmaceutically acceptable carrier.

In an embodiment of the present disclosure, the use for antiinflammation means a use for prevention and treatment of an inflammatory disease. Examples of the inflammatory disease includes inflammatory bowel disease (IBD), atopic dermatitis, edema, dermatitis, allergies, asthma, conjunctivitis, periodontitis, rhinitis, otitis media, atherosclerosis, pharyngolaryngitis, tonsillitis, pneumonia, gastric ulcers, gastritis, Crohn's disease, colitis, hemorrhoids, gout, ankylosing spondylitis, rheumatic fever, lupus, fibromyalgia, psoriatic arthritis, osteoarthritis, rheumatoid arthritis, periarthritis, tendinitis, tenosynovitis, myositis, hepatitis, cystitis, nephritis, Sjogren's syndrome, multiple sclerosis, and the like.

In an embodiment of the present disclosure, the use for antiinflammation means a use for prevention and treatment of a chronic inflammatory disease. Examples of the chronic inflammatory disease are non-alcoholic steatohepatitis, pneumonia, pulmonary fibrosis, nephritis, kidney failure, cystitis, Sjogren's syndrome, multiple sclerosis, asthma, atherosclerosis, myocardial infarction, pancreatitis, diabetes, psoriasis, osteoporosis, arthritis, osteoarthritis, rheumatoid arthritis, systemic inflammatory syndrome, sepsis, dementia, and the like. The chronic inflammatory disease may be caused due to a systemic inflammatory response, or cause an inflammatory response all over the body by the occurrence of the inflammatory disease. As used herein, the term "inflammatory bowel disease" refers to a disease in which inflammation occurs in the intestine, that is, the small intestine and the large intestine, and includes a disease in which abnormal chronic inflammation in the intestine repeats remission and recurrence. The inflammatory bowel disease includes specific enteritis with known causes, non-specific enteritis with unknown causes, and enteritis caused from other diseases, for example, intestinal Behcet's disease.

In one embodiment of the present disclosure, the inflammatory bowel disease is selected from the group consisting of ulcerative colitis, Crohn's disease, intestinal Behcet's disease, indeterminate colitis, bacterial enteritis, viral enteritis, amoebic enteritis, hemorrhagic rectal ulcer, leaky gut syndrome, ischemic colitis, and tuberculous enteritis, but is not limited thereto. More specifically, the inflammatory bow disease is ulcerative colitis or Crohn's disease.

In an embodiment of the present disclosure, the microparticles inhibit the myeloperoxidase (MPO) activity and inhibit the infiltration of neutrophils.

According to an embodiment of the present disclosure, the microparticles reduce the levels of inflammation-causing cytokines (TNF-alpha, IFN-gamma, IL-1beta, IL-6, and IL-12).

In an embodiment of the present disclosure, the microparticles of the present disclosure have superior ability to scavenge ROS, such as $H_2O_2$, AAPH, and NaOCl, and thus can be used as an antioxidative agent.

In an embodiment of the present disclosure, the microparticles of the present disclosure target and act on macrophages. More specifically, the particles of the present disclosure inhibit the expression and secretion of cytokines related to inflammation, such as IL-1 beta, IL-6, and TNF-alpha, in macrophages, and promote the expression and secretion of cytokines involved in the restoration of damaged tissues, such as TGF-beta and IL-10, and thus can be helpfully used as an antiinflammatory agent or an inflammation relieving agent.

In an embodiment of the present disclosure, the particles of the present disclosure exhibit an effect of normalizing the body weight loss by an inflammatory bowel disease.

In an embodiment of the present disclosure, the particles of the present disclosure exhibit an effect of lowering the disease activity index (DAI) by an inflammatory bowel disease.

In an embodiment of the present disclosure, the particles of the present disclosure exhibit an effect of normalizing the colon length reduction by an inflammatory bowel disease.

In an embodiment of the present disclosure, the particles of the present disclosure exhibit effects of increasing the mRNA expression levels of ZO-1, claudin-1, and occludin-1 genes, which are indicators of the intestinal damage by an inflammatory bowel disease, to be close to normal levels.

In an embodiment of the present disclosure, the particles of the present disclosure have an unpredictable effect, with respect to the microbiome distribution, of normalizing the microbiome distribution of the inflammatory bowel disease model mice to a microbiome distribution similar to that of normal mice.

According to an embodiment of the present disclosure, the rosmarinic acid derivative or microparticles containing the same, which correspond to an active ingredient of the pharmaceutical composition of the present disclosure, have effects of improving indicators showing systemic inflammation as well as inflammation in the intestine when administered orally, and thus can be helpfully used as a pharmaceutical composition for the prevention or treatment of systemic and chronic inflammatory diseases.

When the composition of the present disclosure is a pharmaceutical composition, the pharmaceutical composition contains a pharmaceutically acceptable carrier. The pharmaceutically acceptable carrier is commonly used at the time of formulation, and examples thereof may include, but are not limited to, lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methylcellulose, methyl hydroxybenzoate, propyl hydroxybenzoate, talc, magnesium stearate, mineral oil, and the like.

The pharmaceutical composition of the present disclosure may further contain, in addition to the above ingredients, a lubricant, a wetting agent, a sweetening agent, a flavoring agent, an emulsifier, a suspending agent, a preservative, and the like.

The pharmaceutical composition of the present disclosure can be used through parenteral administration, for example, intravenous administration, intraperitoneal administration, intramuscular administration, subcutaneous administration, or local administration. Furthermore, oral administration, rectal administration, inhalation administration, intranasal administration, or the like may be possible. In an embodiment of the present disclosure, the pharmaceutical composition is used for oral administration.

The appropriate dose of the pharmaceutical composition of the present disclosure varies depending on factors, such as formulation method, administration method, patient's age, body weight, sex, pathological condition, diet, administration time, administration route, excretion rate, and response sensitivity, and an ordinarily skilled practitioner can easily determine and prescribe a dose that is effective for desired treatment or prevention. According to a preferable embodiment of the present disclosure, the daily dose of the pharmaceutical composition of the present disclosure is 0.001-100 mg/kg.

The pharmaceutical composition of the present disclosure is formulated using a pharmaceutically acceptable carrier and/or excipient according to the method that is easily conducted by a person having ordinary skills in the art to which the present disclosure pertains, and the composition of the present disclosure may be prepared into a unit dosage form or may be inserted into a multi-dose container. The formulation may be a solution, a suspension, or an emulsion in oil or aqueous medium, and may further contain a dispersant or a stabilizer.

As used herein, the term "administration" refers to providing a predetermined substance for a subject in any appropriate manner. The administration route of the composition of the present disclosure may encompass all the general routes, and as described above, the composition may be administered orally or parenterally. In addition, the composition of the present disclosure may be administered using any apparatus that can deliver an active ingredient to target cells or tissues.

As used herein, the term "subject" refers to, but is not particularly limited to, for example, a human, monkey, cow, horse, sheep, pig, chicken, turkey, quail, cat, dog, mouse, rat, rabbit, or guinea pig, preferably a mammal, and more preferably a human.

As used herein, the term "prevention" refers to any action that can inhibit or delay the symptoms of an inflammatory disease through the administration of the composition according to the present disclosure.

As used herein, the term "treatment" refers to any action that can attain the remission or complete recovery of the symptoms of an inflammatory disease through the administration of the composition according to the present disclosure.

The pharmaceutical composition of the present disclosure contains a pharmaceutically effective amount of the particles of the present disclosure. The pharmaceutically effective amount refers to an amount that is sufficient for the particles to attain a pharmaceutical effect.

In addition, the pharmaceutical composition of the present disclosure may further contain an active ingredient that is known to have a treatment effect on an inflammatory bowel disease or a chronically inflammatory disease in the art. Examples thereof are steroids, such as glucocorticosteroid, 5-aminosalicylic acid (5-ASA) drugs, such as sulfasalazine and mesalazine, anti-TNF-α monoclonal antibodies, and the like.

In accordance with another aspect of the present disclosure, there is provided a food composition for inflammation relief, the food composition containing the rosmarinic acid derivative, microparticles, or a combination thereof.

In accordance with another aspect of the present disclosure, there is provided a food composition for antioxidation, the food composition containing the rosmarinic acid derivative, microparticles, or a combination thereof.

The food composition of the present disclosure may be prepared in the form of a powder, granules, a tablet, a capsule, a drink, or the like. Examples thereof are various foods, e.g., candies, drinks, chewing gums, teas, vitamin complexes, health supplement foods, and the like.

The food composition of the present disclosure may contain not only the rosmarinic acid derivative, microparticles, or a combination thereof, as an active ingredient, but also ingredients that are usually added in the manufacturing of food, for example, a protein, a carbohydrate, a fat, a nutrient, a seasoning agent, and a flavoring agent. Examples of the foregoing carbohydrate are: common sugars, such as monosaccharides (e.g., glucose and fructose), disaccharides (e.g., maltose, sucrose, and oligosaccharides), and polysaccharides (e.g., dextrin and cyclodextrin); and sugar alcohols, such as xylitol, sorbitol, and erythritol. As the flavoring agent, natural flavoring agents (thaumatin, stevia extracts (e.g., rebaudioside A, glycyrrhizin, etc.)) and synthetic flavoring agents (saccharin, aspartame, etc.) may be used. For example, when the food composition of the present disclosure is prepared into a drink, the drink may further contain citric acid, liquefied fructose, sugar, glucose, acetic acid, malic acid, fruit juice, an Eucommia ulmoides extract, a jujube extract, and a licorice extract, in addition to the rosmarinic acid derivative, microparticles, or a combination thereof of the present disclosure.

In accordance with still another aspect of the present disclosure, there is provided a feed composition for antioxidation or inflammation relief, the feed composition containing the rosmarinic acid derivative, microparticles, or a combination thereof.

Since the contents of the rosmarinic acid derivative, the particles, or a combination of thereof contained in the food composition and the feed composition is the same as the contents of the rosmarinic acid derivative, particles, or a combination thereof contained in the pharmaceutical composition, the description of the overlapping contents therebetween is omitted in order to avoid excessive complication of the present specification.

In accordance with an aspect of the present invention, there is provided a method for preparing a rosmarinic acid derivative, the method including:

(a) reacting rosmarinic acid with a carboxyl group activator to activate a carboxyl group; and (b) reacting the resultant product with a hydrophilic modifier.

In an embodiment of the present disclosure, the carboxyl group activator is 1-ehyl-3-(3-dimethylaminopropyl)carbodiimide (EDC), dcyclohexylcarbodiimide (DCC), or N,N'-disopropylcarbodiimide (DIC), but is not limited thereto.

In an embodiment of the present disclosure, N-hydroxysulfosuccinimide (Sulfo-NHS) may be added in the reaction in step (a).

In an embodiment of the present disclosure, the rosmarinic acid or the hydrophilic modifier may have an amine group or may be modified to have an amine group.

In an embodiment of the present disclosure, the hydrophilic modifier is polyethylene glycol, hyaluronic acid, or chitosan.

In an embodiment of the present disclosure, the hydrophilic modifier may be linked via at least one linker selected from the group consisting of polyethylene glycol (PEG), polyacrylic acid (PAA), polyacrylonitrile (PAN), polyethylene oxide (PEO), polyvinyl acetate (PVAc), and polyvinyl alcohol (PVA).

In an embodiment of the present disclosure, the reaction in step (b) may be an amide linkage reaction.

Since the method for preparing a rosmarinic acid derivative of the present disclosure corresponds to the foregoing method for preparing a rosmarinic acid derivative according to an aspect of the present disclosure, the overlapping contents therebetween, such as a hydrophilic modifier, are also applied to the method for preparing a rosmarinic acid derivative of the present disclosure in the same manner.

In accordance with an aspect of the present invention, there is provided a method for manufacturing microparticles containing a rosmarinic acid derivative, the method including:

(a) dissolving the foregoing rosmarinic acid derivative in an organic solvent;

(b) removing the organic solvent to form a film layer composed of the rosmarinic acid derivative; and (c) applying a hydrophilic solvent to the film layer to manufacture microparticles generated by self-assembly.

In an embodiment of the present disclosure, the organic solvent is selected from N-methyl-2-pyrrolidone (NMP), dimethylacetamide, dimethylformamide (DMF), ethanol, methanol, ethyl acetate (EA), diethyl ether, dichloromethane, chloroform, propyl acetate, methyl acetate, dichlorobenzene, dimethylbenzene, or a combination thereof, but is not limited thereto, and any organic solvent can be used without limitation as long as the rosmarinic acid derivative of the present disclosure can be dissolved in the organic solvent and a film layer can be obtained by volatilization of the organic solvent.

The preparation methods of the present disclosure have been described in detail in the drawings and examples of the present disclosure.

Advantageous Effects

The present disclosure relates to a rosmarinic acid derivative, rosmarinic acid-derived particles, and a composition containing the same for treating an inflammatory disease. The use of the rosmarinic acid derivative and rosmarinic acid-derived particles of the present disclosure enables the utilization of rosmarinic acid, which has been restricted on the utilization thereof due to low water solubility and low bioavailability, for a medicinal purpose.

CHO-K1 cells were treated with $H_2O_2$ (100 or 50 µM), $H_2O_2$ (100 or 50 µM) +RANPs (100, 10, or 1 µM) or only a culture medium (control) for 8 hours, and then incubated for additional 24 hours. The difference between the RANP-treated cells and the control was measured based on the intensity of color development in the WST-8 analysis results for each group.

Figure 9:
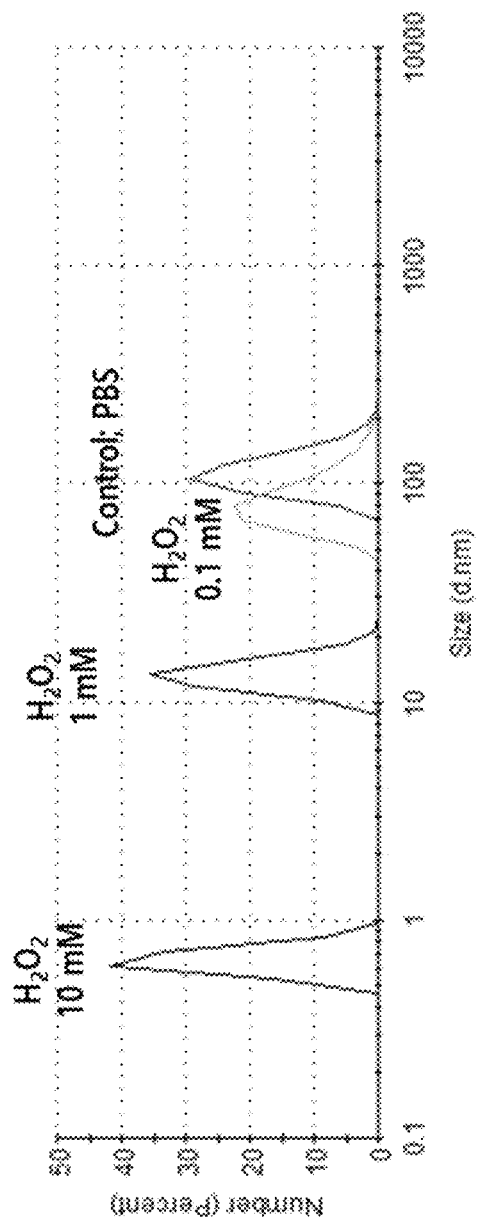

FIG. 9 shows changes in the size of RANPs induced by ROS ($H_2O_2$), as determined by DLS. RANPs were treated with $H_2O_2$ at different concentrations (0.1 to 10 mM) for 10 minutes, and the subsequent rapid destruction of the nanoparticles was confirmed by DLS measurements.

Figure 10:
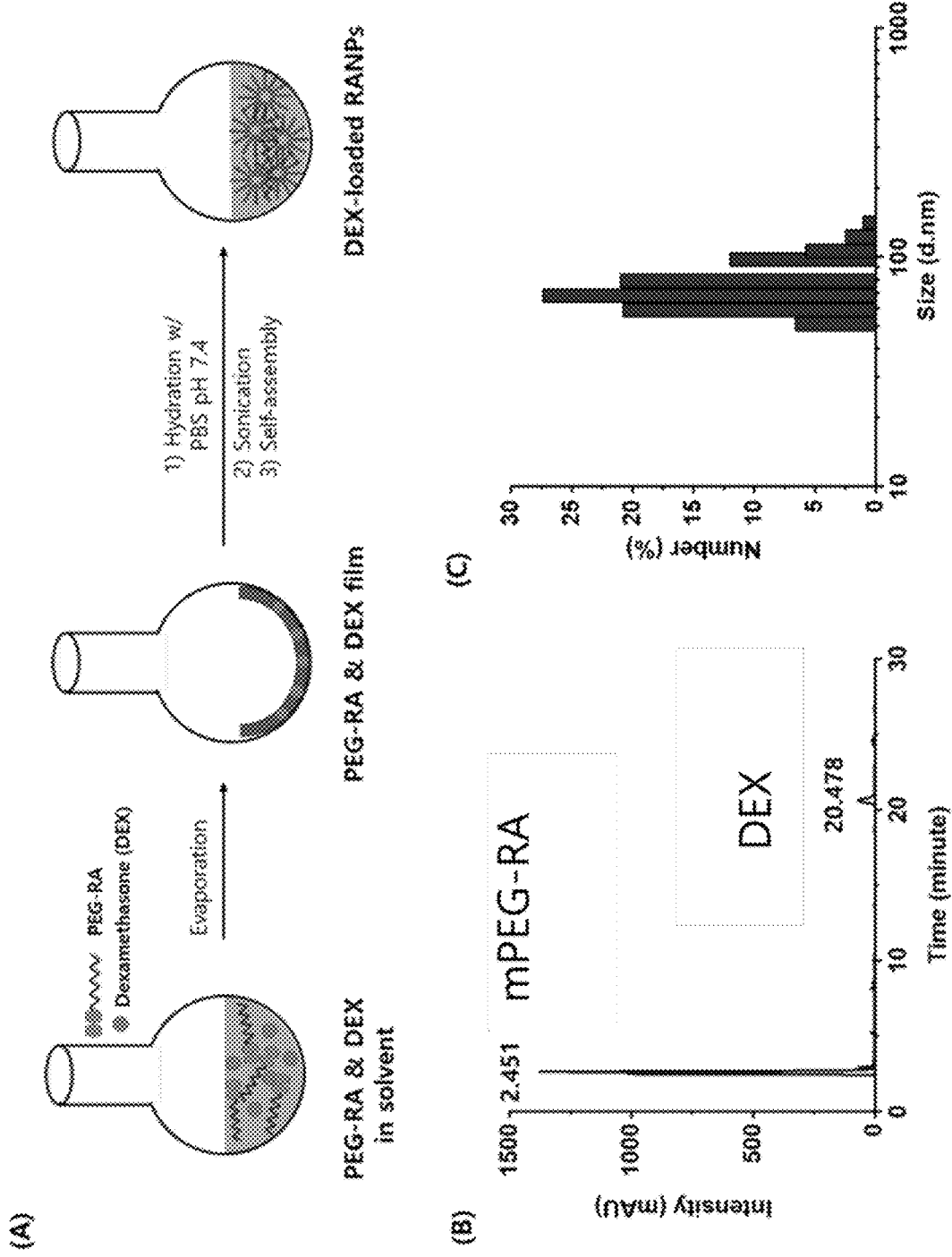

FIG. 10 is a schematic diagram of the preparation and characterization of DEX-loaded RANPs. (A) is a schematic diagram of the self-assembly of DEX-loaded RANPs in an aqueous solvent and the thin-film hydration method. PEG-RA film and DEX (1:10 mol %) were hydrated in PBS (pH 7.4). After sonication for 10 minutes, the unloaded free DEX was removed by gel filtration, and only the DEX-loaded RANPs were collected. Thereafter, the DEX encapsulated in RANPs was quantified by the release through treatment with 0.5% Triton-X and then the measurement of DEX concentration through HPLC analysis. (B) HPLC chromatograms obtained from DEX-loaded RANPs after treating with 0.5% Triton-X in ACN:10 mM PBS (pH 7.0) (30:70 v/v) (Retention times: PEG-RA, 4.21 minutes; DEX, 20.478 minutes). (C) Size distribution of RANPs, determined by measuring hydrodynamic diameter using DLS. Particle size distribution ranged from 40 to 120 nm, and averaged ~60 nm.

Figure 11:
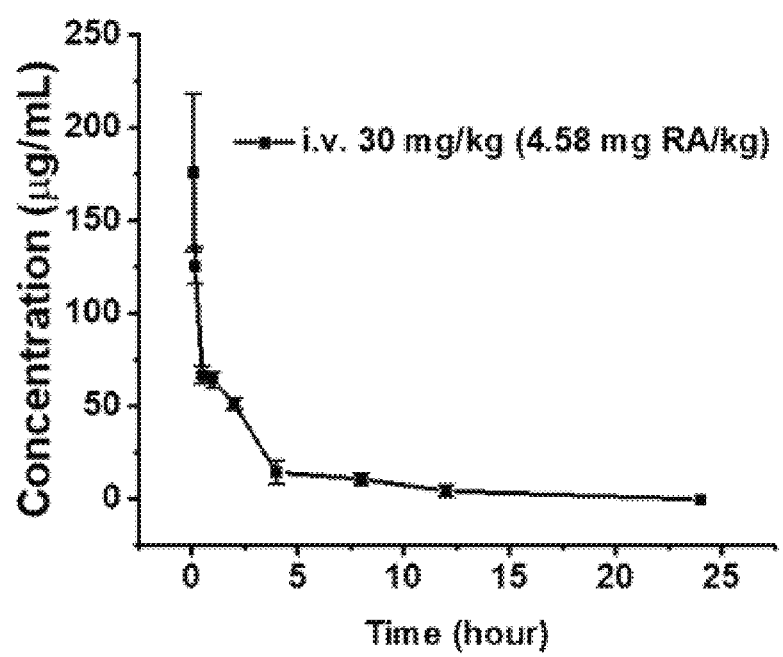

FIG. 11 shows pharmacokinetics of RANPs after I.V. administration, and shows a mean plasma concentration-time curve. Blood samples from each mouse were collected 0, 0.083, 0.167, 0.25, 0.5, 1, 2, 4, 8, 12 and 16 hours after intravenous administration of single doses (30-mg/kg).

Figure 12:
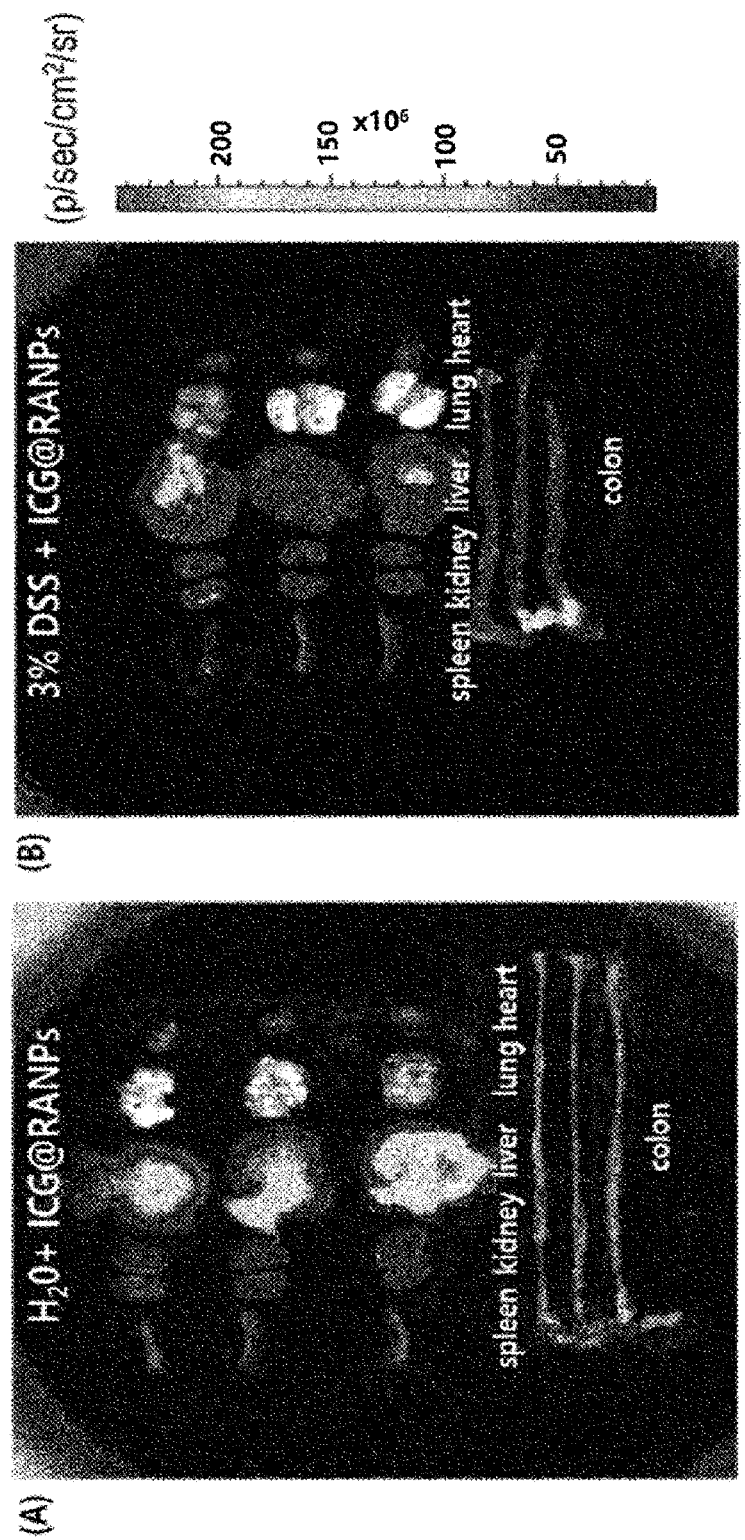

FIG. 12 shows the bio-distribution of ICG-loaded RANPs in healthy mice and 3% DSS-induced colitis mice. Bio-distribution images of major organs (spleen, kidney, liver, lung, heart, and colon) harvested from (A) the normal healthy mouse and (B) the IBD model mouse treated with ICG-loaded RANPs (ICG @ RANP; 1.55 mg ICG; 20 mg PEG-RA), five hours after administration. ICG-loaded RANPs showed a significant accumulation in IBD mouse colonic tissues.

Figure 13:
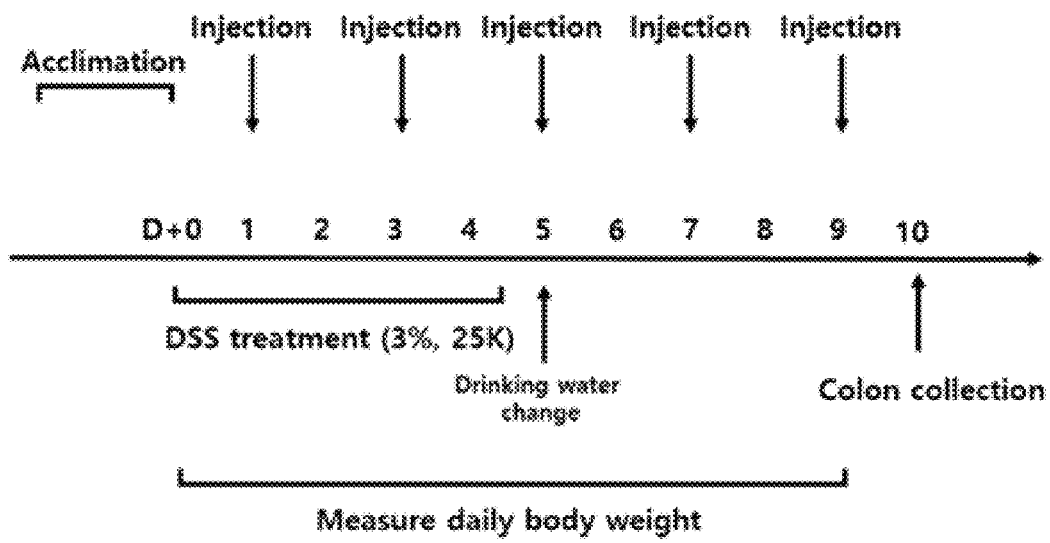
Figure 14:
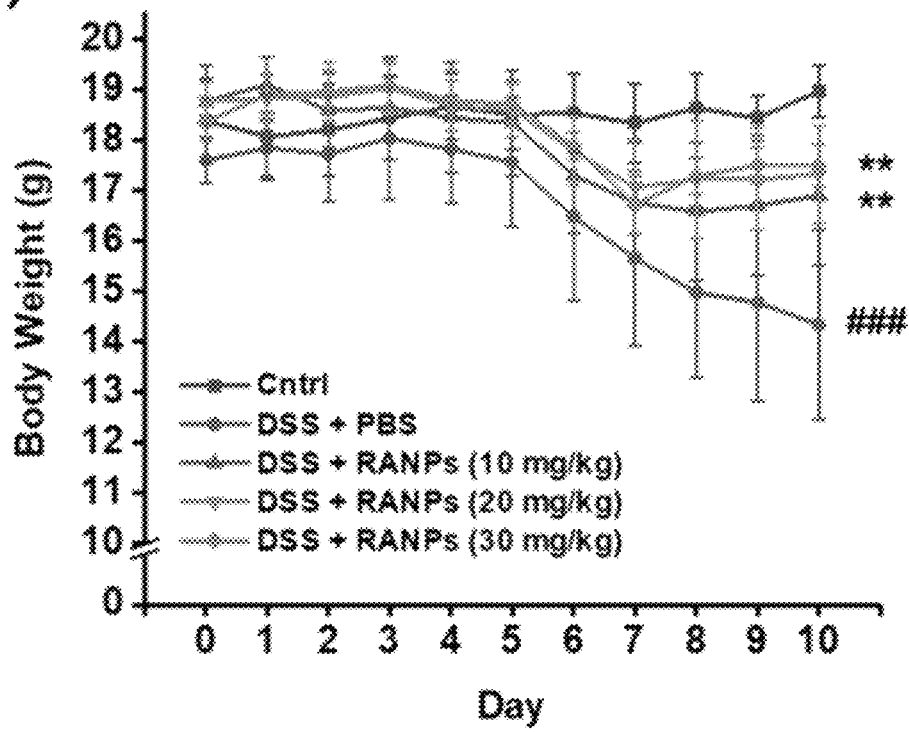
Figure 15:
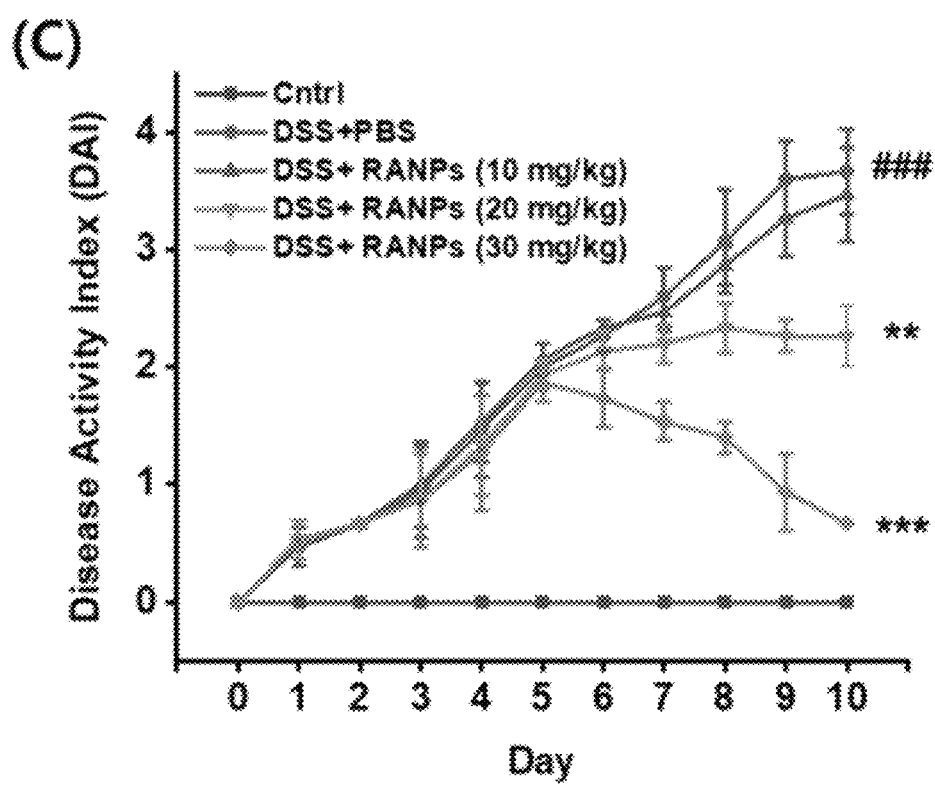
Figure 16:
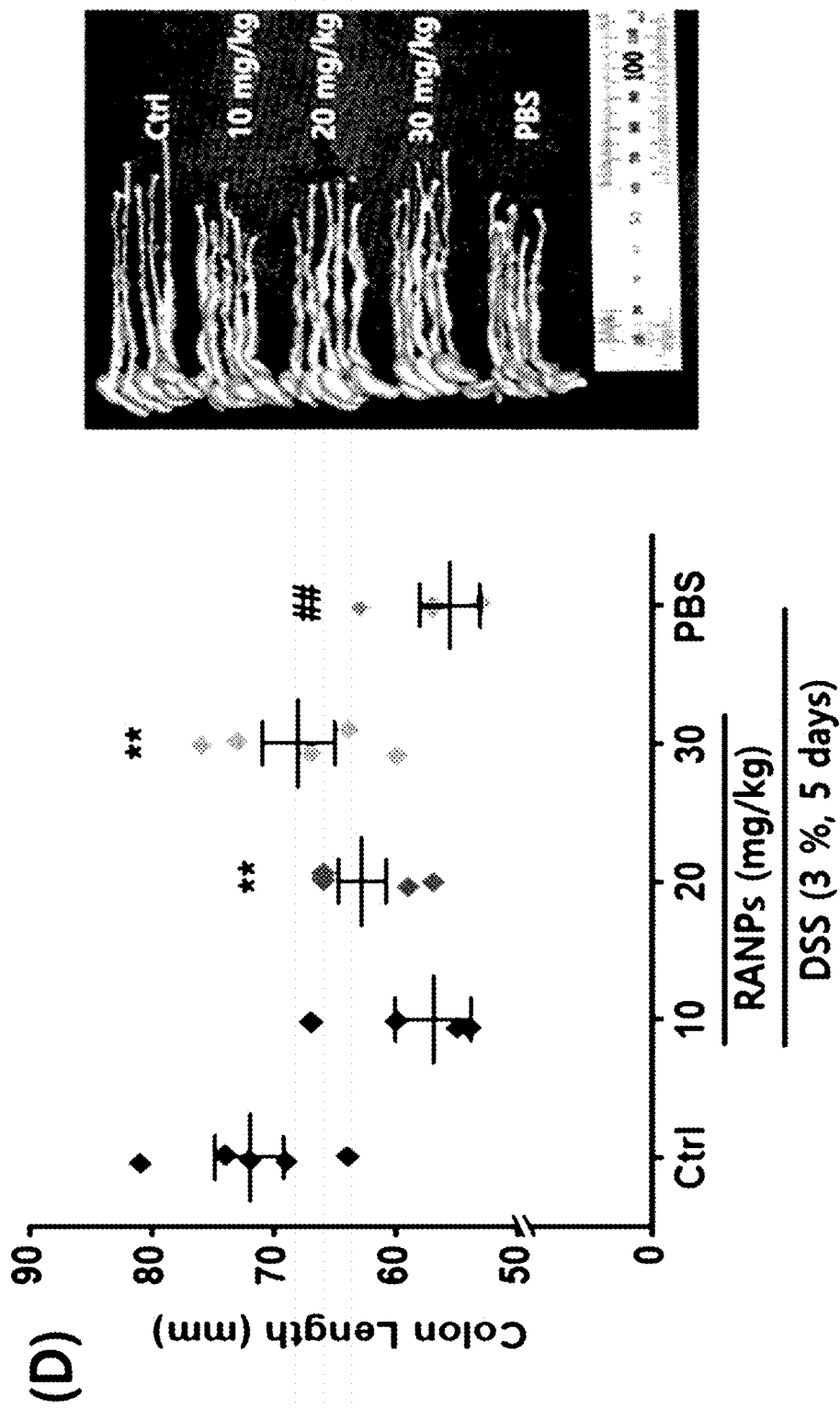

FIGS. 13, 14, 15 and 16 show the overall experimental design for RANP treatment of DSS-damaged mice and the results therefrom. Mice were provided with regular drinking water ($H_2O_2O$) or water containing 3% DSS ad libitum for 5 days. Mice were retro-orbitally injected with RANPs (10, 20 or 30 mg/kg/day) or PBS every other day for 10 days (FIG. 13). DAI changes in mice for each group over 10 days (FIG. 15). Daily changes in body weight of mice for each group over 10 days (FIG. 14). Effects of RANPs on colon length in IBD mouse model (FIG. 16). Mice were sacrificed on day 10, colons were collected and imaged, and their lengths were measured. Representative photograph and statistical analysis of colon length is shown.

Figure 23:
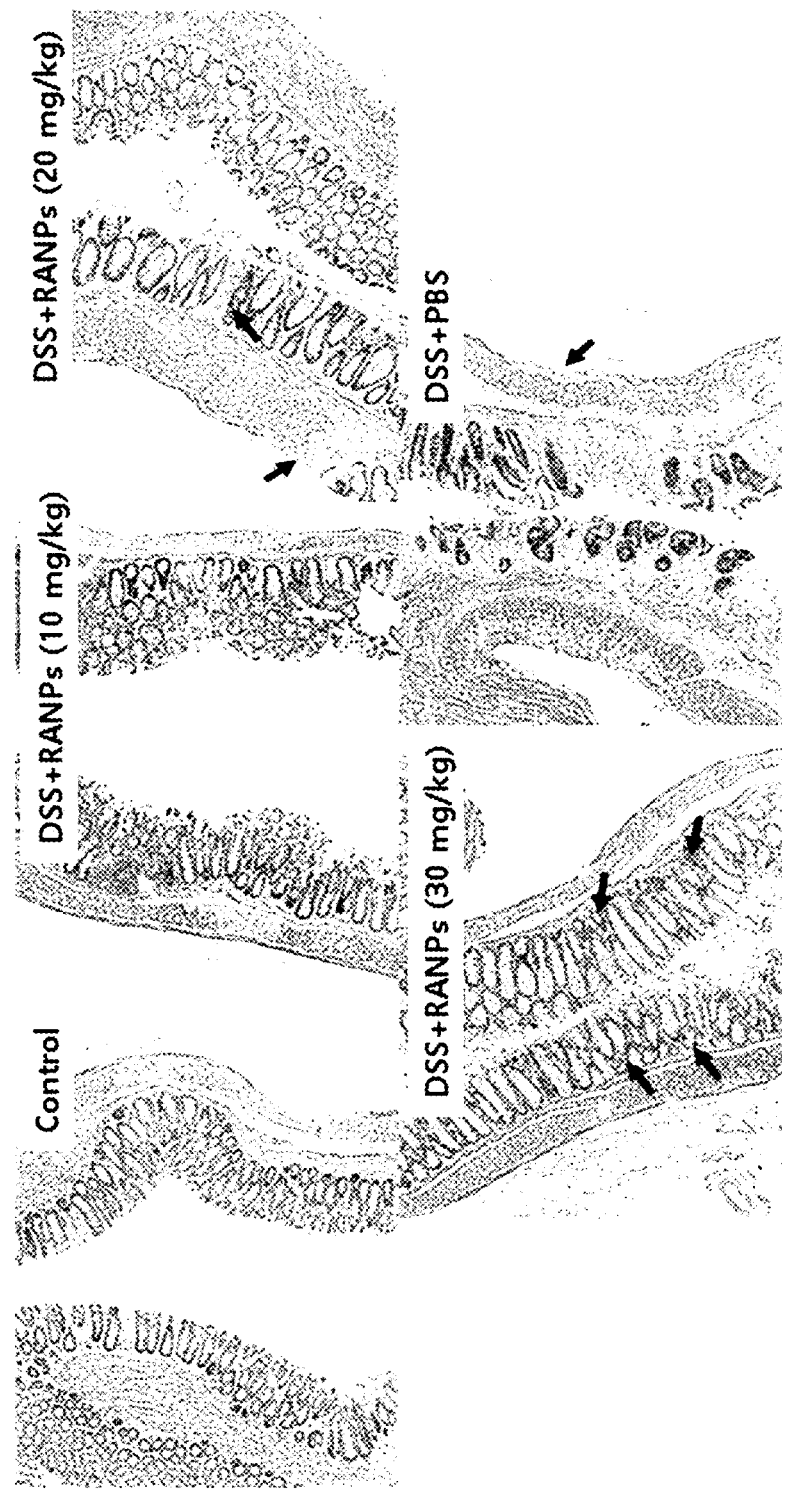

FIGS. 17, 18, 19, 20, 21, 22 and 23 show the antiinflammatory effect of RANPs in the DSS-induced colitis model. MPO activity (FIG. 17) and the pro-inflammatory cytokines TNF-α (FIG. 18), IFN-γ (FIG. 19), IL-1β (FIG. 20), IL-6 (FIG. 21), and IL-12 (FIG. 22) in colon samples from mice, determined by ELISA. FIG. 23 shows representative H&E-stained sections of colons, showing epithelial ulceration (black arrow), severe edema/inflammation (yellow arrow), and retention/regeneration of crypts (red arrow). Values are means±SD (n=5).

Figure 24:
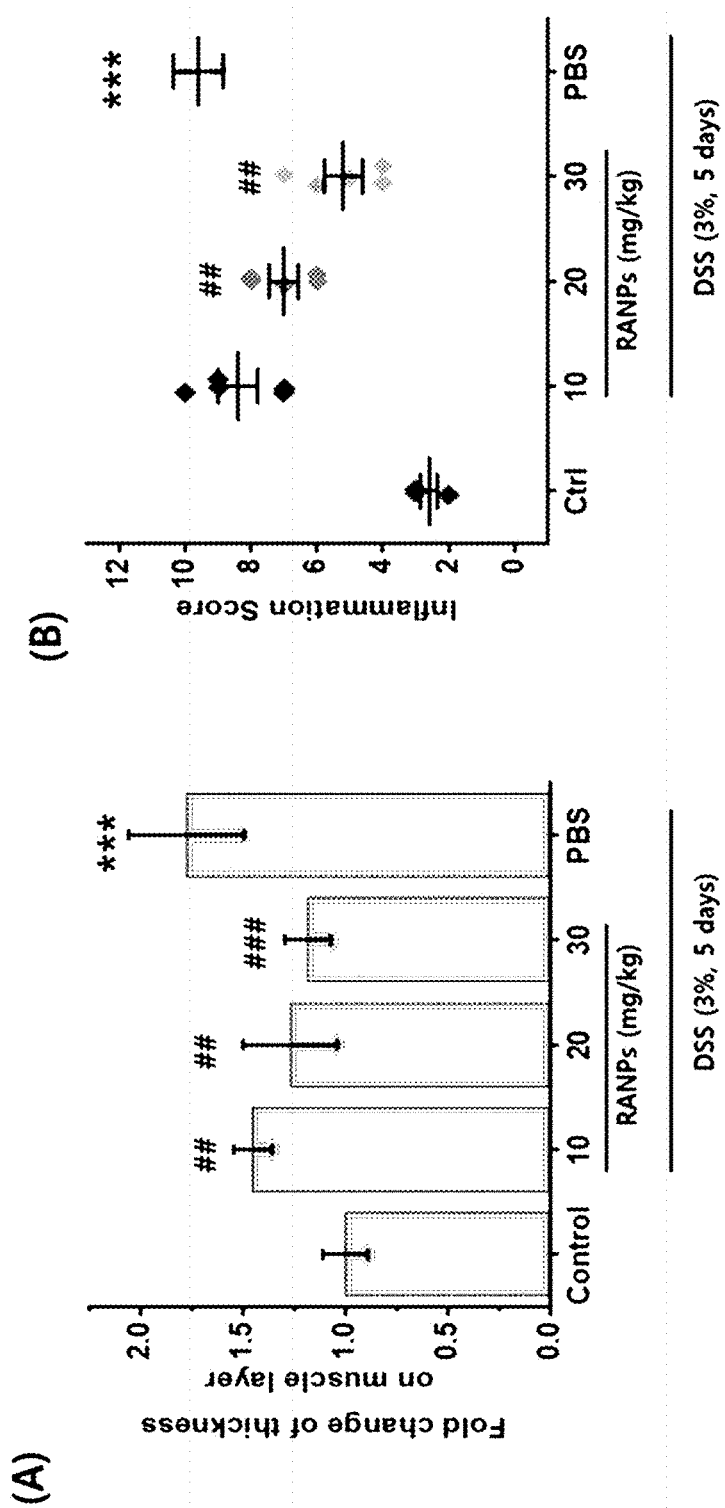

FIG. 24 shows the effects of RANP treatments on histological changes in DSS mice. (A) Muscle thickness of colon tissue sections was evaluated using ImageJ software. Stained sections were observed by light microscopy (Olympus IX53) at magnifications of ×40 and ×100. (B) Estimated inflammation score in DSS-induced mice. Values are means±SD (n=5). Mean inflammatory scores were significantly different between colons of PBS-treated mice (9.6±1.49) and RANP-treated mice (5.2±1.17).

Figure 25:
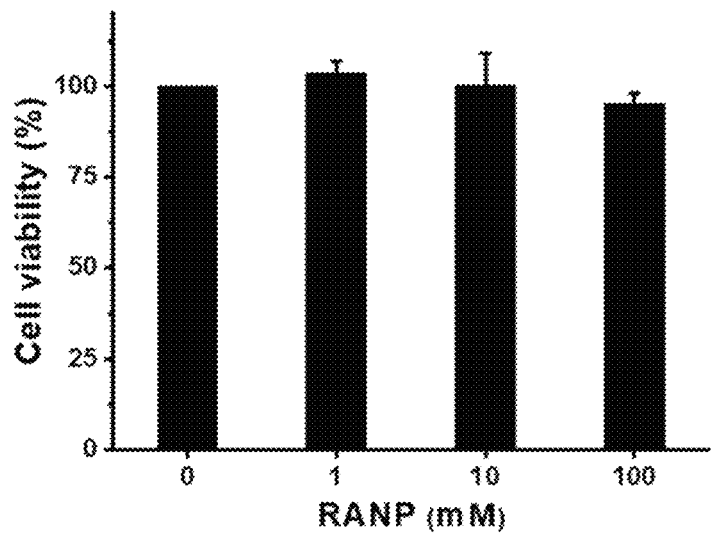
Figure 26:
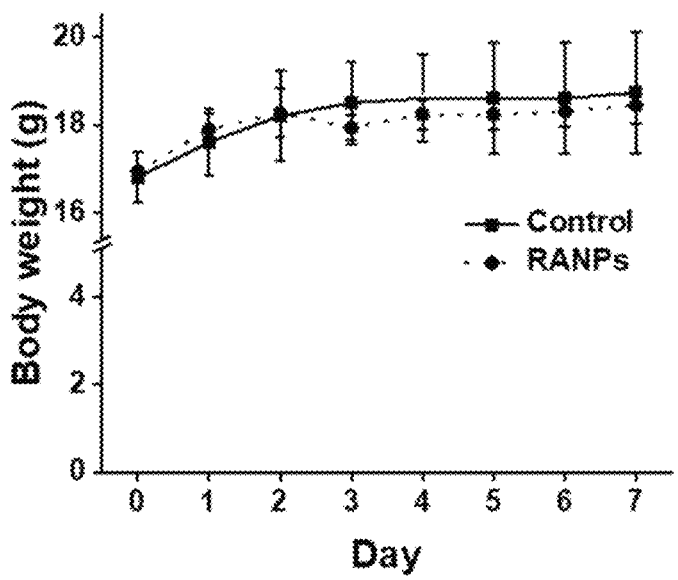
Figure 27:
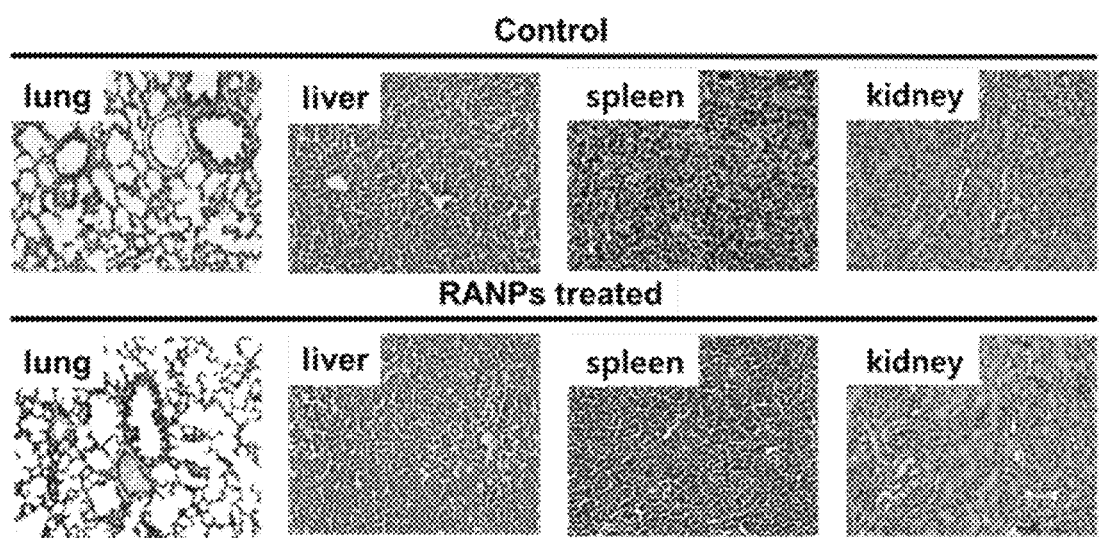

FIGS. 25, 26 and 27 show biocompatibility of RANPs assessed in vitro and in vivo. FIG. 25: In vitro cytotoxicity of RANPs at different concentrations (1 to 100 μM) in CHO-K1 cells after incubating for 8 hours, as determined by WST-8 assay. FIG. 26: Daily changes in body weight of healthy mice treated daily for 7 days with RANPs (30 mg/kg) or PBS (n=5 animals/group). FIG. 27: Representative photomicrographs of H&E-stained tissue sections of the major organs (lung, liver, kidneys, and spleen) of healthy mice treated with RANPs (30 mg/kg, daily for 7 days) or PBS (n=5 animals/group).

Figure 28:
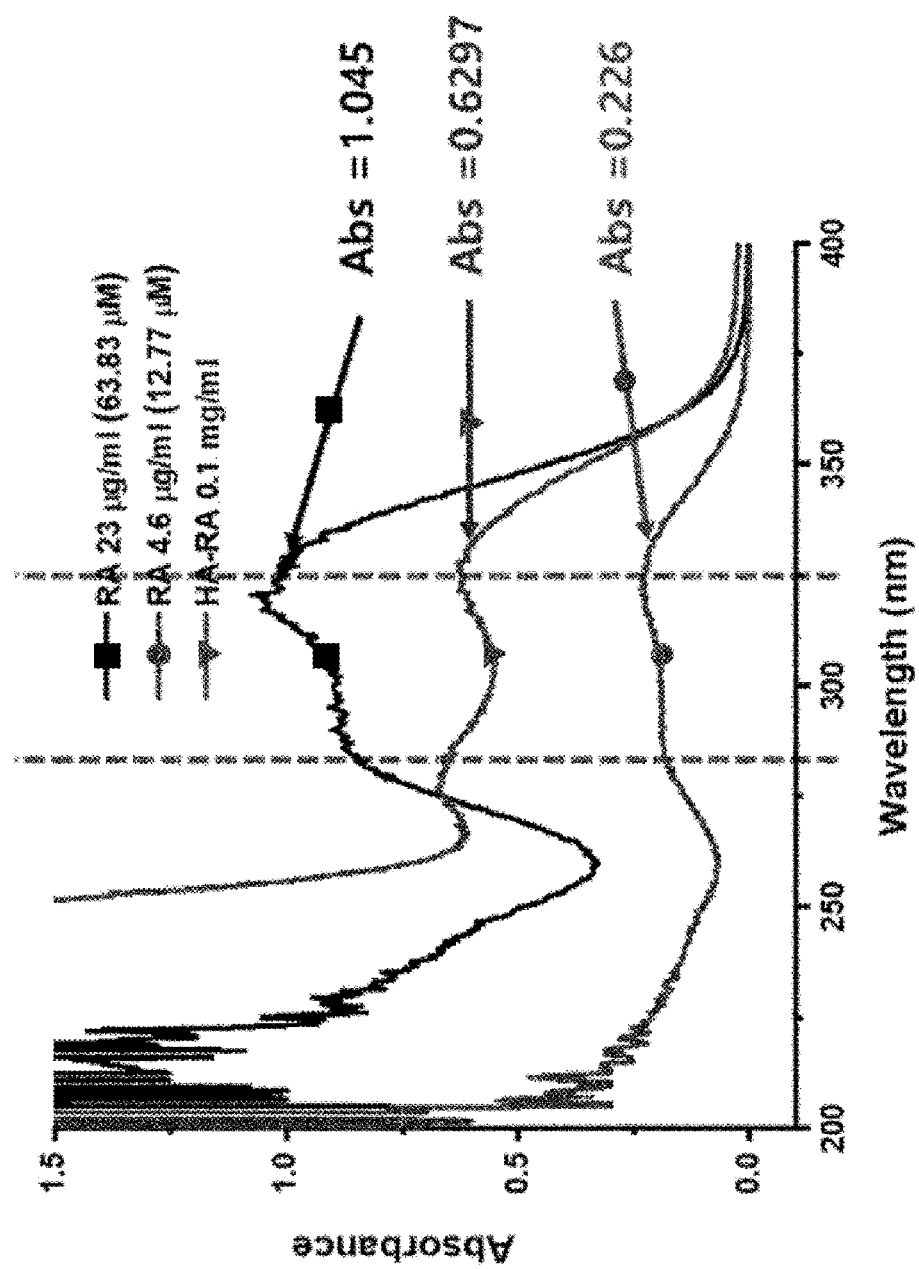

FIG. 28 confirms through UV/vis spectra that the HA-RA conjugate of the present disclosure was synthesized.

Figure 29:
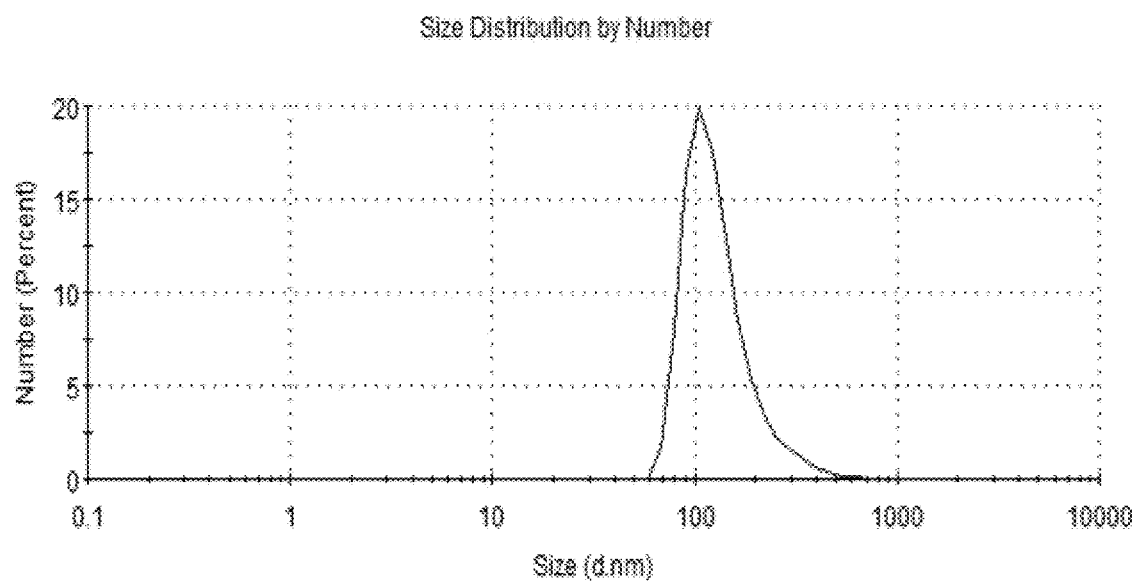

FIG. 29 confirms that comparatively uniform nano-sized HA-RANPs were formed from the HA-RA conjugate of the present disclosure.

Figure 30:
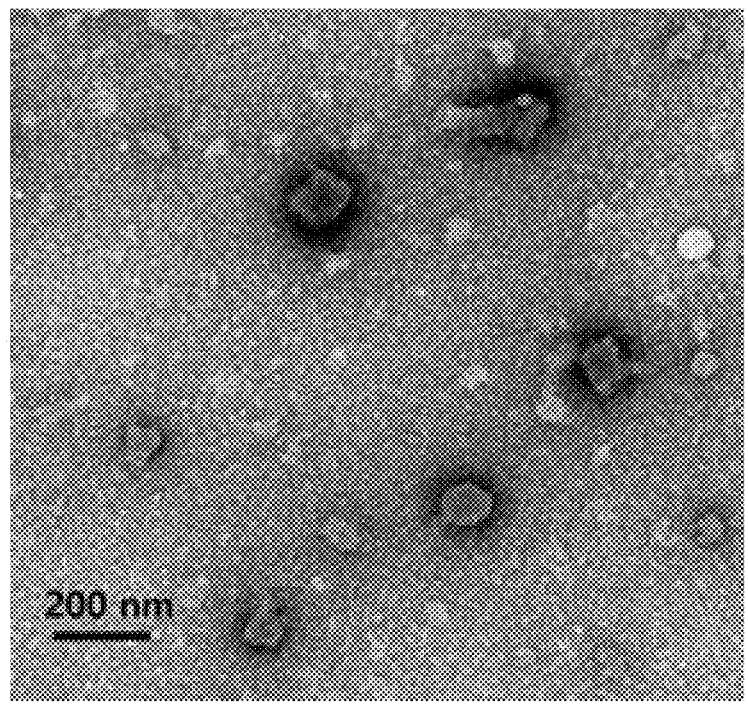

FIG. 30 shows the electron microscopic observation of the particle morphology of HA-RANP in an aqueous solution.

Figure 31:
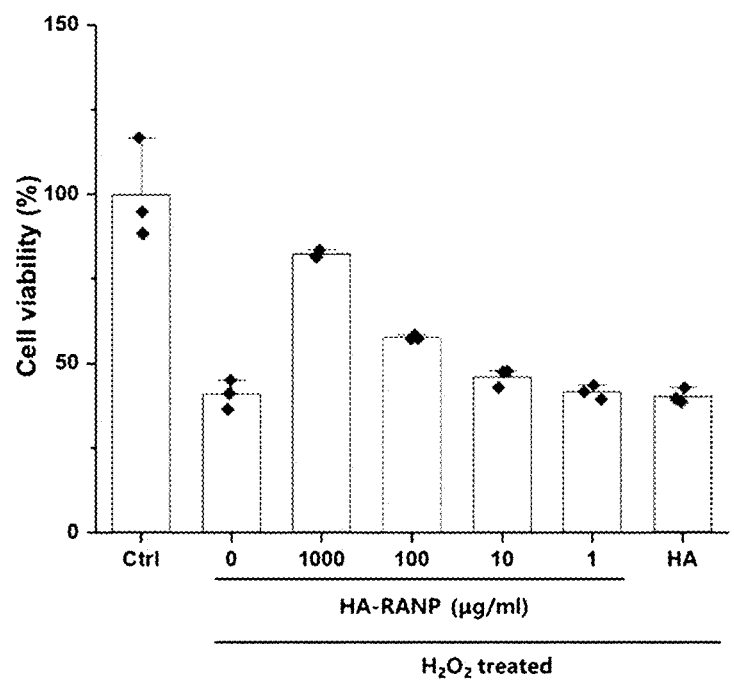

FIG. 31 shows the effect of HR-RANPs on inhibiting hydrogen peroxide (ROS)-caused cell damage.

Figure 32:
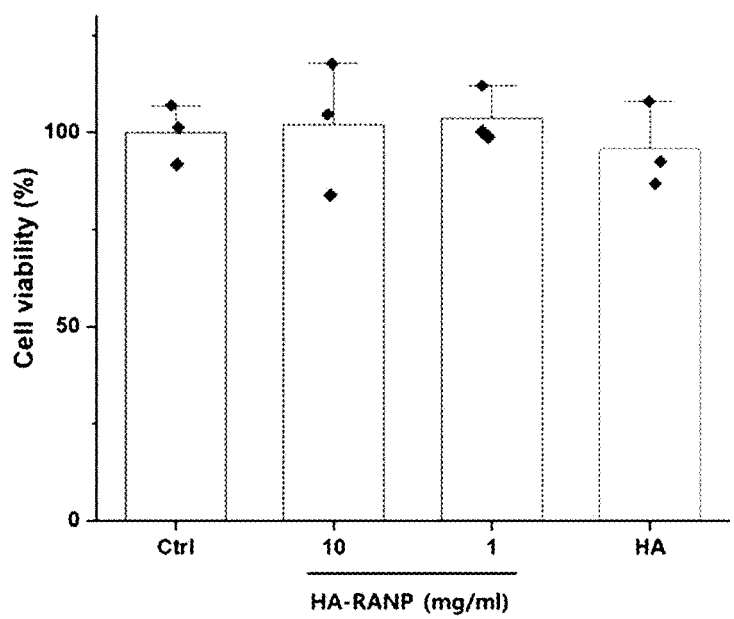

FIG. 32 shows the presence or absence of cytotoxicity depending on the concentration of HA-RANPs.

Figure 33:
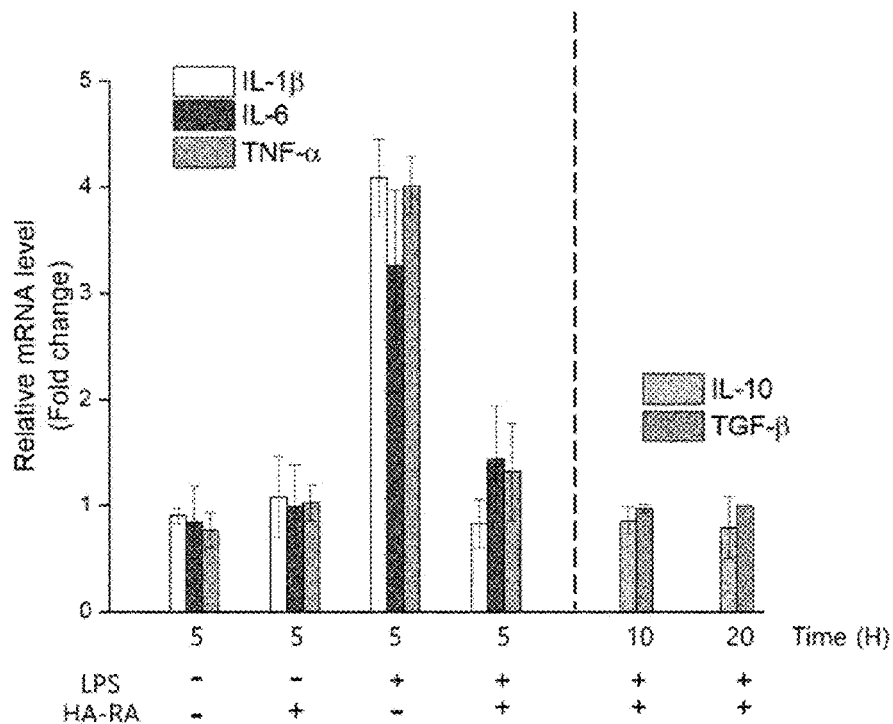

FIG. 33 shows the relative mRNA expression levels of cytokines in macrophages treated with HA-RANPs in order to examine the effect of HA-RANPs on macrophage polarization.

Figure 34:
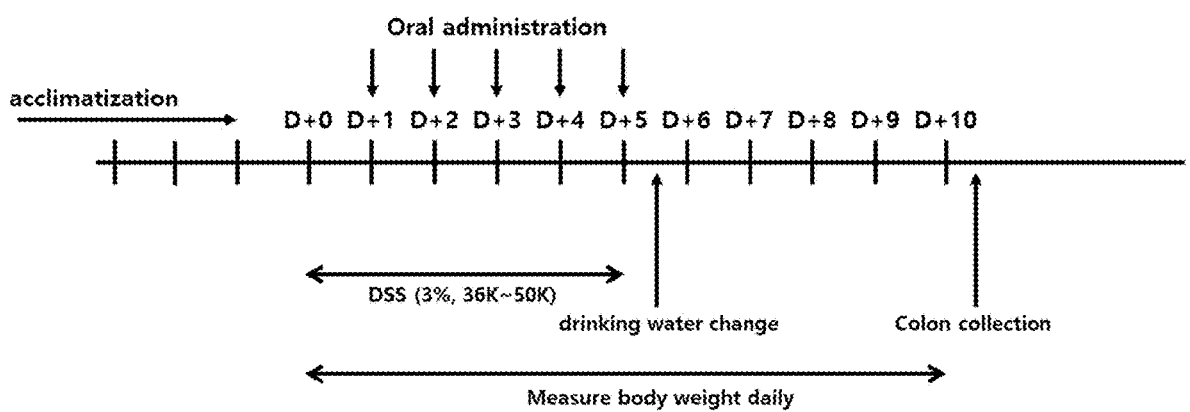

FIG. 34 shows the summary of the test method of Example 11.

Figure 35:
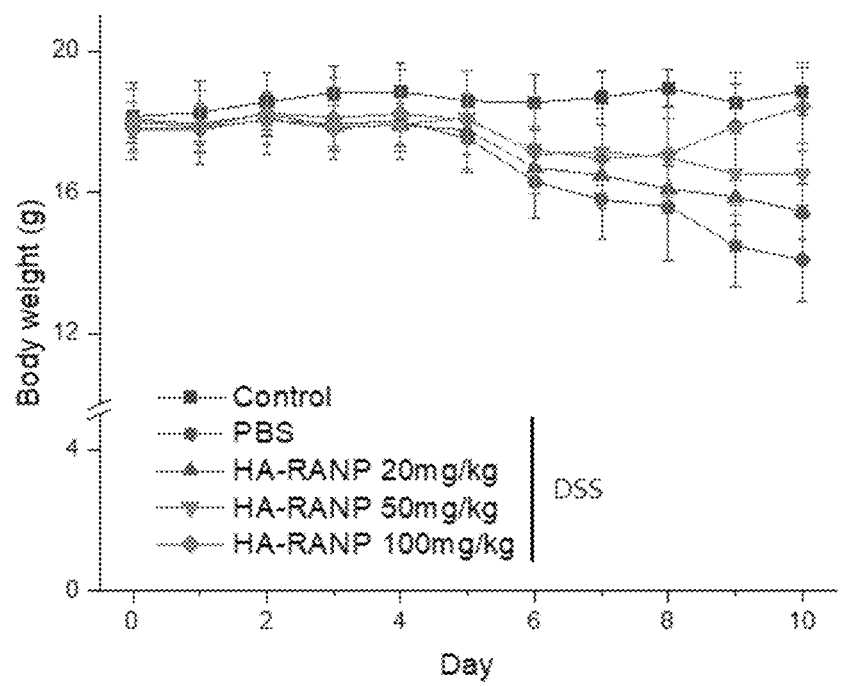

FIG. 35 shows the effect of HA-RANPs on body weight changes in inflammatory bowel disease model mice.

Figure 36:
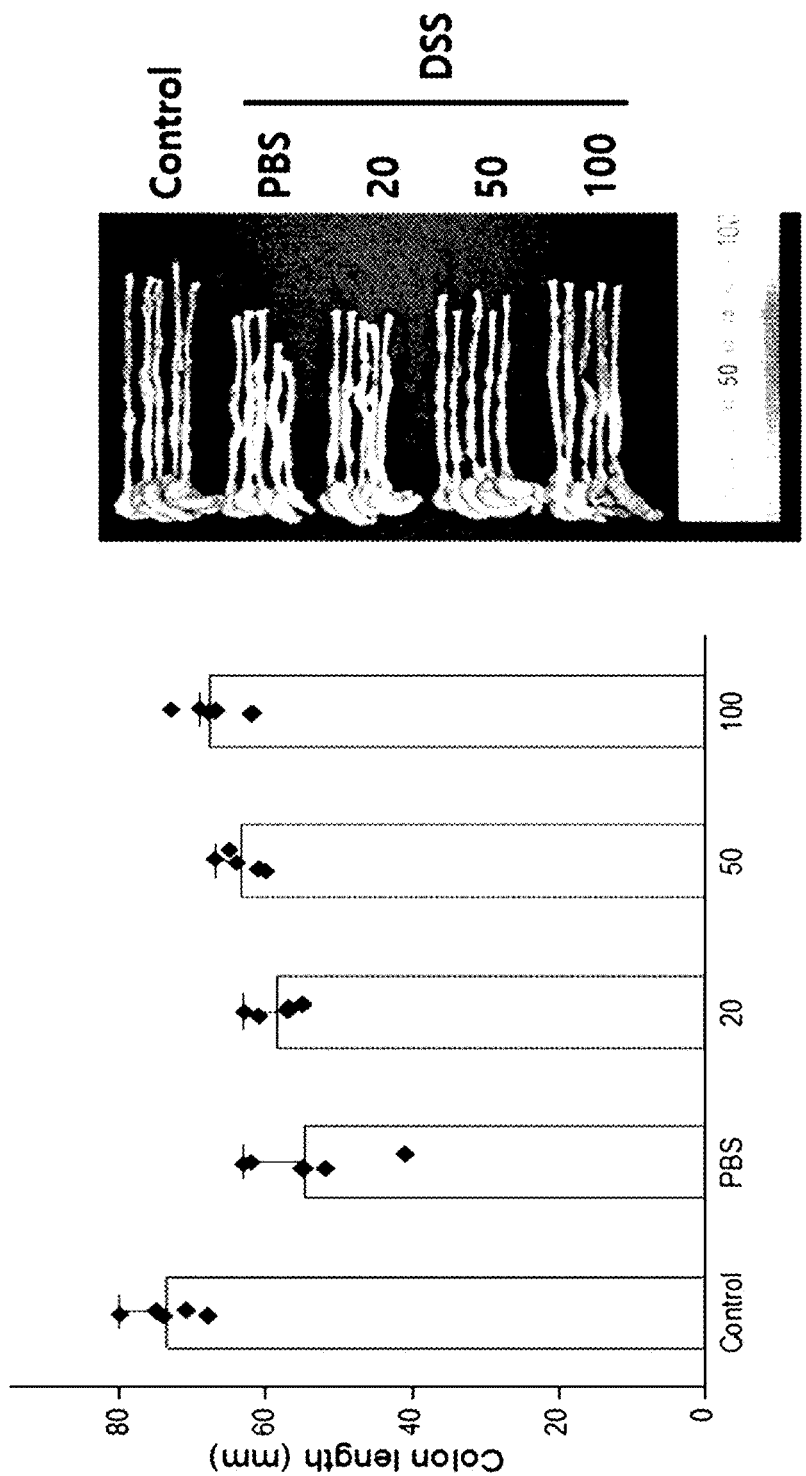

FIG. 36 shows the effect of HA-RANPs on colon length in inflammatory bowel disease model mice.

Figure 37:
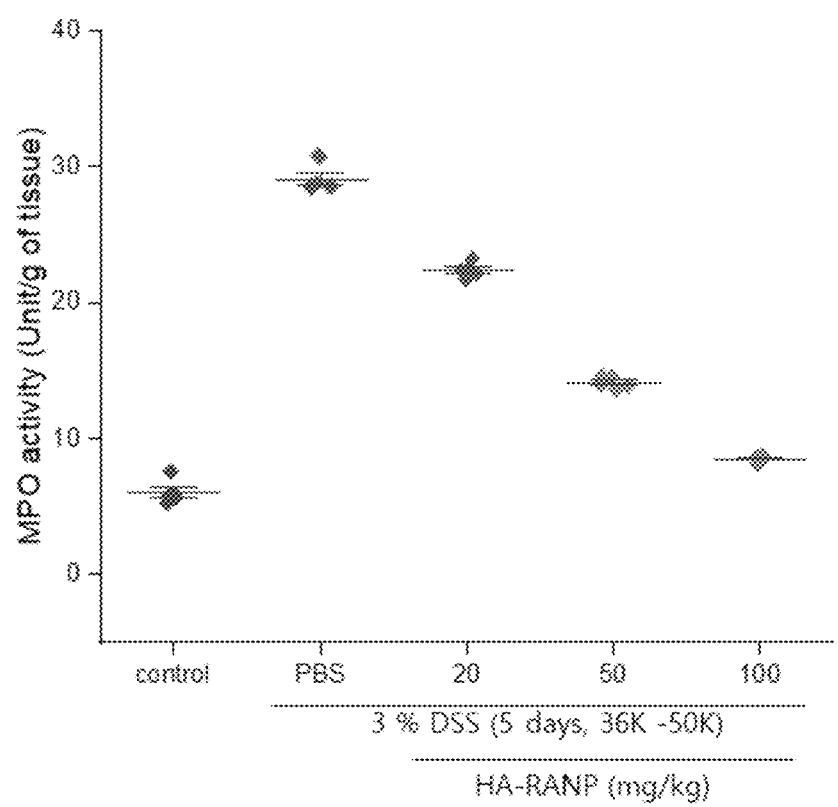
Figure 38:
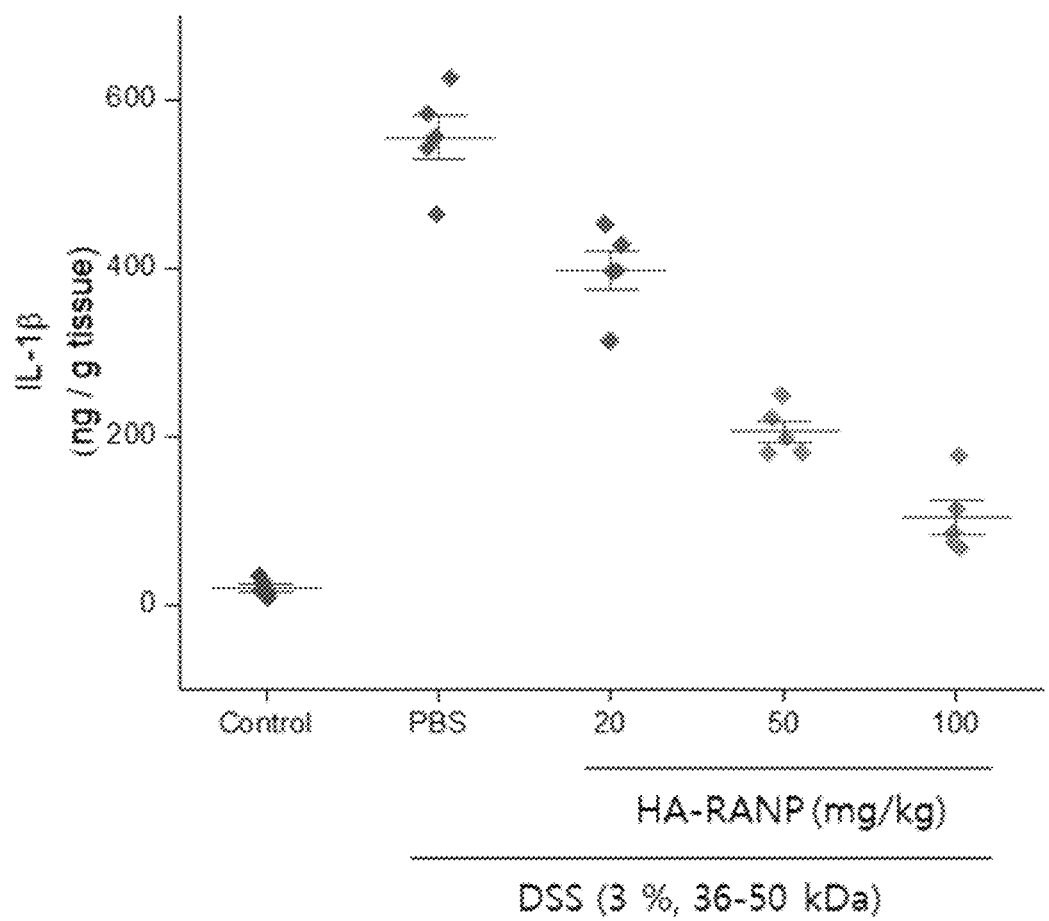
Figure 39:
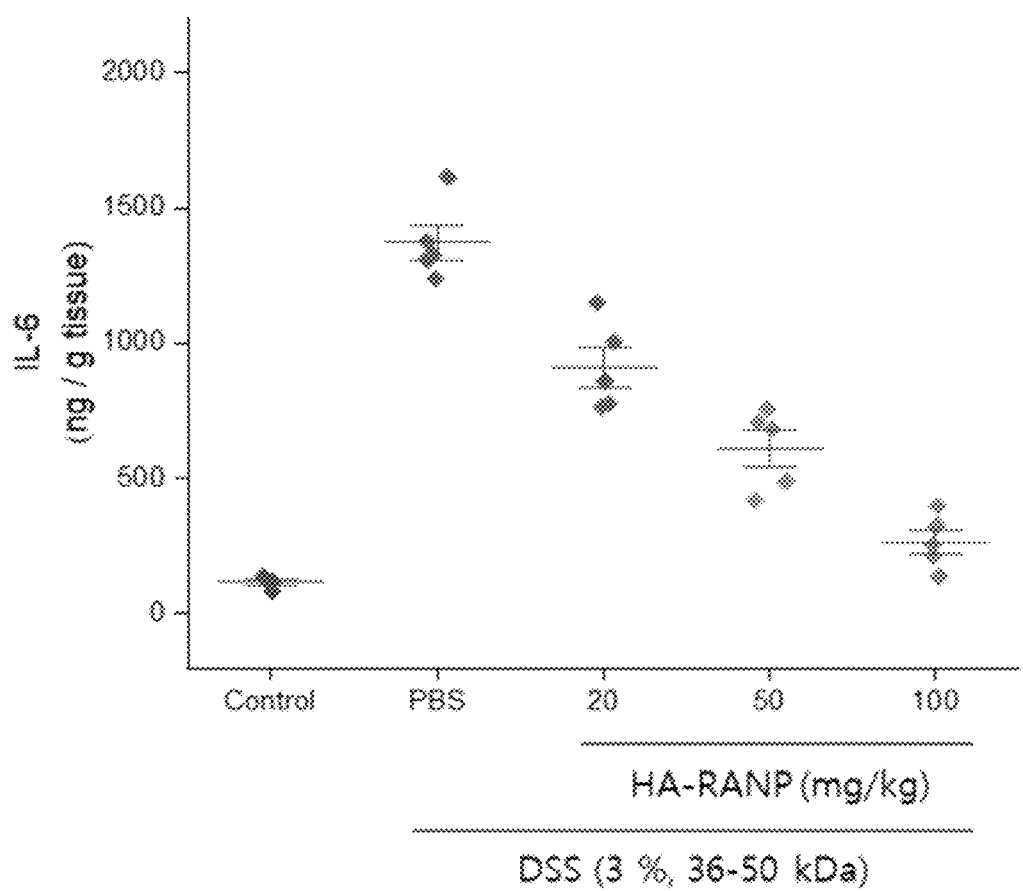
Figure 40:
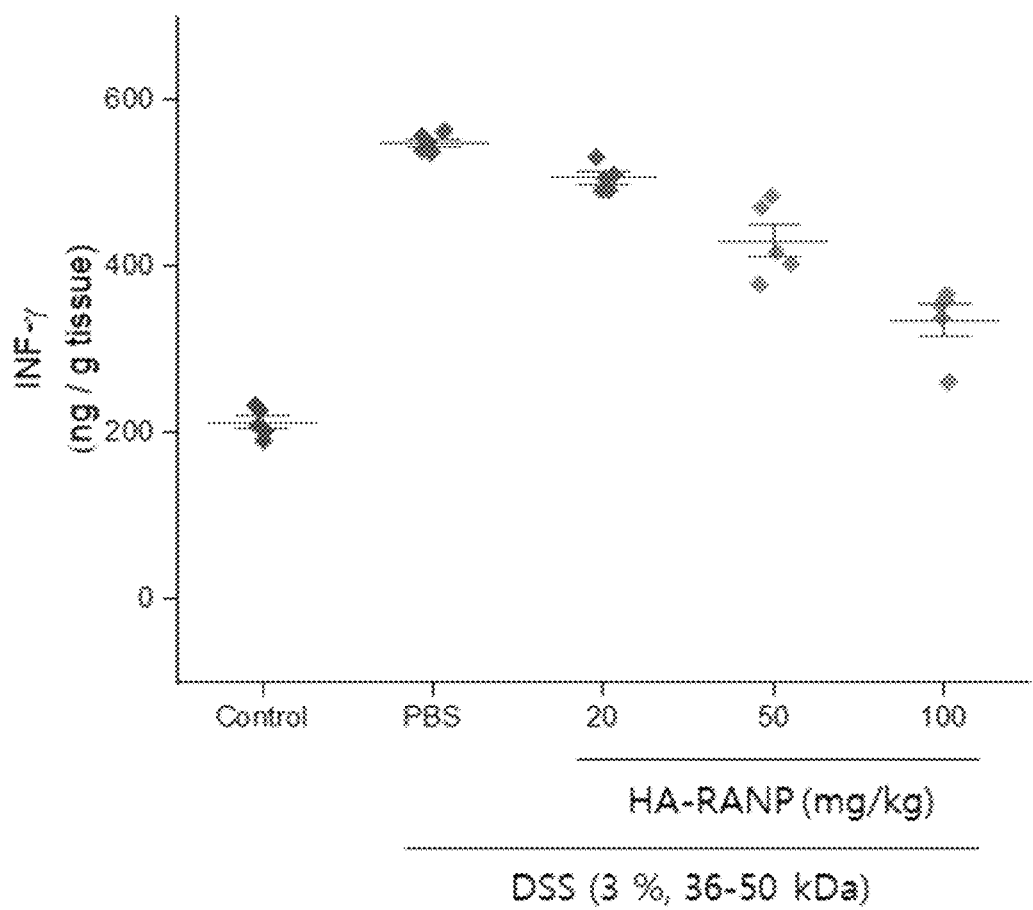
Figure 41:
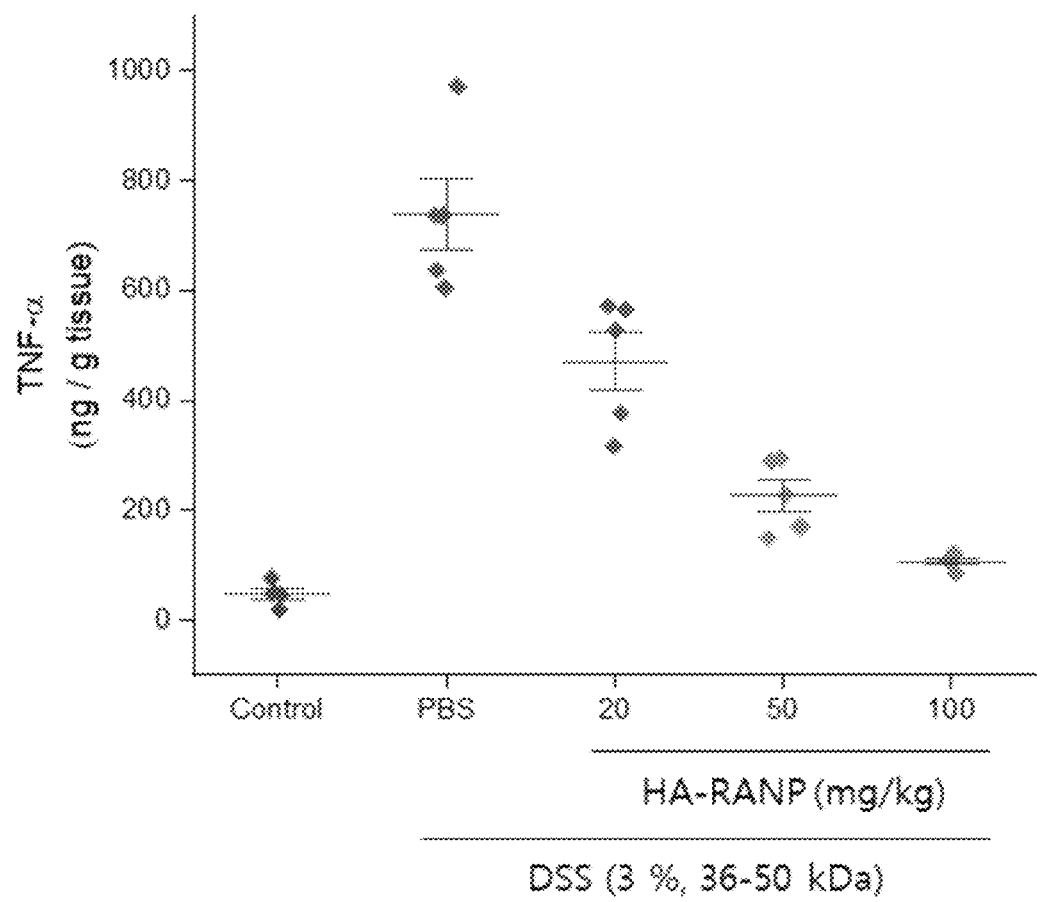

FIG. 37 shows the effect of HA-RANPs on MPO activity in inflammatory bowel disease model mice.

FIGS. 38, 39, 40 and 41 show the results of the amounts of respective cytokines, as measured by ELISA, in order to investigate the effect of the HA-RANPs of the present disclosure on expression levels of the pro-inflammatory cytokines IL-1β, IL-6, IFN-γ, and TNF-α.

Figure 42:
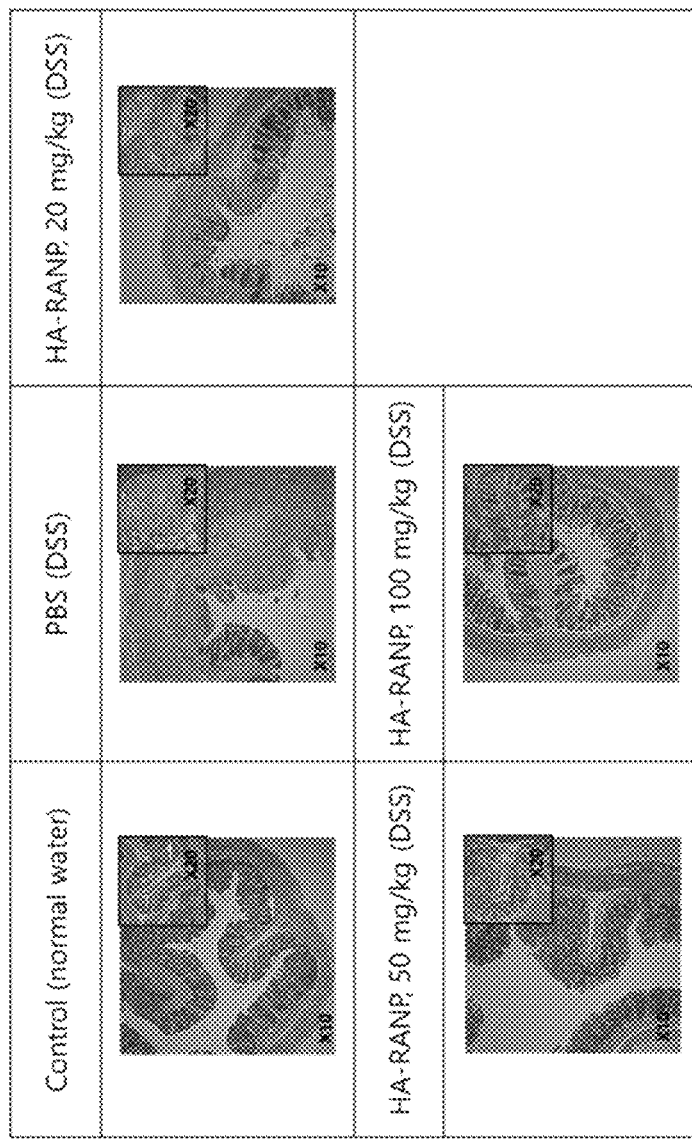

FIG. 42 shows the colon histology of inflammatory bowel disease mouse models treated with HA-RANPs.

Figure 43:
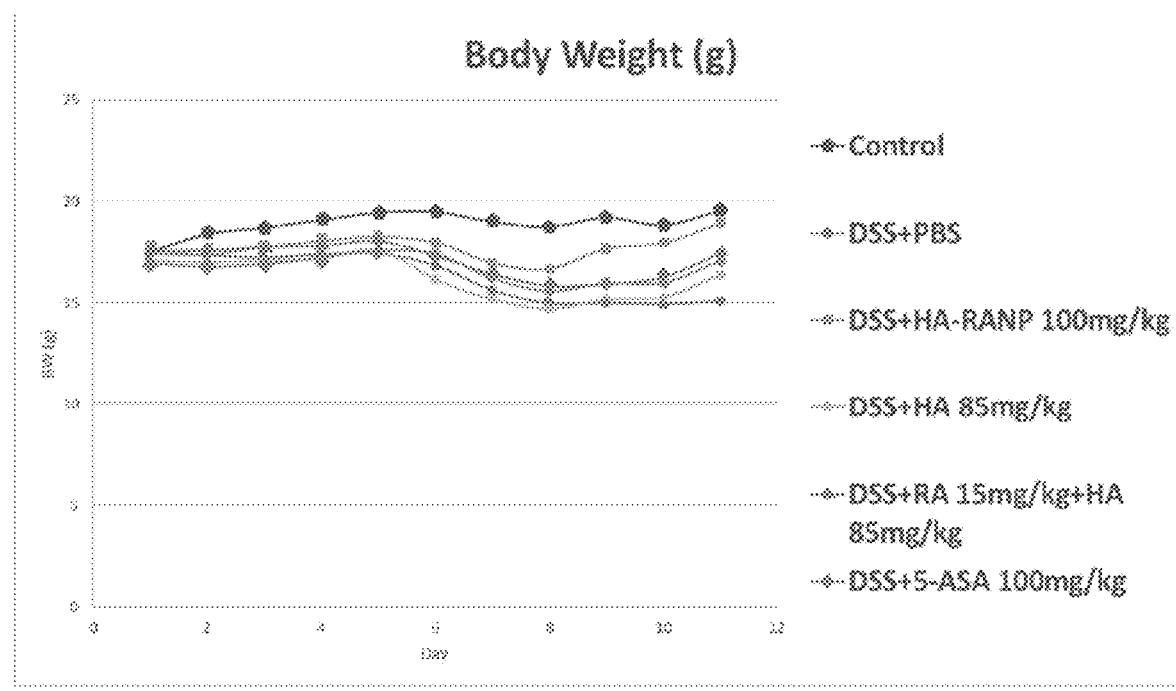
Figure 44:
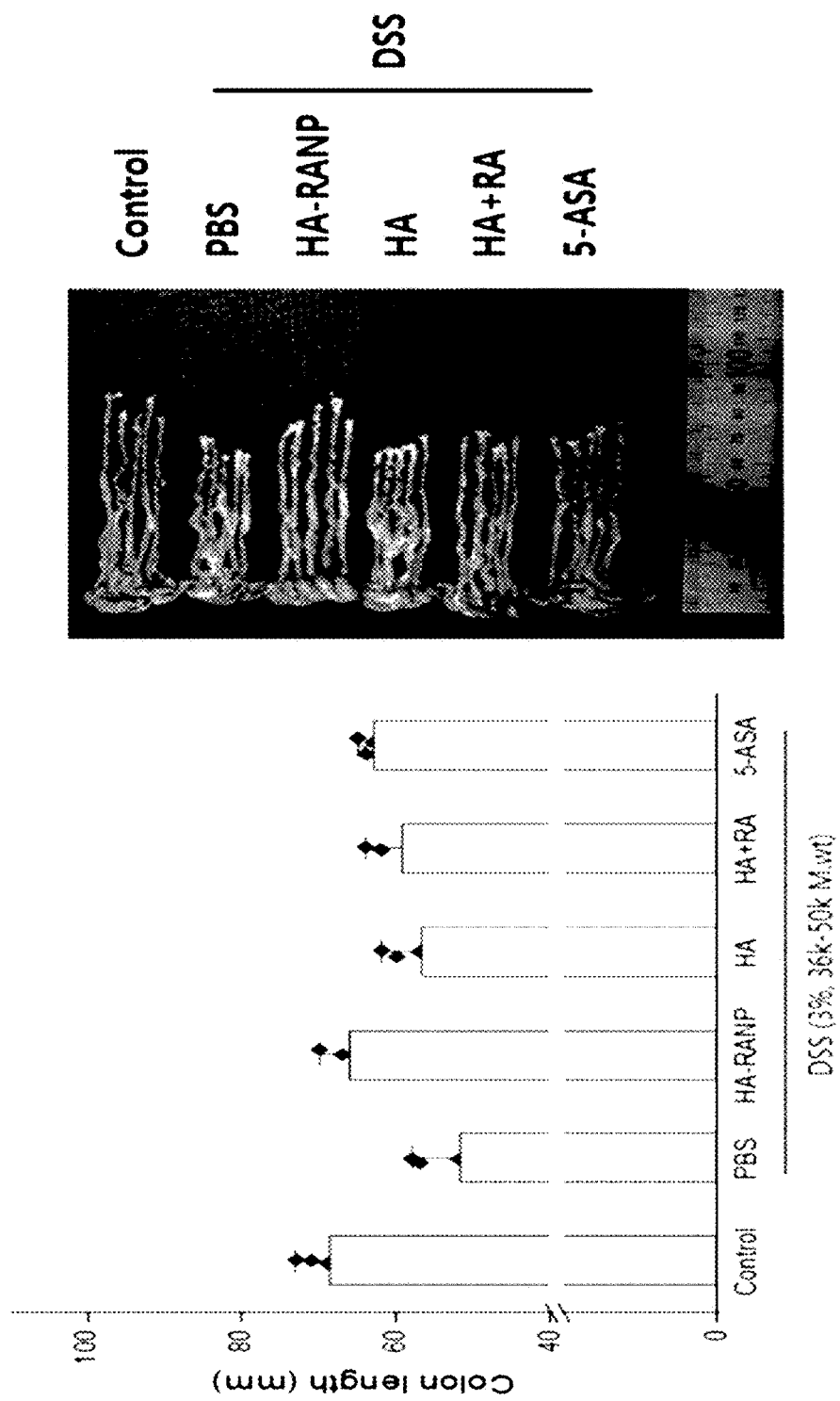

FIGS. 43 and 44 show body weights and colon lengths of inflammatory bowel disease mouse models treated with HA, RA, 5-ASA, or HA-RANP.

Figure 45:
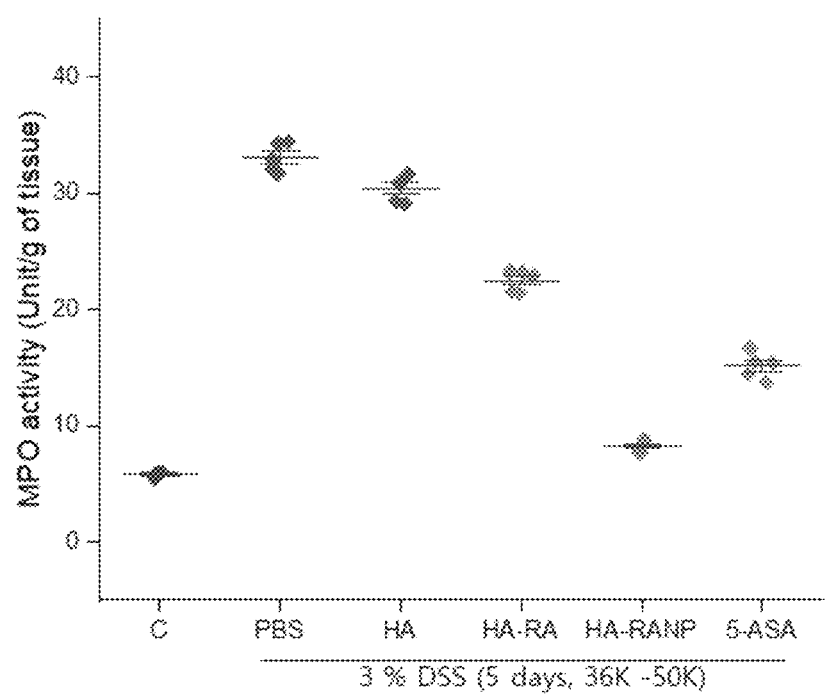
Figure 46:
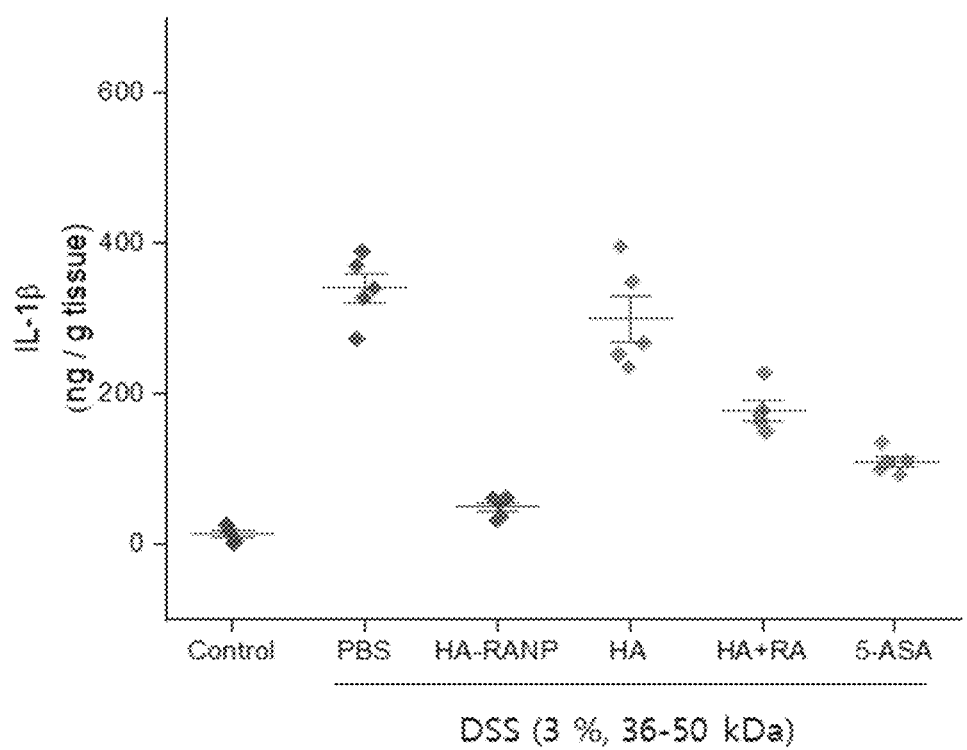
Figure 47:
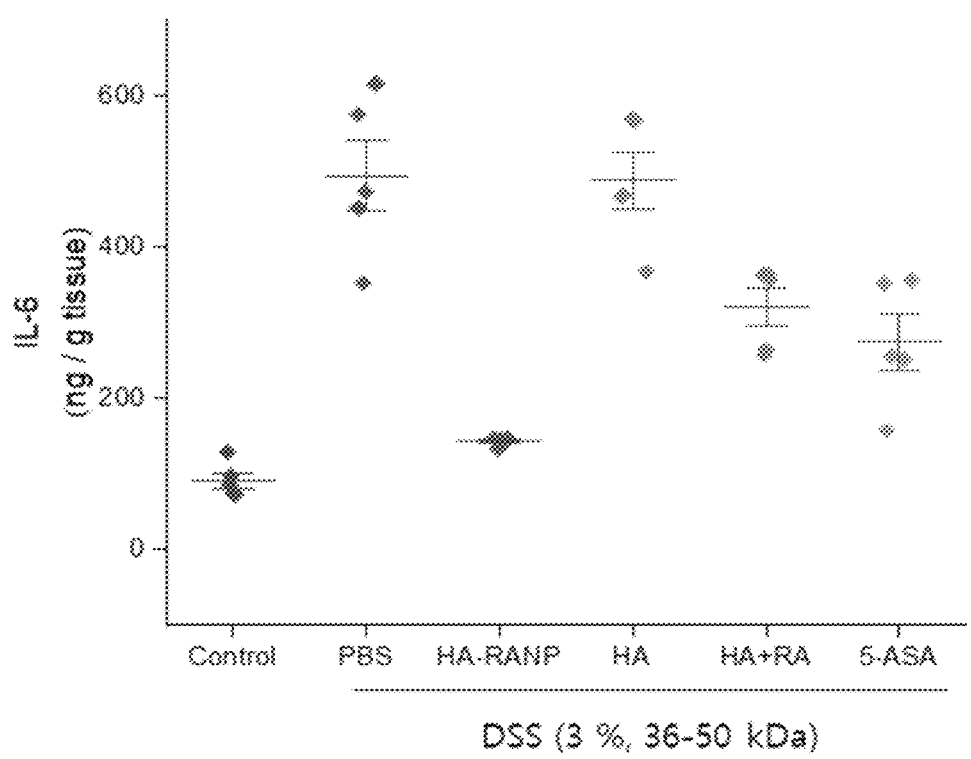
Figure 48:
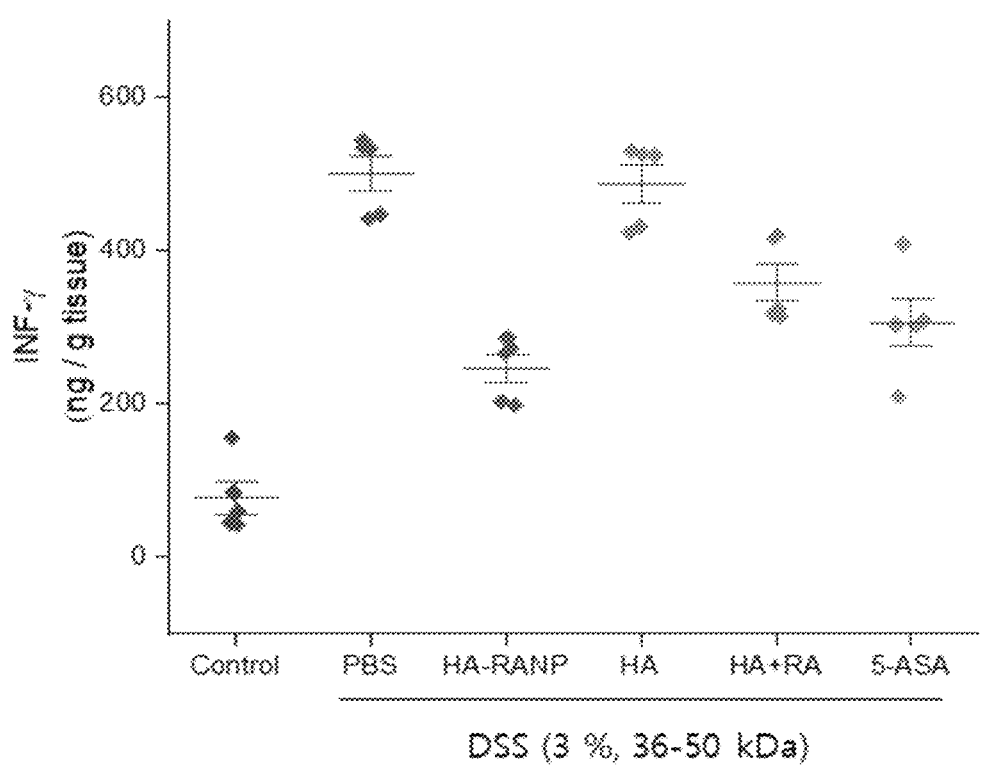
Figure 49:
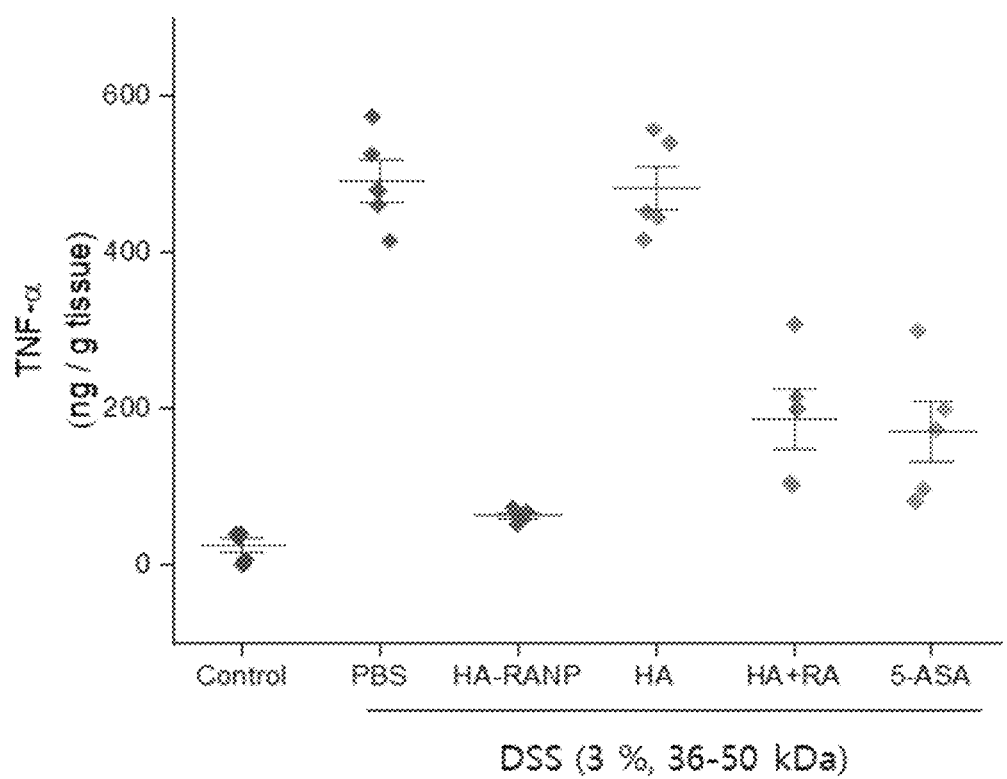

FIG. 45 shows MPO activity of inflammatory bowel disease mouse models treated with HA, RA, 5-ASA, or HA-RANP.

FIGS. 46, 47, 48 and 49 show the expression levels of pre-inflammatory cytokines (IL-1beta, IL-6, IFN-gamma, and TNF-alpha, sequentially) in inflammatory bowel disease mouse models treated with HA, RA, 5-ASA, or HA-RANP.

Figure 50:
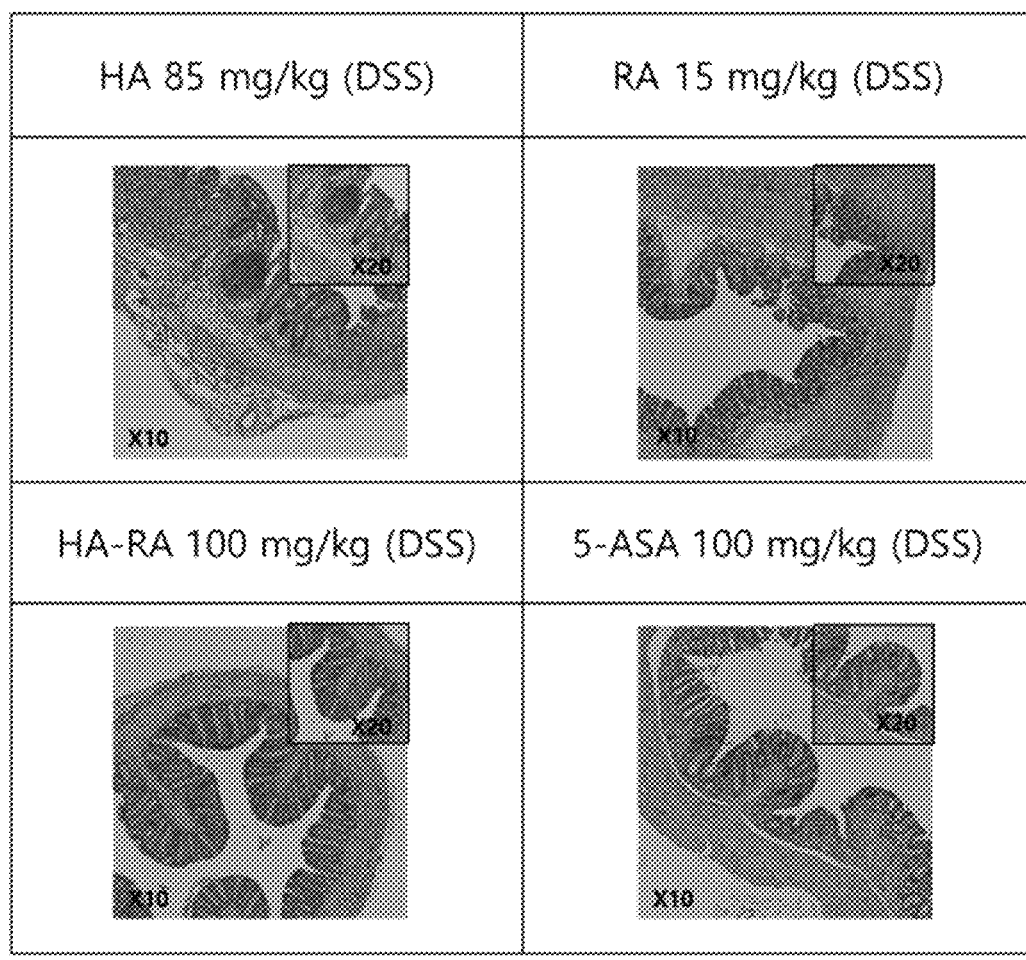

FIG. 50 shows the colon histology of inflammatory bowel disease mouse models treated with HA, RA, 5-ASA, or HA-RANPs.

Figure 51:
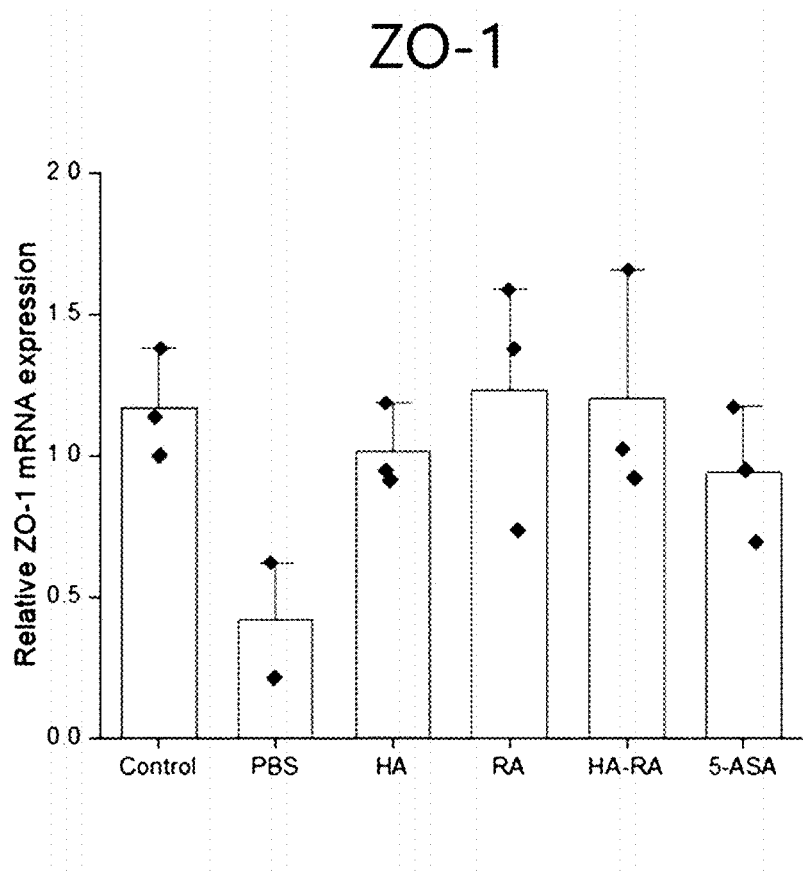
Figure 52:
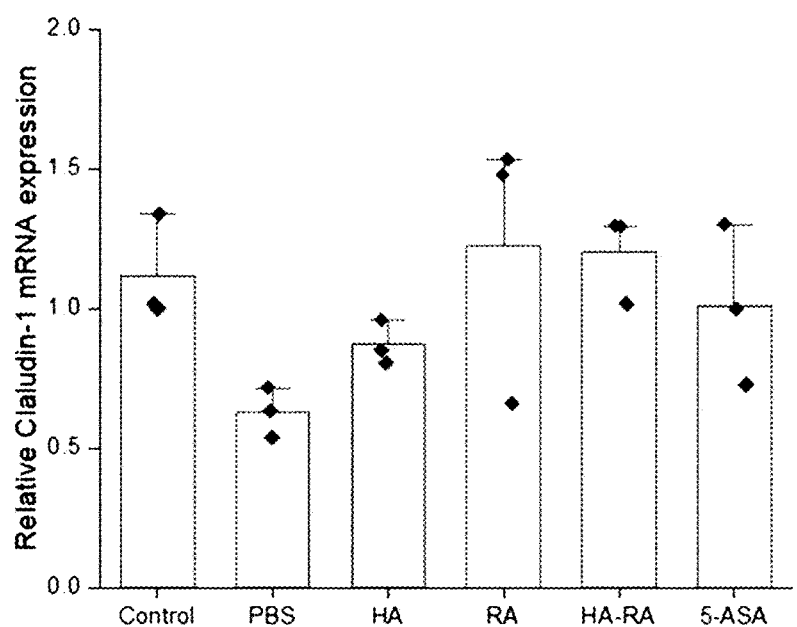
Figure 53:
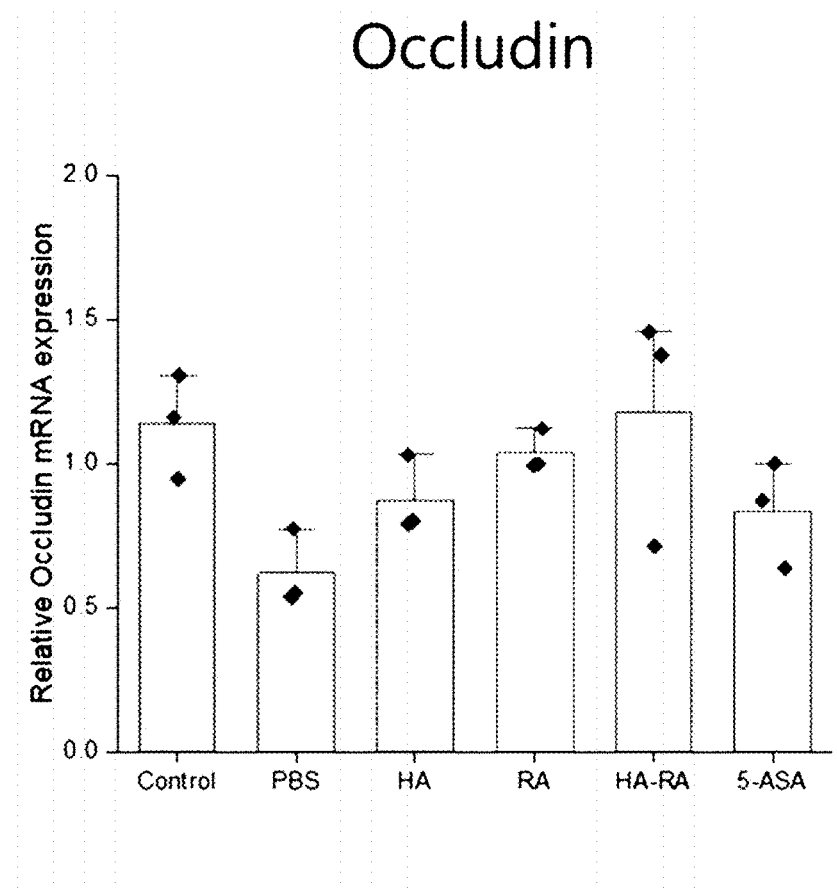

FIGS. 51, 52 and 53 show the mRNA expression levels of ZO-1, claudin-1, and occludin-1 genes in the colon tissues of inflammatory bowel disease mouse models treated with HA, RA, 5-ASA, or HA-RANPs.

Figure 54:
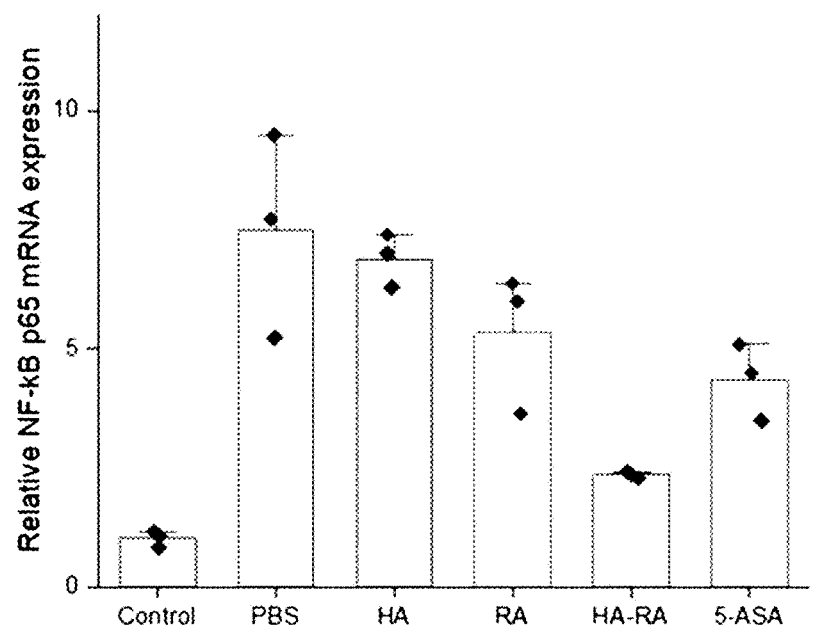
Figure 55:
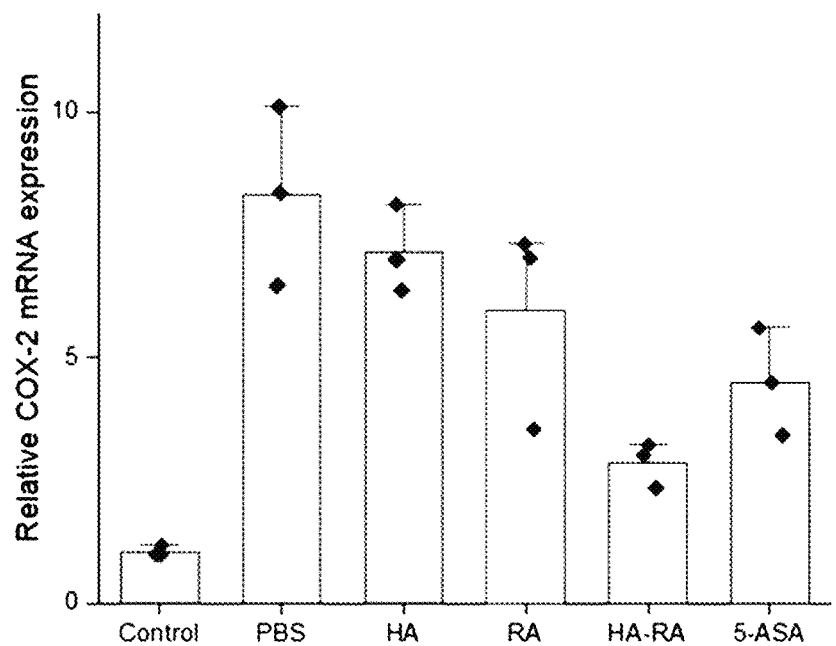
Figure 56:
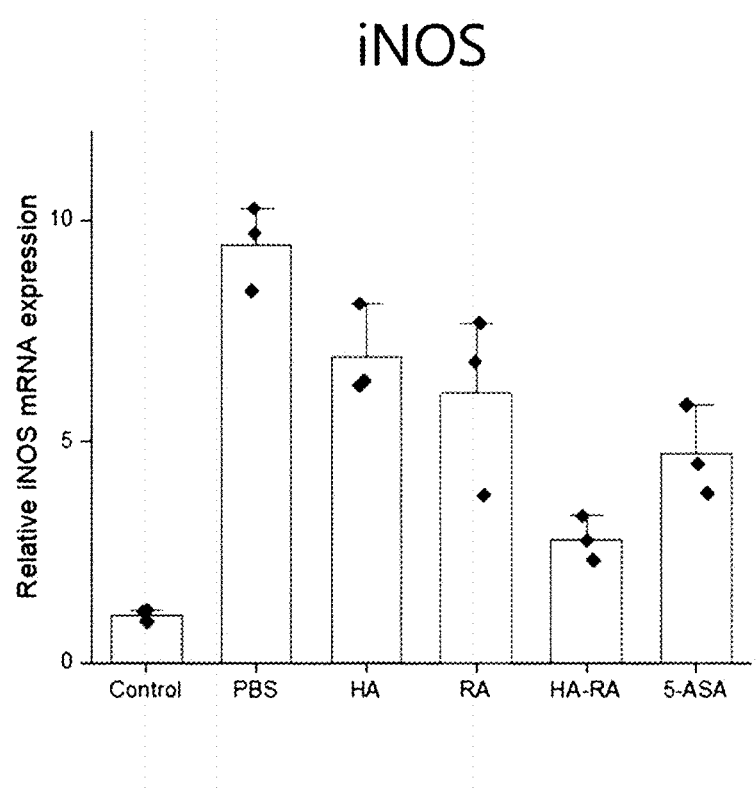

FIGS. 54, 55 and 56 show the mRNA expression levels of $NF_{\kappa}B$ p65, COX-2, and INOS genes in the colon tissues of inflammatory bowel disease mouse models treated with HA, RA, 5-ASA, or HA-RANPs.

Figure 57:
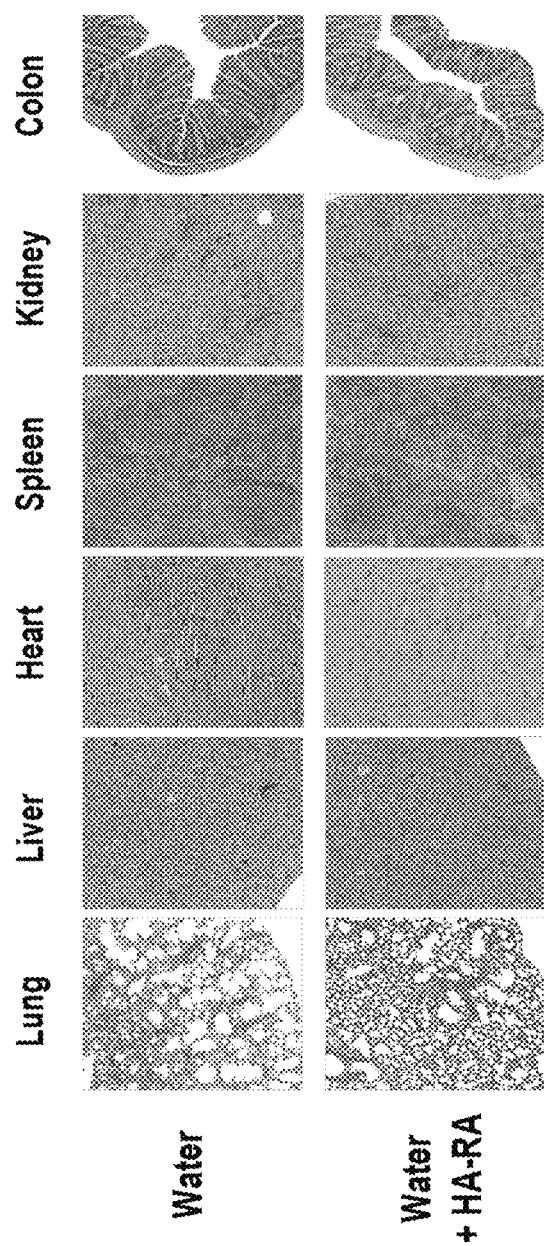

FIG. 57 shows the results of H&E stained biopsy performed on the major organs (liver, lung, heart, kidneys, spleen, and large intestine) extracted after the treatment with HA-RANPs at a high dose (100 mg/kg).

Figure 58:
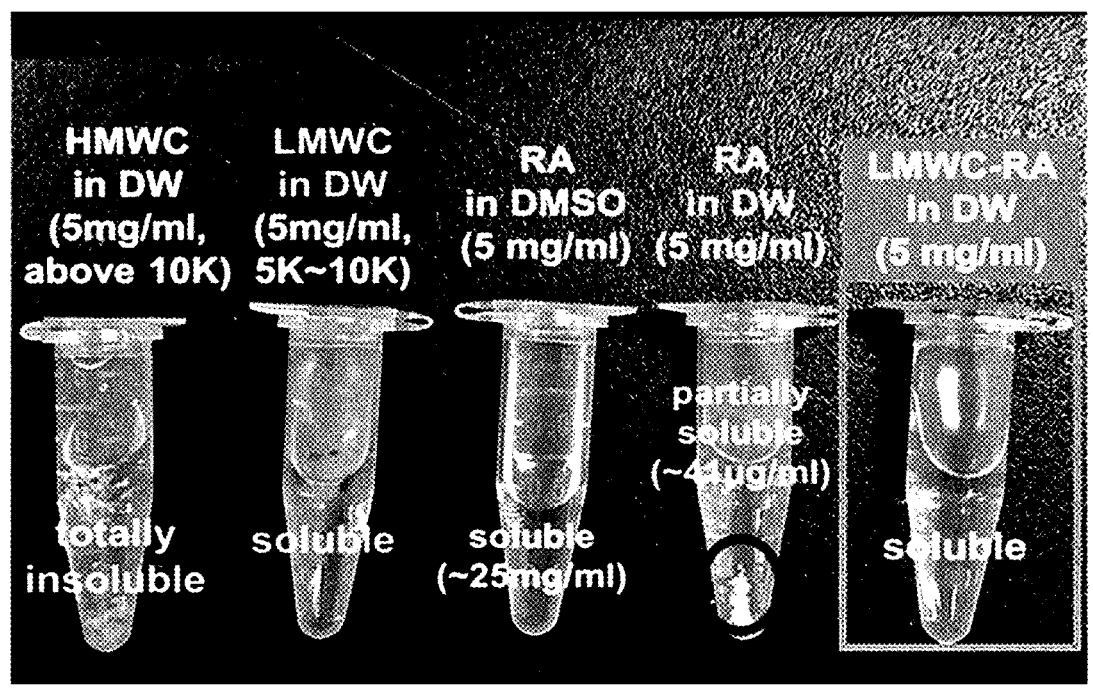

FIG. 58 confirms the water solubility of LMWC-RA through comparison of solubility of the synthesized LMWC-RA, high molecular weight chitosan (HMWC), low molecular weight chitosan (LMWC), and RA in water.

Figure 59:
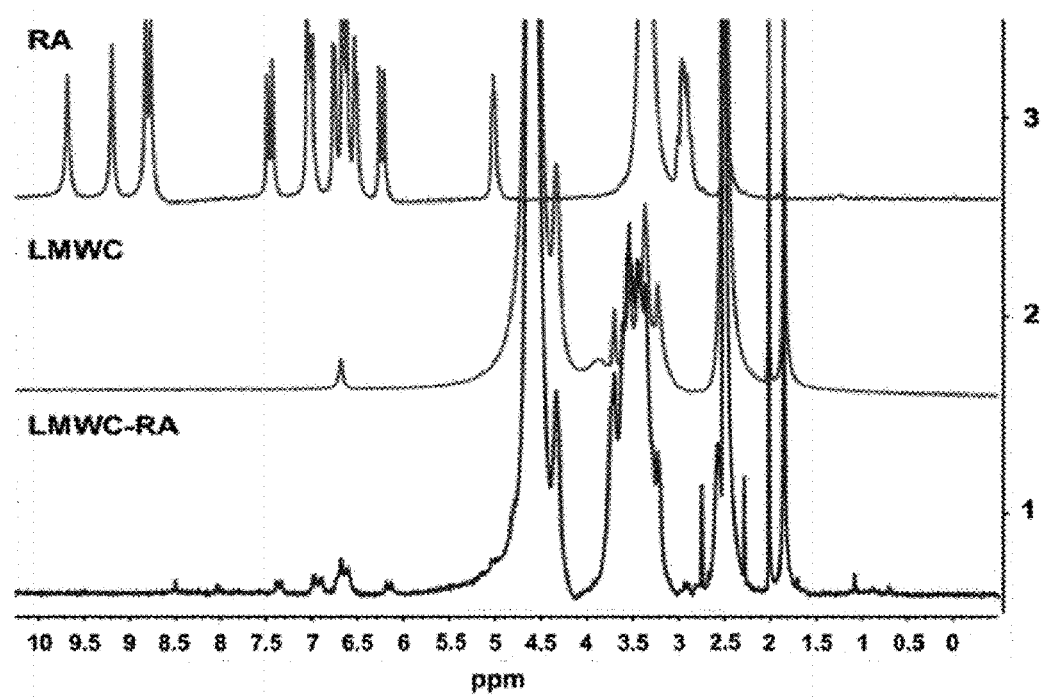

FIG. 59 shows the 1H NMR spectrum of LMWC-RA of the present disclosure, indicating the synthesis or not of LMWC-RA.

Figure 60:
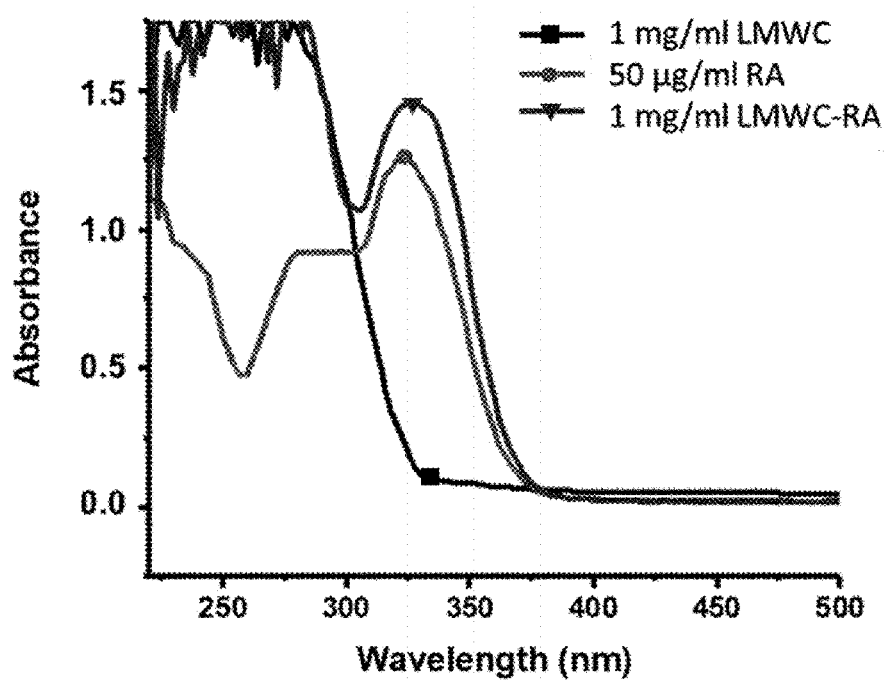

FIG. 60 shows the UV/vis absorbance spectrum of LMWC-RA of the present disclosure, indicating the synthesis or not of LMWC-RA (RA peak: about 330 nm).

Figure 61:
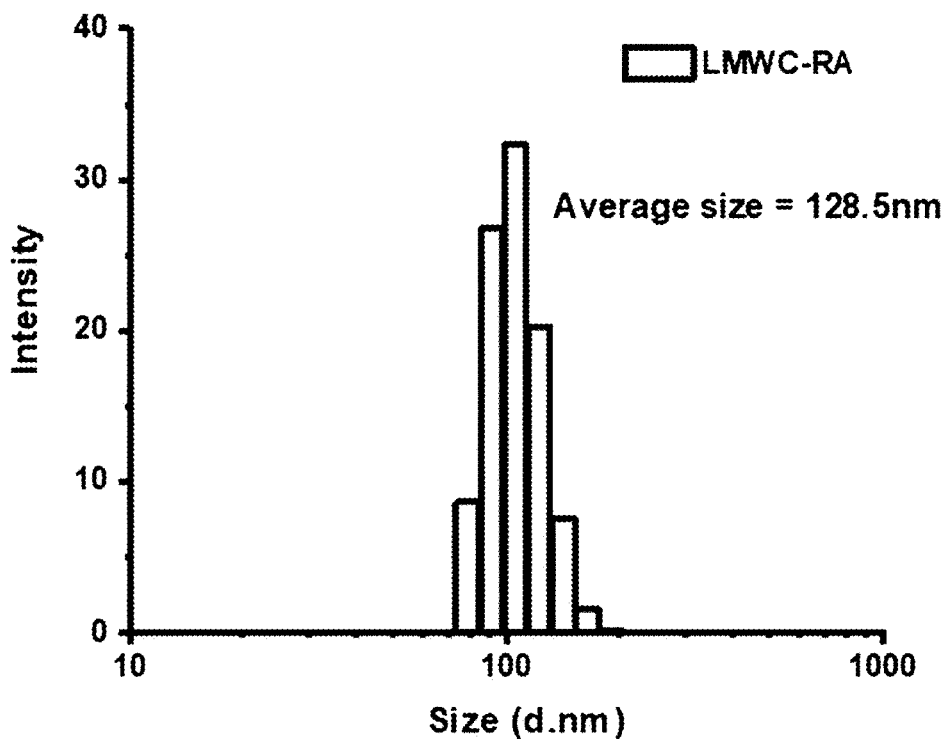

FIG. 61 shows the hydrodynamic size of LMWC-RA nanoparticles of the present disclosure.

Figure 62:
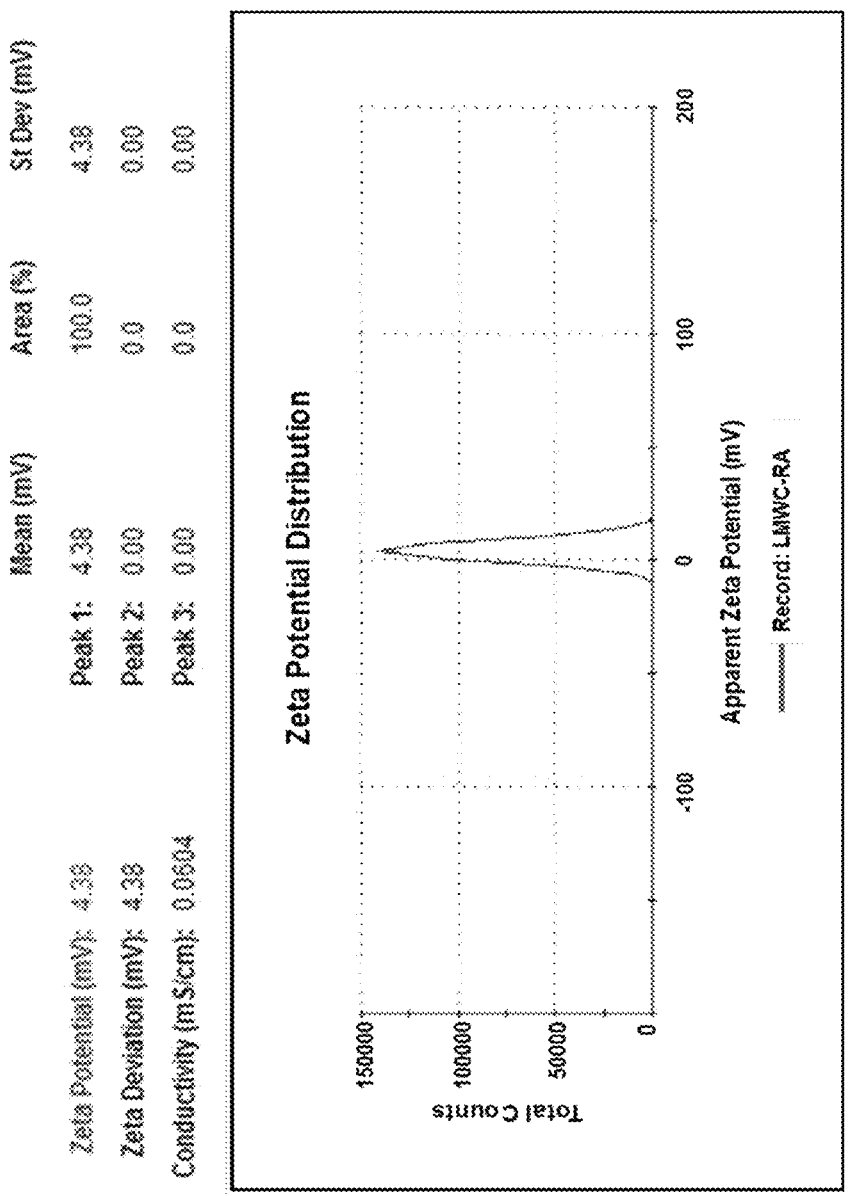

FIG. 62 shows the zeta potential value of LMWC-RA nanoparticles of the present disclosure.

Figure 63:
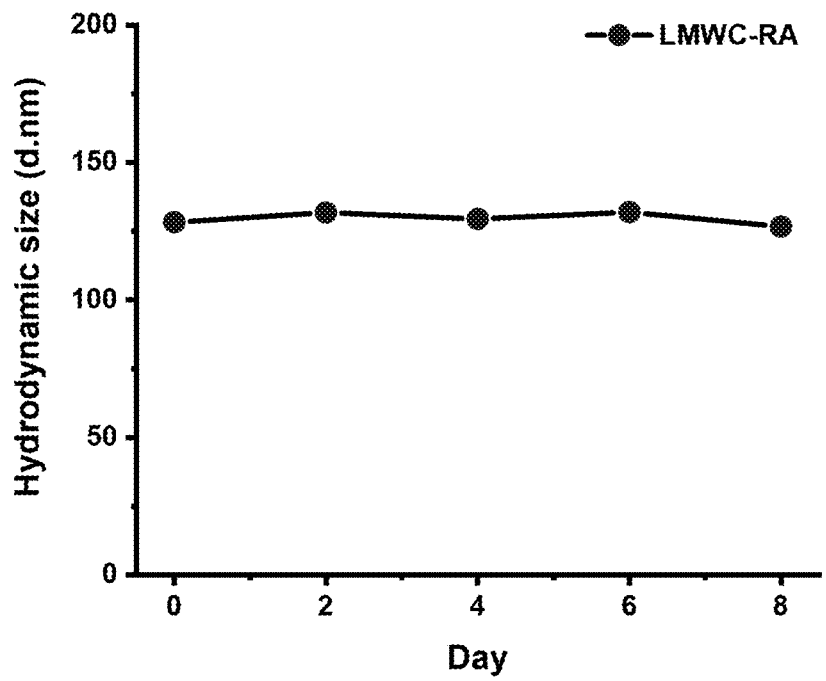

FIG. 63 shows the particle stability over time of the LMWC-RA nanoparticles of the present disclosure in an aqueous solvent.

Figure 64:
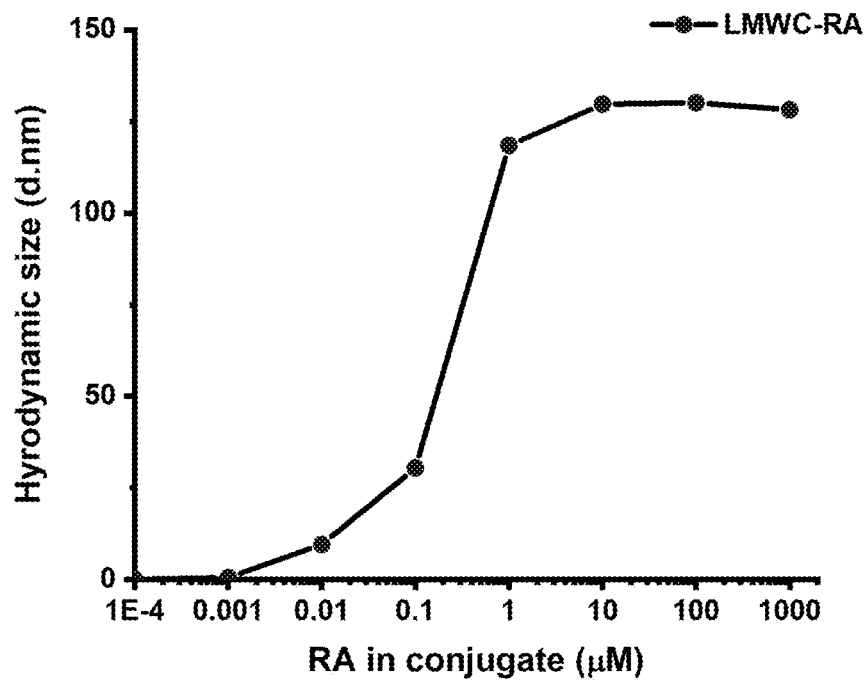

FIG. 64 shows the hydrodynamic size depending to the RA content in the LMWC-RA nanoparticles of the present disclosure.

Figure 65:
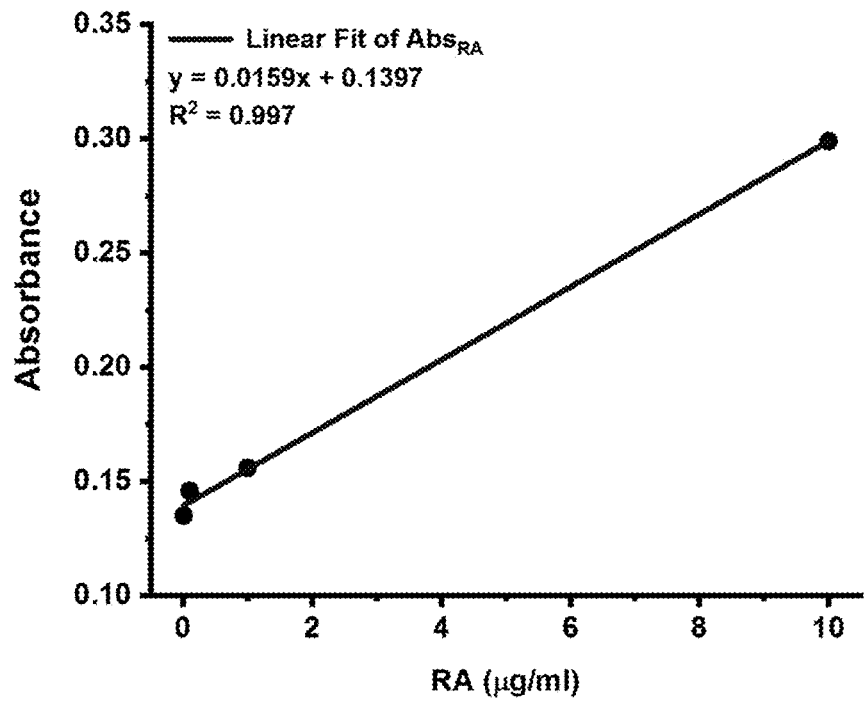

FIG. 65 shows the UV/vis absorbance spectra of the LMWC-RA nanoparticles of the present disclosure at different concentrations.

Figure 66:
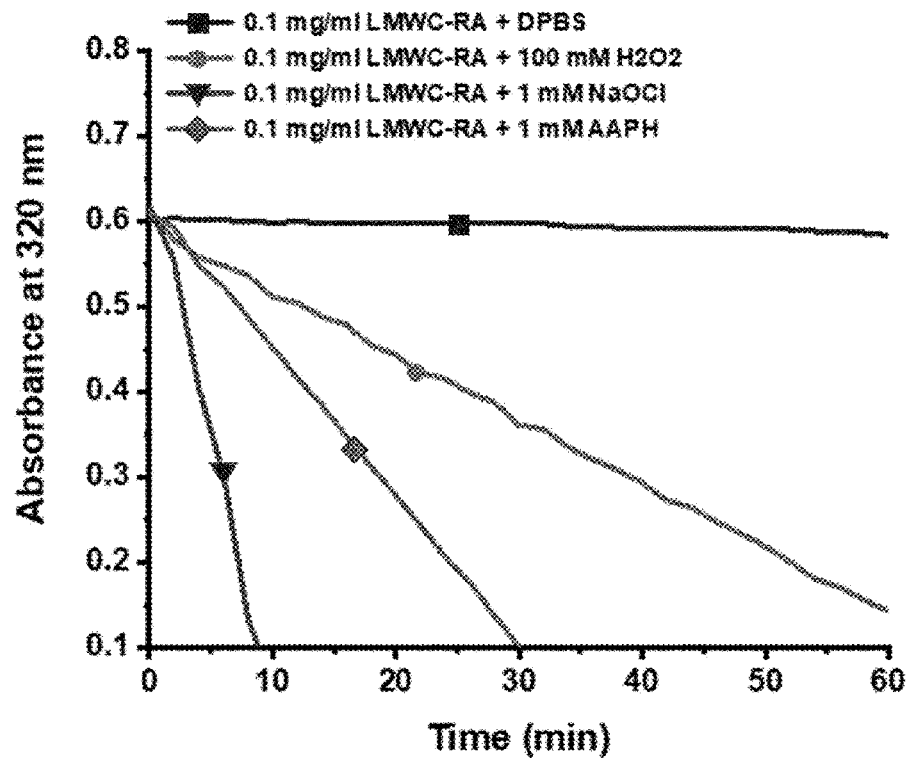

FIG. 66 shows the UV absorbance over time while the LMWC-RA nanoparticles of the present disclosure reacted with reactive oxygen species.

Figure 67:
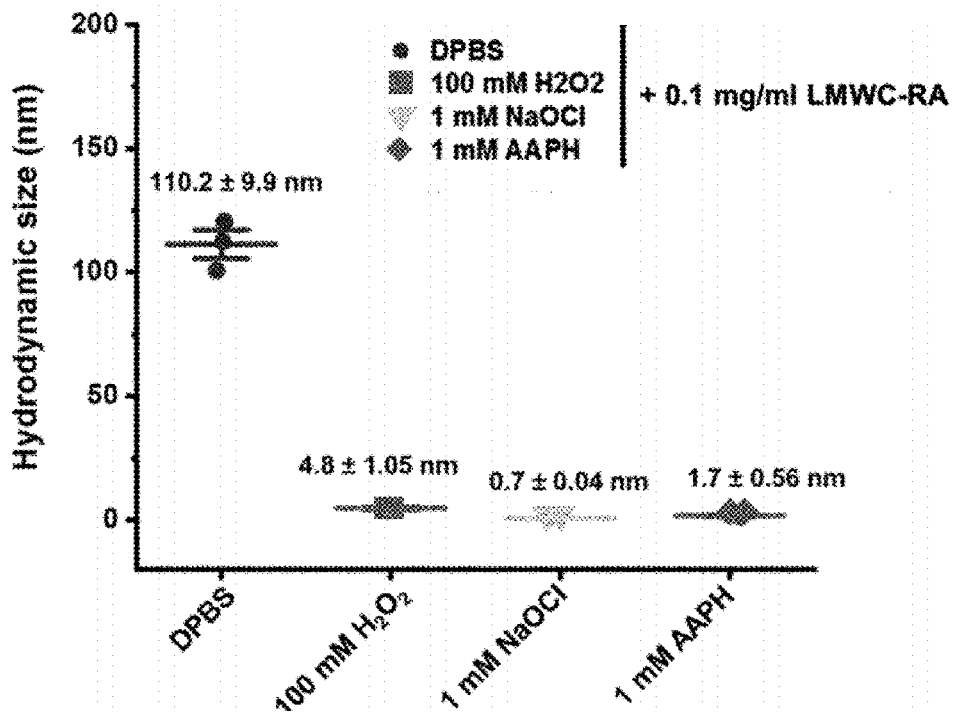

FIG. 67 shows the particle size of the LMWC-RA nanoparticles of the present disclosure after the reaction with reactive oxygen species.

Figure 68:
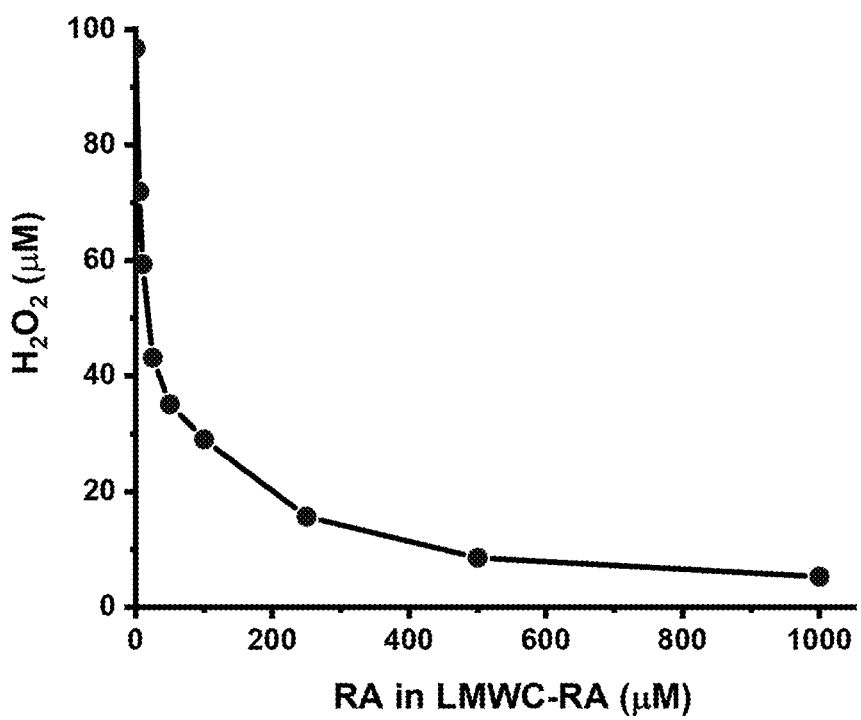

FIG. 68 shows that as the treatment concentration of the LMWC-RA nanoparticles of the present disclosure increased, hydrogen peroxide became reduced, and the concentration of hydrogen peroxide decreased.

Figure 69:
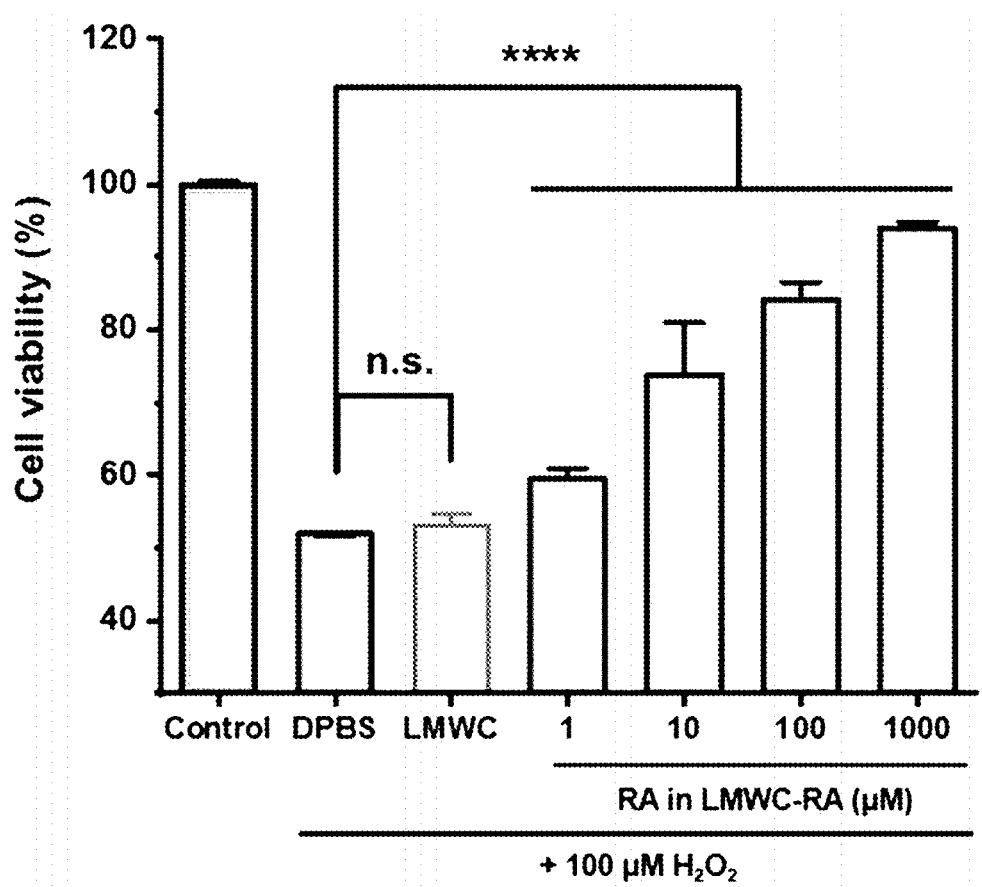

FIG. 69 shows the effect of LMWC-RA nanoparticles on inhibiting hydrogen peroxide (ROS)-caused cell damage.

Figure 70:
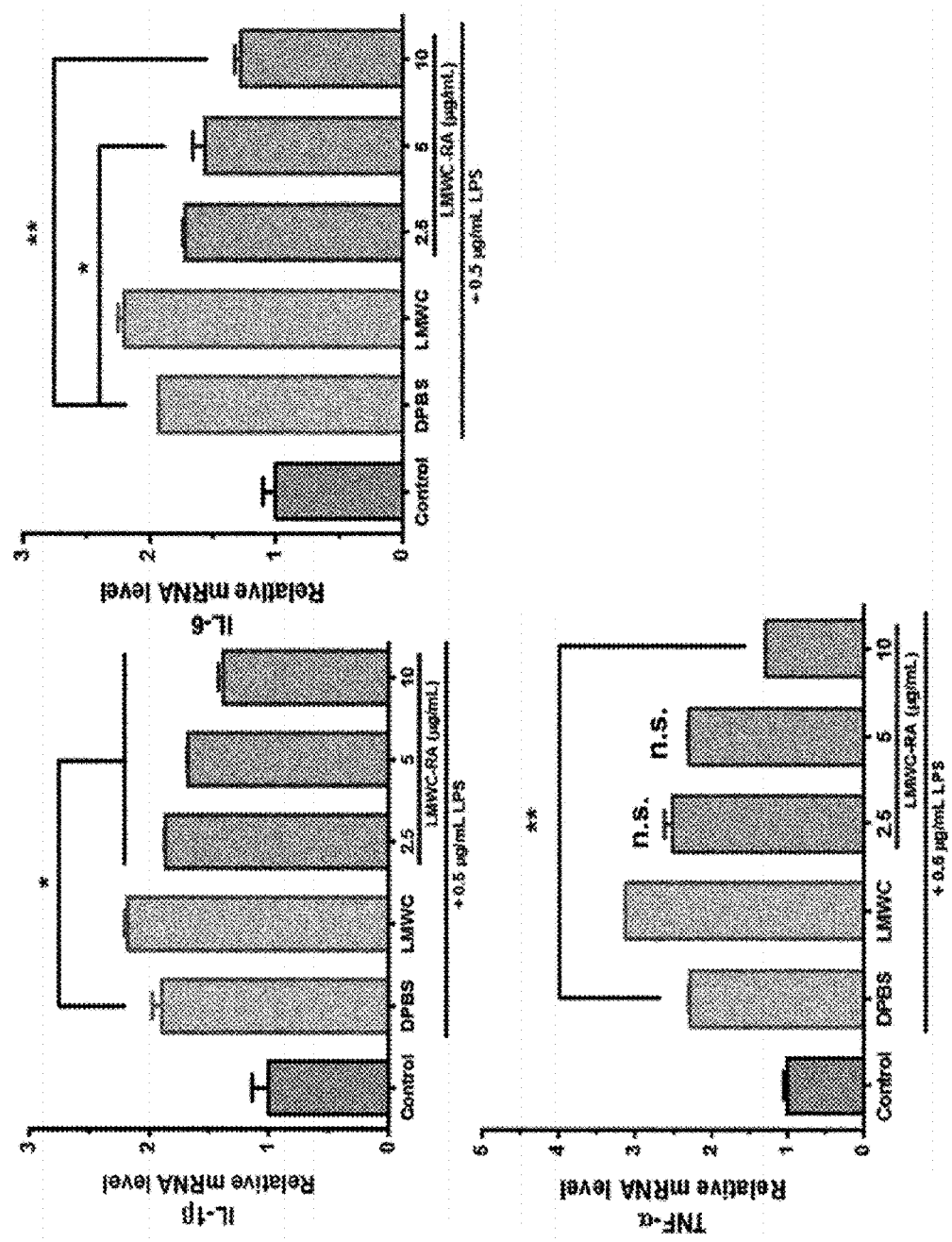

FIG. 70 shows the pro-inflammatory cytokine inhibitory effect of LMWC-RA in macrophages treated with LPS.

Figure 71:
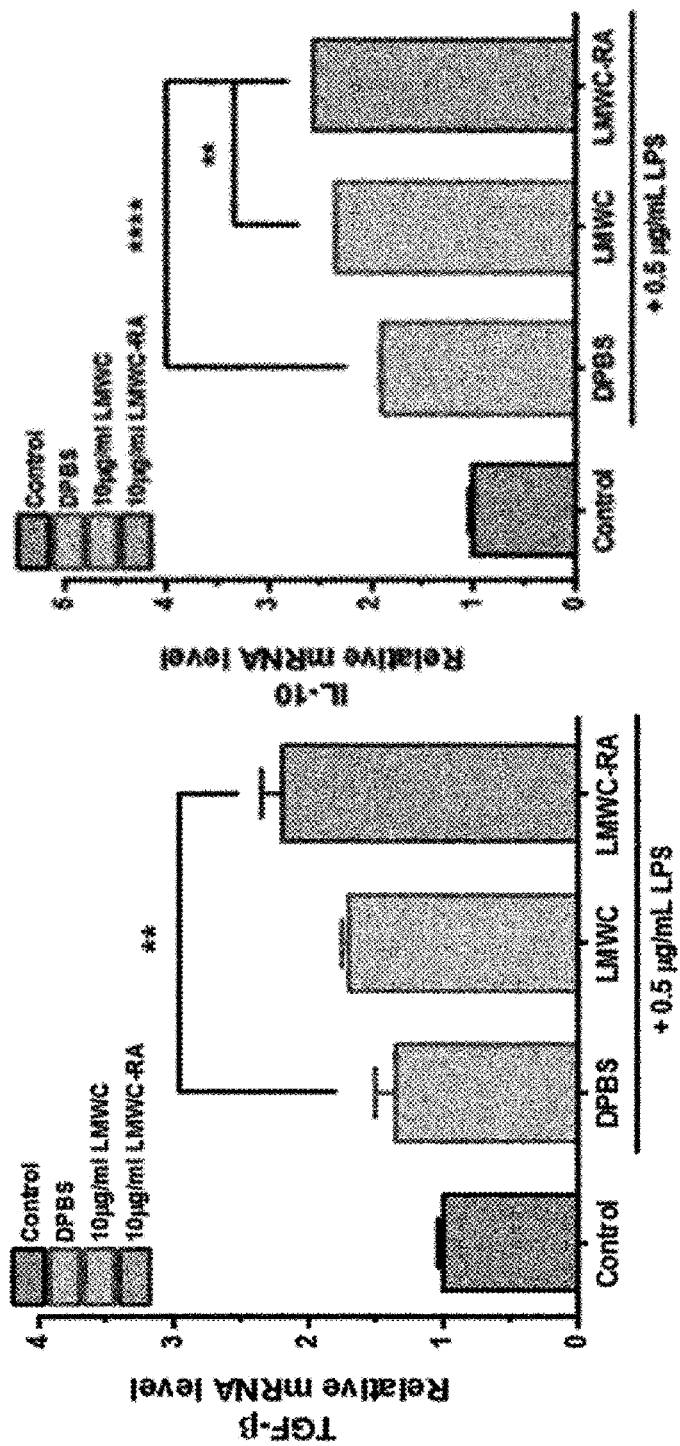

FIG. 71 shows the effect of LMWC-RA on the expression levels of the antiinflammatory cytokines TGF-beta and IL-10 In addition in LPS-treated macrophages.

Figure 72:
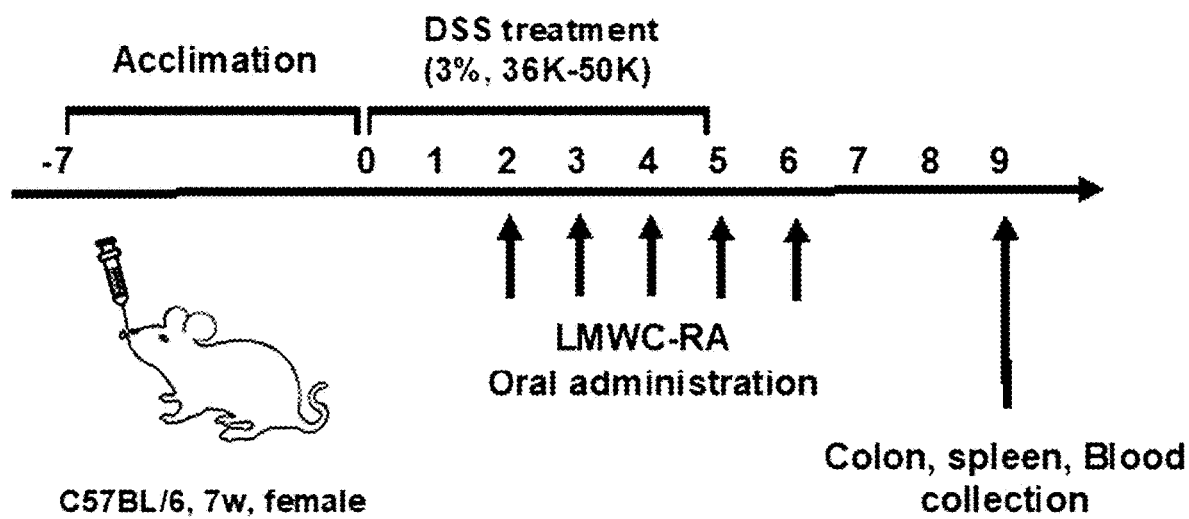

FIG. 72 shows the summary of in vivo test methods of LMWC-RA nanoparticles of the present disclosure.

Figure 73:
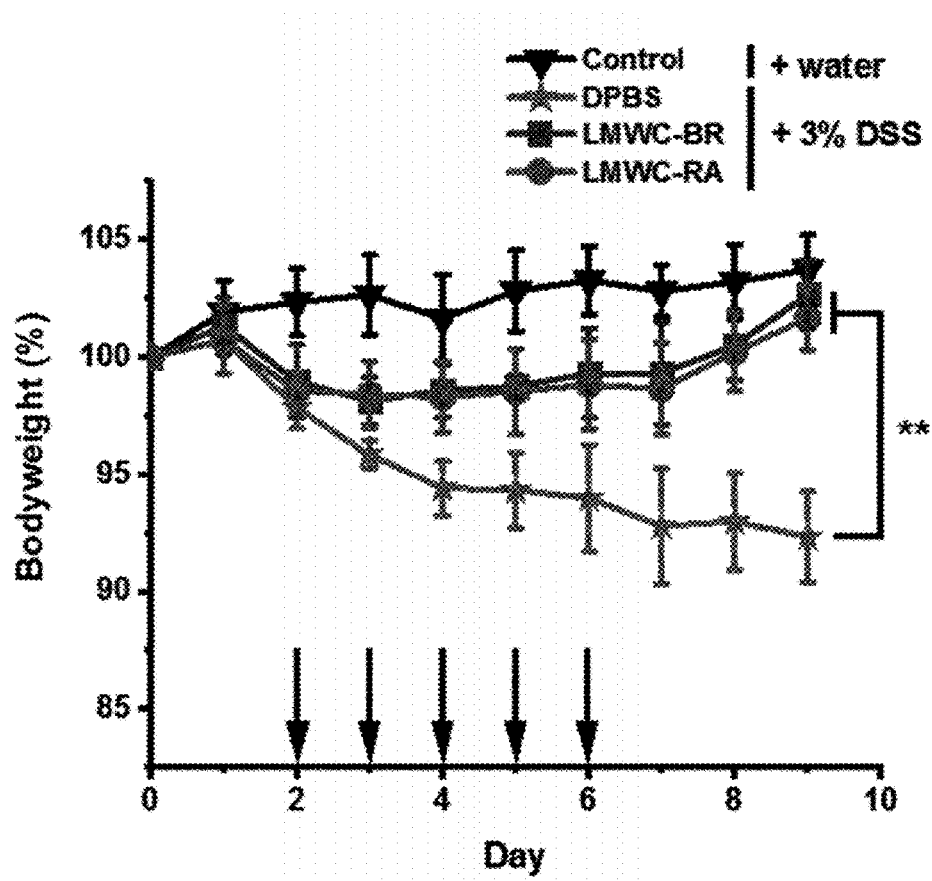
Figure 74:
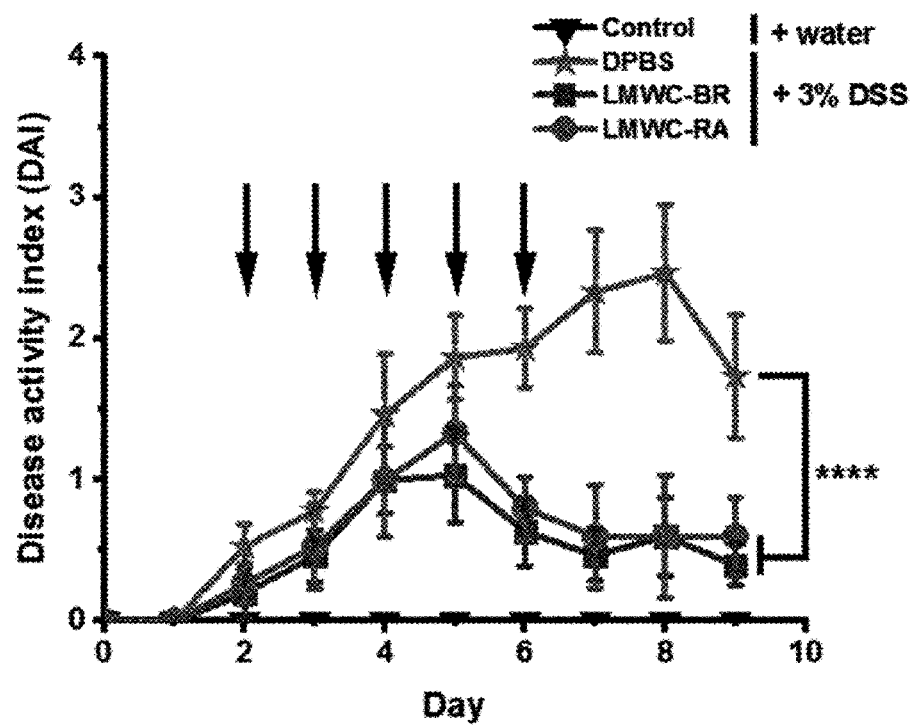

FIGS. 73 and 74 show body weight changes and DAI when the LMWC-RA nanoparticles of the present disclosure were administered to inflammatory bowel disease mouse models.

Figure 75:
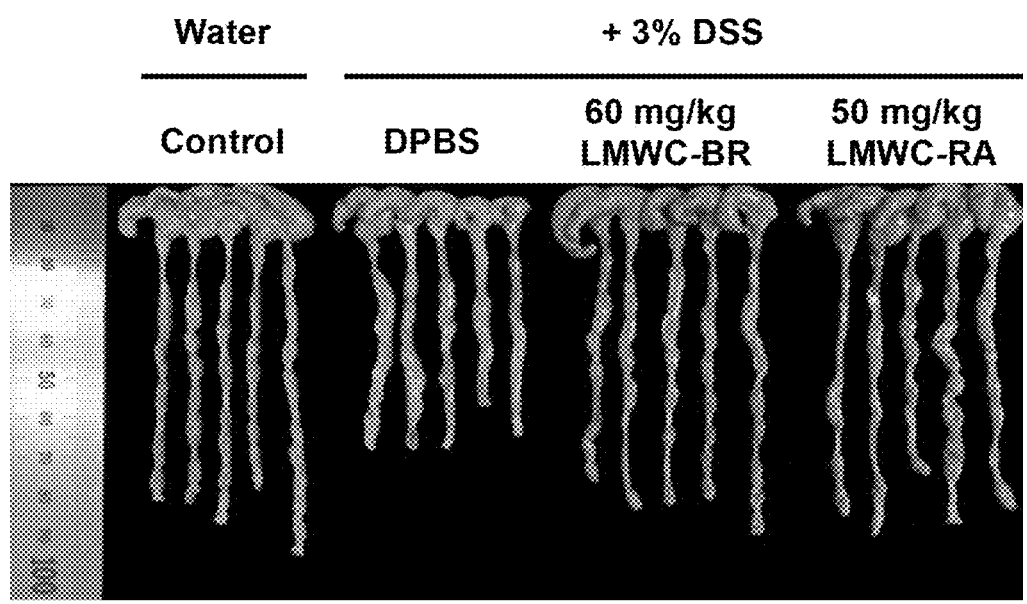
Figure 76:
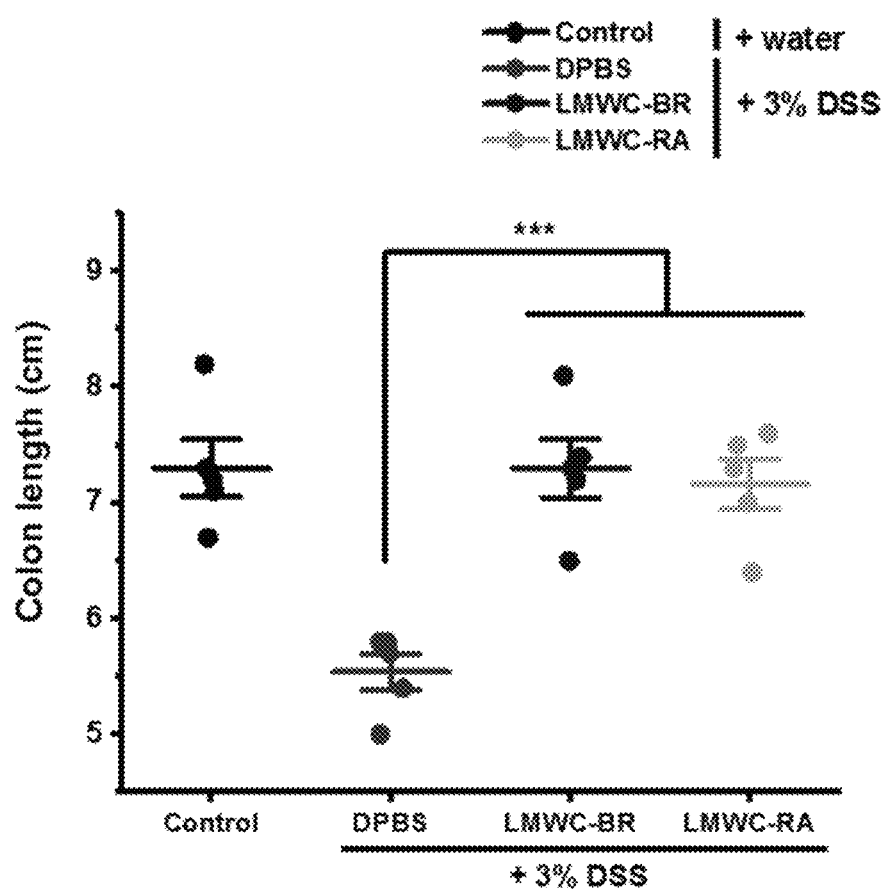

FIGS. 75 and 76 show colonic lengths when the LMWC-RA nanoparticles of the present disclosure were administered to inflammatory bowel disease mouse models.

Figure 77:
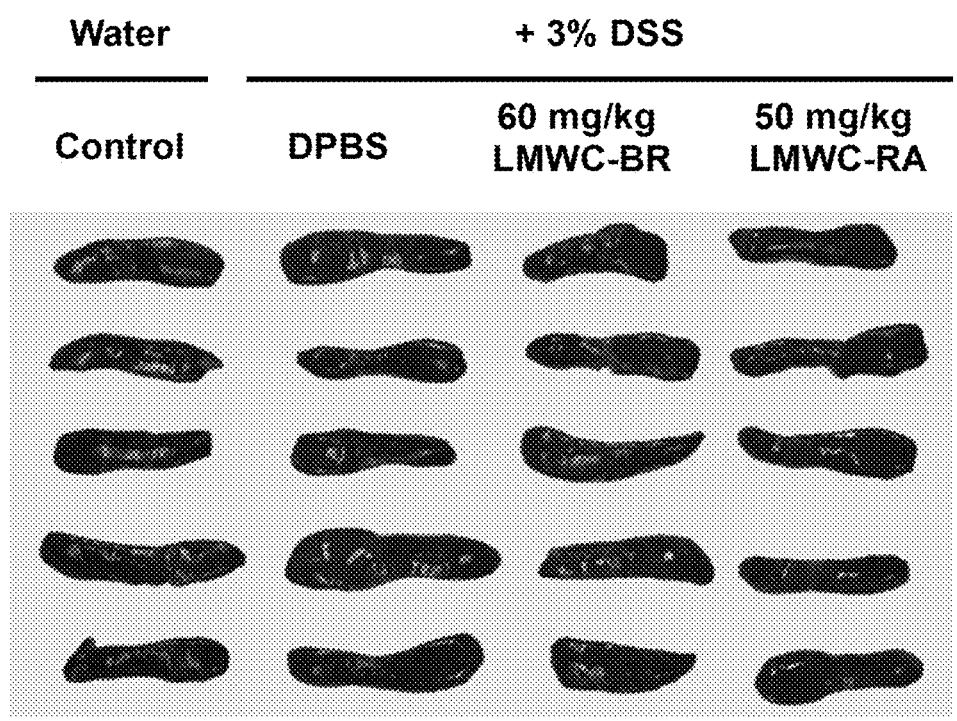
Figure 78:
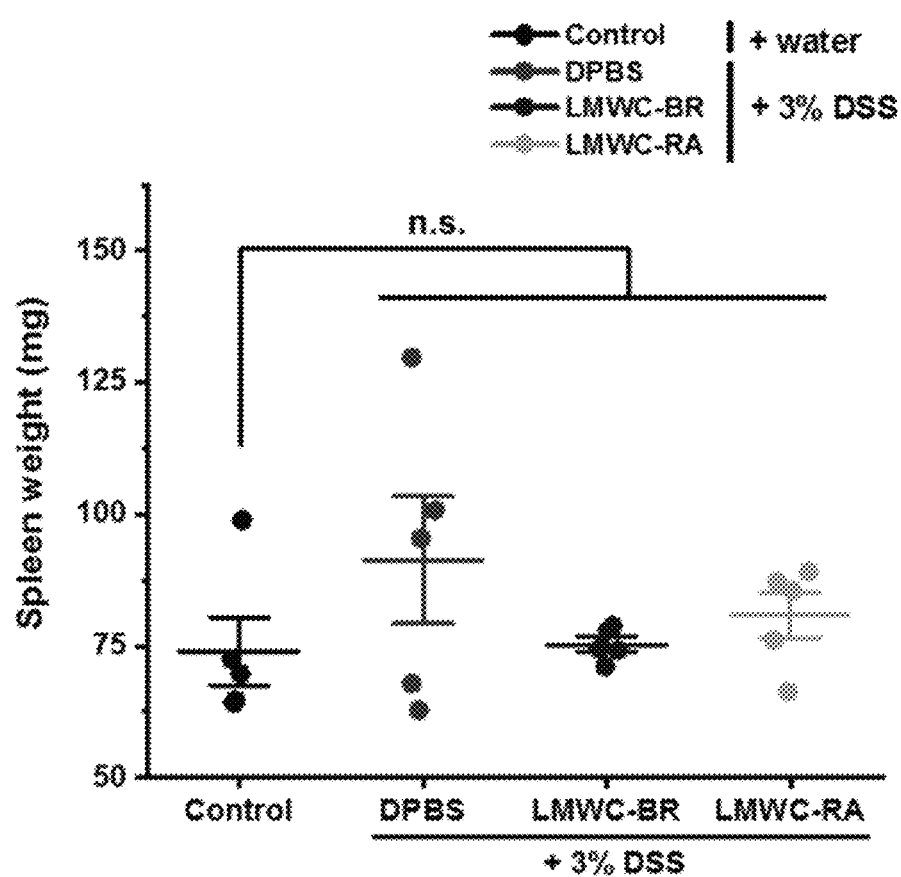

FIGS. 77 and 78 show spleen weights when the LMWC-RA nanoparticles of the present disclosure were administered to inflammatory bowel disease mouse models.

DETAILED DESCRIPTION

Hereinafter, the present disclosure will be described in more detail with reference to examples. These examples are provided only for the purpose of illustrating the present disclosure in more detail, and therefore, according to the purpose of the present disclosure, it would be apparent to a person skilled in the art that these examples are not construed to limit the scope of the present disclosure.

EXAMPLES

Throughout the present specification, the "%" used to express the concentration of a specific material, unless otherwise particularly stated, refers to (wt/wt) % for solid/solid, (wt/vol) % for solid/liquid, and (vol/vol) % for liquid/liquid.

Materials and Methods

Synthesis of PEGylated RA (PEG-RA)

Most reagents including rosmarinic acid (RA) were purchased from Sigma-Aldrich Chemical Co. (St. Louis, MO, USA), and used without further purification unless otherwise indicated. Equimolar amounts (0.28 mmol) of RA and mPEG$_{2K}$-amine (methoxy-poly(ethylene glycols amine); MW 2000) (Sunbio, Korea) were dissolved in 5 mL of dimethylformamide (DMF) together with 15 µL of N,N-diisopropylethylamine (DIPEA) (Tokyo Chemical Industry Co., Ltd, Japan). After stirring at room temperature for 10 minutes, 4-(4,6-dimethoxy-1,3,5-triazin-2-yl)-4-methylmorpholinium chloride (DMTMM) (Tokyo Chemical Industry Co., Ltd, Japan) was added to the mixture, and the reaction was carried out overnight with stirring at room temperature under a nitrogen atmosphere. The crude product was purified by silica gel chromatography using dichloromethane and methanol (10:1) to give the product (~88% yield) as a pale-yellow solid.

Characterization of PEG-RA

Then, the product was characterized by $^1$H-NMR, UV-Vis, Matrix-Assisted Laser Desorption/Ionization Time-of-Flight Mass Spectrometry (MALDI-TOF), and FT-IR spectrometry. $^1$H-NMR spectra were recorded on a Bruker Instrument Inc. AVANCE400 system at 400 MHz. Proton chemical shifts are reported in ppm (δ) relative to internal tetramethylsilane (TMS, δ0.0 ppm) or with the solvent reference relative to TMS employed as an internal standard (dimethyl sulfoxide, –d6, δ2.50 ppm).

Infrared spectra were recorded using a Nicolet iS20 Fourier-transform infrared (FT-IR) spectrometer (Thermo Fisher Scientific). UV-vis spectra were recorded on a Beckman Coulter DU-800 UV-Vis spectrophotometer. MALDI-TOF mass spectra were recorded on a Bruker Autoflex III MALDI-TOF system.

Preparation of RANPs

PEG-RA (20 mg) was dissolved in 4 mL of a 1:3 mixture (v/v) of chloroform:methanol and mixed for several minutes. The organic solvent was then removed by rotary vacuum evaporation and was further dried under a nitrogen flow for 30 minutes to yield a film layer. The film layer was suspended in 1 mL of PBS (137 mM NaCl, 2.7 mM KCl, 10 mM Na$_2$HPO$_4$, 2 mM KH$_2$PO$_4$, pH 7.4) and the resulting micelle suspension was sonicated in a bath sonicator (50 W, 40 kHz) for 10 minutes to yield uniform-sized RANPs. The micelle solution was maintained at 4° C., and directly used in the experiments below. The particle size of RANPs was analyzed by photon correlation spectroscopy (PCS) using a Nanosizer ZS90 (Malvern Instrument Ltd., Malvern, UK) equipped with 4.0 mW HeNe laser and an avalanche photodiode detector operating at 633 nm. Zeta potential was also measured at 25° C. in aqueous solutions (pH 7) by using the same equipment. The morphological characteristics of RANPs were examined using negative-staining transmission electron microscopy (TEM). Briefly, a drop of the diluted sample was placed on copper grids coated with a carbon film, stained with 0.5% w/v uranyl acetate solution, and dried at room temperature. The grids were imaged using a Tecnai F20 (FEI Co., Hillsboro, OR, USA) transmission electron microscope.

Preparation of Dexamethasone (DEX)-Loaded RANPs

A film layer of PEG-RA (4 µmol) and DEX (0.41 µmol) was obtained as described above. The film layer was hydrated with PBS (pH 7.4) and then sonicated. After sonication for 10 minutes, unloaded free DEX was removed by gel filtration using a MicroSpin G-25 column (GE Healthcare Life Sciences, Marlborough, MA, USA). The amount of loaded DEX was quantified by first treatment with 0.5% Triton-X and then measurement of DEX concentration through HPLC analysis. The separation was performed on a Poroshell 120 EC-C18 column (250×4.6 mm, i.d., 4 mm, Agilent, USA) maintained at 25° C. The mobile phase composed of an acetonitrile:10 mM phosphate buffer (30:70 v/v) at pH 7.0 was run at a flow rate of 1 mL/min. The injection volume was 50 mL and the signals were monitored using a UV detector at 235 nm. The total run time for each HPLC analysis was 40 minutes.

Cell Culture and Analysis of Cell Viability by WST-8 Assay

CHO-K1 cells were routinely cultured in RPMI-1640 medium (Welgene, Daegu, Korea) containing 10% (v/v) heat-inactivated fetal bovine serum (FBS), 100 IU/mL of penicillin, and 1% (v/v) L-glutamine. The cells were incubated at 37° C. in a humidified control atmosphere (95% air/5% CO$_2$). The medium was replaced every two days. The cells were seeded in a final volume of 50 µL in 96-well microplates at a density of 1×10$^4$ cells/well, and incubated at 37° C. for 24 hours in a humidified 5% CO$_2$ atmosphere. After the medium was removed, the cells were further incubated in i) fresh medium (control) or a medium containing ii) 100 µM H$_2$O$_2$ or iii) 50 µM H$_2$O$_2$ (added from stock solutions prepared in cell culture medium) in a final volume of 100 µL per well, with or without different concentrations of RANPs (1, 10, or 100 nM per well).

After 8 hours of exposure to RANPs and 24 hours of incubation, the metabolic activity of all the cell cultures was determined using a Quanti-MAX WST-8 assay (Biomax, Seoul, Korea) according to the manufacturer's protocol. Briefly, after incubation periods, cells were washed and 100 µL of fresh culture medium was added to each well, followed by addition of 10 µL of WST-8 assay solution. After incubation for 4 hours, the absorbance was measured at 450 nm using a 96-well microplate reader. Data are expressed as mean±SD. The significance of differences in cell proliferation (WST-8 assay) between cells treated with RANPs and control was determined by analysis of variance (ANOVA) with Dunnett's post hoc test.

Animals

Female C57BL/6 mice aged 6 weeks were obtained from Orient Bio, Inc. (Seongnam, Korea) or Samtaco Bio, Co. (Osan, Korea). All animals were housed under pathogen-free conditions in the animal facility at the Korea Advanced Institute of Science and Technology (KAIST) under a 12-hour light/dark cycle at a constant temperature of 22±1° C. and indoor relative humidity of 45-53%. Water and food (Teklad Global Rodent Diets, 18% protein [2018S]; Envigo, Madison, WI, USA) were provided ad libitum. The mice were acclimatized for 1 week before experiments. After 1 week, the mice weight was 18-20 g. The mice were randomly assigned to each experimental group and allocated to a maximum of five per cage. All surgeries were performed under isoflurane anesthesia, and every effort was made to minimize pain. All the animal experiment procedures were approved to comply with ethical procedures and scientific management by (KAIST-IACUC) (approval number: KA2019-16).

In Vivo Biocompatibility Study

The in vivo toxicity of RANPs was evaluated in mice after a 7-day treatment. Body weight changes were recorded daily after treatment with RANPs, and sections of major organs (heart, liver, lung, spleen, and kidneys) were prepared and H&E-stained for histological evaluations. Untreated healthy mice were used as a control.

Induction of In Vivo Colitis Model

Experimental colitis was induced by feeding mice with drinking water containing 3% (w/v) dextran sulfate sodium salt (DSS; MW 36,000-50,000, colitis grade; MP Biomedicals, Santa Ana, CA, USA) ad libitum, starting from day 0 for 5 days, followed by changing to regular drinking water for additional 5 days. Mice of each group were monitored carefully daily to investigate whether they had consumed an approximately equal volume of DSS-containing water. Body weights and diarrhea signs in the mice were recorded daily.

Assessment of In Vivo Antiinflammatory Effects of RANPs

For each experiment, mice were divided into five experimental groups (n=5/group). The first group was maintained as a control (normal water), and the second group received only DSS-containing drinking water for experimental periods. In the third group, the mice received 3% DSS, and were orally or intravenously injected with PBS or RANPs (10, 20, or 30 mg/kg/d) once every two days for 10 days according to the experimental design. Administration of PBS or RANPs was initiated simultaneously with DSS treatment. DAI, which is a clinical activity metric reflecting the combined scores for body weight loss, rectal bleeding, and stool state, was determined daily during the experiment according to a standard scoring system.

The score for each parameter was defined as follows:

(1) Body weight: 0, no weight loss; 1, 1-5% weight loss; 2, 5-10% weight loss; 3, 10-20% weight loss, and 4, >20% weight loss.

(2) stool state 0: well-generated pellets; 2, loose stools that do not stick to the anal region; and 4, liquid stool sticking to the anal region.

(3) Bleeding evaluation 0: no bleeding; 2, blood marks are clearly visible in the stool; 4, visible rectal bleeding.

On the day of sacrifice (day 10), the mice were deprived of food for 4-8 hours. All the mice were sacrificed under isoflurane anesthesia, and then, the entire colon was resected, imaged, minced and subjected to biochemical analyses.

The colon length was measured by separating the colon and cecum first from the small intestine at the ileocaecal junction and from the anus at the distal rectum. Then, the colon was separated from the cecum (at the ileocecal junction) and washed thoroughly several times with ice-cold PBS using a 10 mL syringe with an attached 23 G needle until free of fecal matter and blood. The colon was straightened without stretching, and its length was measured using a ruler or Vernier calipers (stretching was avoided as DSS administration leads to swelling and shortening of the colon).

For colonic MPO assays and measurement of pro-inflammatory cytokine levels, colonic tissue was weighed (50 to 100 mg), and homogenized in 0.5% hexadecyltrimethylammonium bromide dissolved in 50 mM PBS (pH 6.0), using a TissueLyserII (Qiagen, Germany) with tungsten carbide beads (3 mm diameter) at 30 Hz for 5 minutes. The resulting samples were freeze-thawed three times at −80° C. and 37° C., respectively, and sonicated for 10 seconds, to obtain a homogenous tissue suspension, followed by centrifugation for 10 minutes at 20,000×g (4° C.).

Colonic MPO activity was measured using an assay kit (Biovision, Milpitas, CA, USA) according to the manufacturer's indication, and expressed as units per milligram protein (U/mg). Levels of TNF-α, IFN-γ, IL-1β, IL-6 and IL-12 in the tissue were measured using ELISA kits for mice (DY410 for TNF-α, DY485 for IFN-γ, DY401 for IL-1β, DY-406 for IL-6, DY-419 for IL-12; R&D Systems, Minneapolis, MN, USA) according to the manufacturer's protocols. For histological analysis, colon tissue sections were H&E stained and scored. Briefly, a portion of the distal colon was first incubated with 4% (v/v) buffered formalin and 70% (v/v) alcohol, then fixed and embedded in paraffin. Tissue sections of the distal colon were prepared, stained with H&E, and analyzed under a microscope. A score of 0-3 was given to infiltration of inflammatory cells, and a score of 0-3 was given to tissue damage.

Preparation of ICG-Encapsulated RANPs

Indocyanine green (ICG, Cardiogreen)-encapsulated RANPs were generated by forming a film layer of PEG-RA (20 mg) as described above and adding a solution of PBS (pH 7.4) containing 1-2 μmol of indocyanine green (ICG, Cardiogreen) dropwise with stirring, and thereafter, sonication was conducted using a bath sonicator for 10 minutes (frequency, 40 kHz; power, 50 W).

ICG-encapsulated RANPs were then washed three times, and unloaded free ICG was removed by gel filtration using a MicroSpin G-25 column (GE Healthcare Life Sciences). The amount of ICG in RANPs was quantified by first treating ICG-encapsulated RANPs with 0.5% Triton-X and then measuring the ICG concentration using a fluorescence microplate reader (Spark multimode microplate reader; Tecan, Switzerlans).

$$EE(\%) = \left(1 - \frac{Csup}{Ctot}\right) \times 100(\%)$$

$C_{sup}$ is the concentration of ICG in the supernatant, and $C_{tot}$ is the total amount of ICG added at the beginning of the manufacturing process.

Confirmation of Specific Accumulation of Fluorescently Labeled Liposomes at Injury Site ICG-encapsulated RANPs were administered intravenously to DSS-untreated (score 0) and DSS-treated (score 4) mice. Five hours after the administration, mice were sacrificed and the major organs (colon, kidneys, liver, spleen, lung, and heart) were collected. The fluorescence intensities of the organs collected from each group were measured and calculated using the Xenogen IVIS Spectrum in vivo imaging system (PerkinElmer, Waltham, MA, USA).

Pharmacokinetic Analysis of RANPs in Mice by HPLC

Thirty female mice (C57BL/6, aged 7 weeks) were randomly divided into 10 groups (n=3 mice/group). Before drug administration, animals were allowed free access to feed and water for 7 days. Each group was administered RANPs through retro-orbital injection at a single intravenous dose of 30 mg/kg. Blood samples (approximately 0.4 mL) from each mouse were collected from the inferior vena cava into 1.5 mL heparinized tubes 0, 5, 10, 15, 30, 60, 120, 240, 480, 720, and 960 minutes after intravenous injection. Blood samples were cooled at 4° C. for 2 hours, and then centrifuged at 12,000 rpm for 10 minutes, thereby isolating plasma from blood. The collected plasma was transferred to 1.5 mL micro-centrifuge tubes, and stored at −20° C. for analysis. Before analysis, plasma samples were deproteinized by transferring a 200-µL aliquot of plasma to a 1.5-mL polypropylene tube and adding 1 mL of acetonitrile. The mixture was shortly vortexed (~10 seconds) and then centrifuged at 13,000×g for 5 minutes. The supernatant was evaporated under vacuum, and the residue was reconstituted in 100 µL of mobile phase (acetonitrile: 0.1% formic acid=88:12 v/v), vortexed for 10 seconds, and transferred to a plastic insert with an amber glass autosampler vial. The sample (30 µL) was injected into the HPLC system for analysis (flow rate: 1 mL/min). Pharmacokinetic parameters were estimated using PKsolver employing the non-compartmental model.

Statistical Analyses

All statistical analyses were performed using SPSS statistical software (IBM SPSS Statistics version 25.0, SPSS Inc., Chicago, IL, USA). The results are expressed as means±SD (standard deviation) of triplicate experiments. A one-way ANOVA test of multiple comparisons followed by Dunnett's post-hoc test was used in all analyses.

Example 1: Synthesis of PEG-RA and Preparation of RANPs

Figure 1:
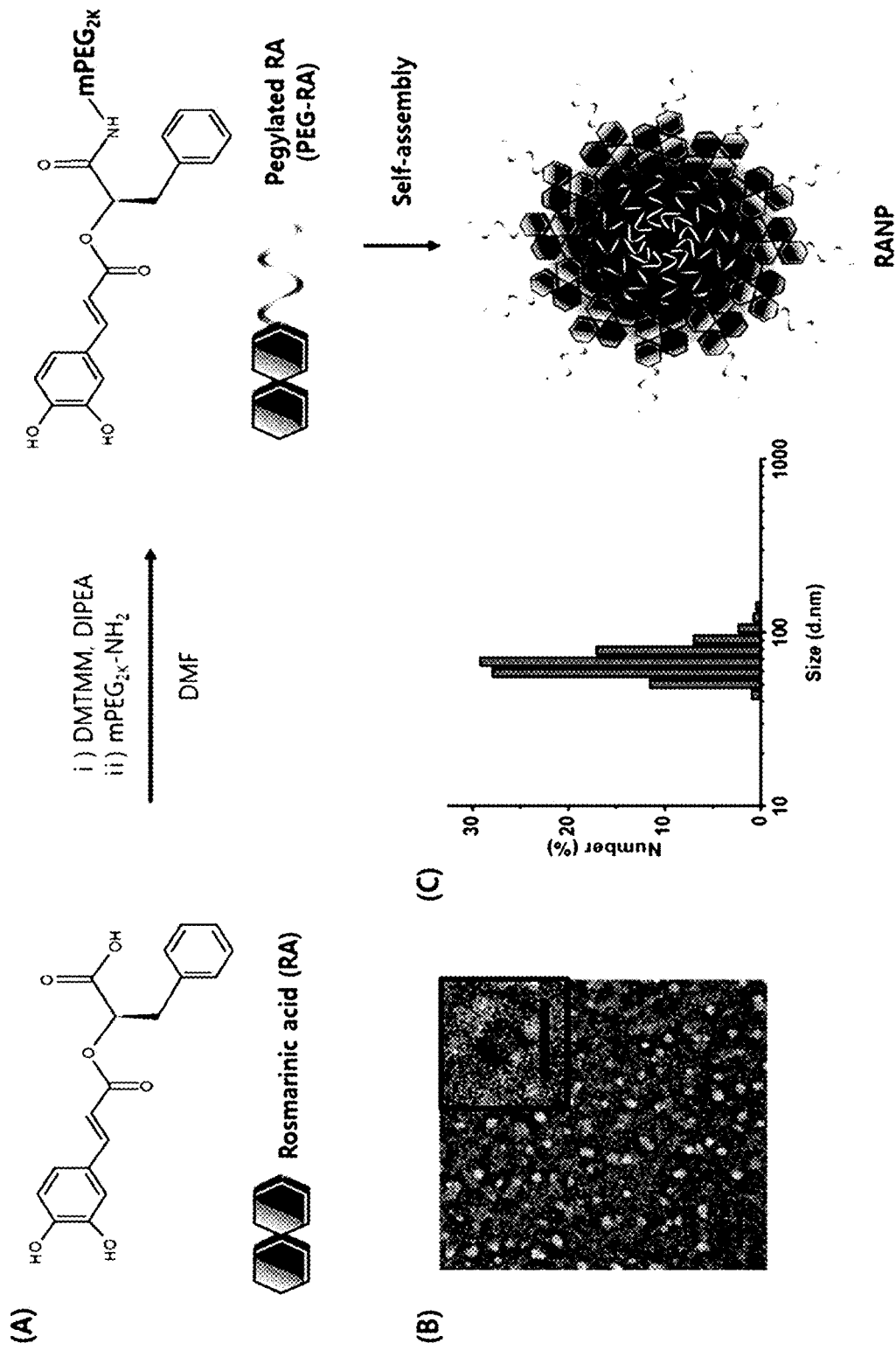
FIG. 1 shows a synthesis scheme for characterization of PEG-RA and RANPs. (A) Chemical structure of RA and PEGylated RA (PEG-RA). Synthesis of PEG-RA starting from free RA and free mPEG$_{2000}$-amine through amide binding, and formation of RANPs through self-assembly from PEG-RA in PBS. (B) Representative TEM image with negative staining. Insert: Enlarged image of an individual RANP. Scale bars: 100 nm. (C) Size distribution of RANPs, determined by measuring hydrodynamic diameter using DLS. Particle size ranged from 40 to 120 nm (average, ~60 nm).
Figure 2:
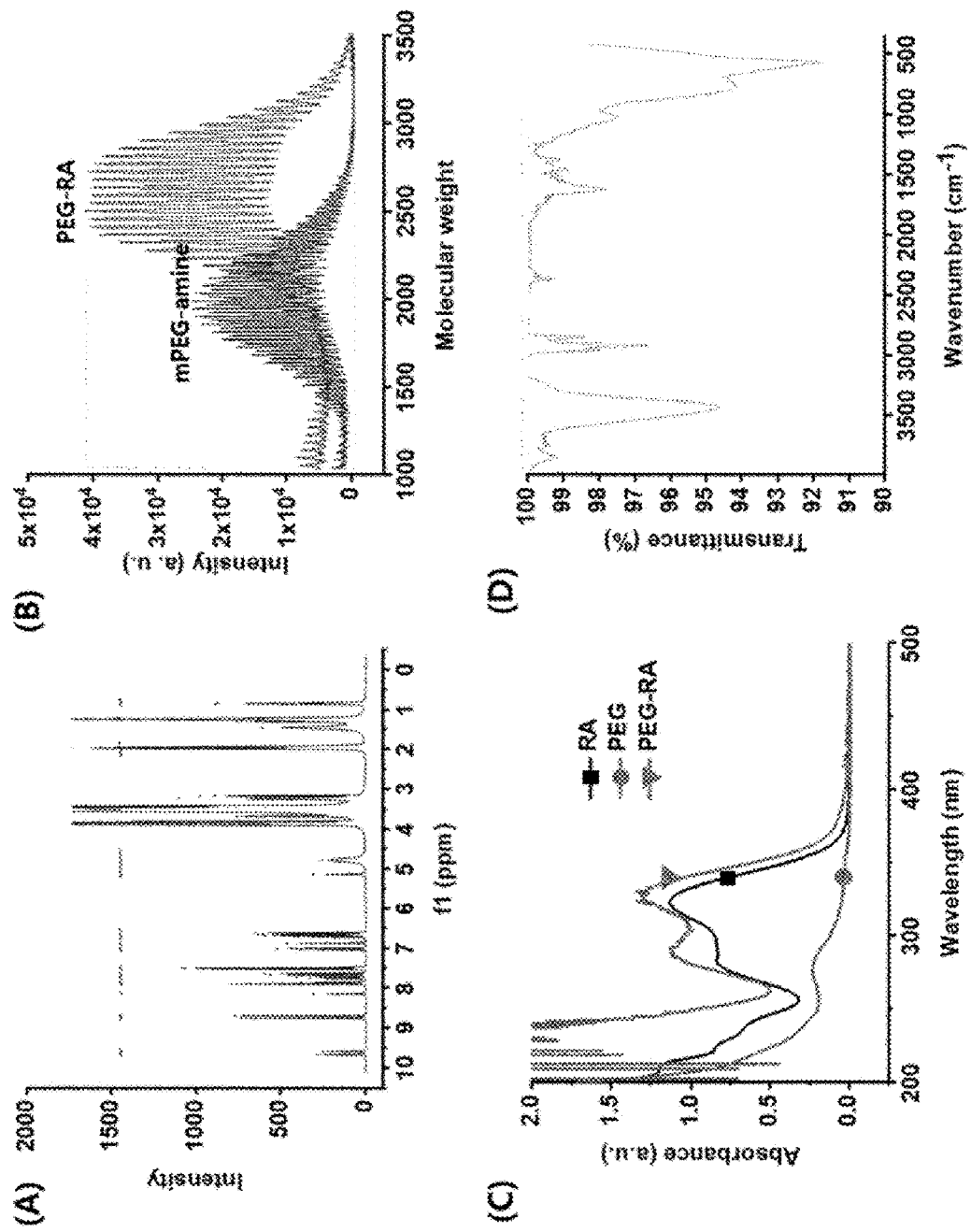
FIG. 2 shows characterizations of PEG-RA. (A) $^1$H-NMR spectrum of PEG-RA in DMSO-d6. (B) MALDI-TOF/MS spectra of mPEG2K-amine and PEG-RA. (C) UV-vis absorbance spectra: RA (25 µg/mL), mPEG-amine (10 mg/mL), and PEG-RA (0.1 mg/mL). (D) FTIR spectrum of PEG-RA.
Figure 3:
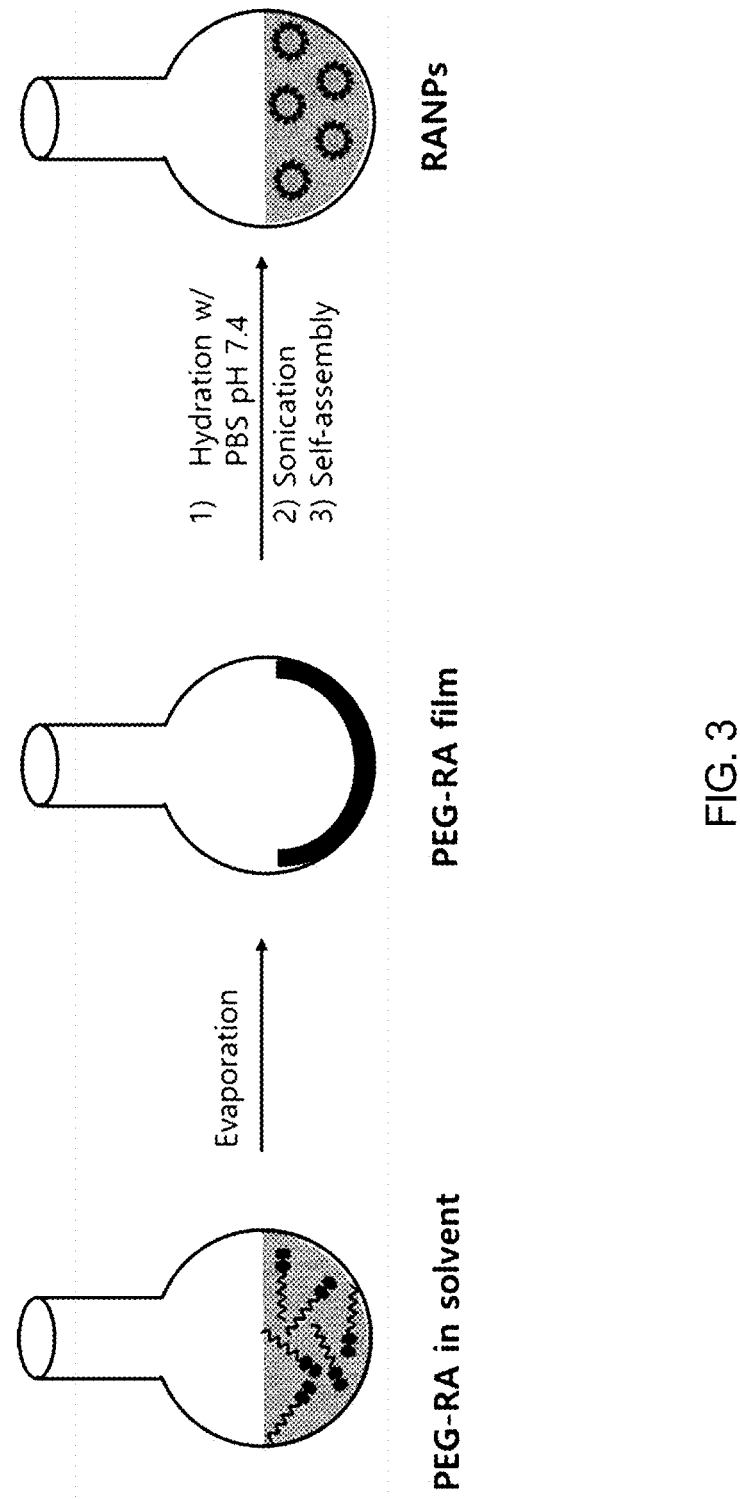
FIG. 3 is a schematic diagram of RANP formation by a film-formation and rehydration method. Chloroform containing PEG-RA (1-2 mol %) was evaporated under a vacuum or dried by complete removal of an organic solvent using nitrogen gas, to yield a film layer. Then, PBS buffer was added to the film layer to hydrate the film layer, followed by sonication, yielding RANPs.

PEG-RA was synthesized via one-step amide coupling chemistry between a PEG-containing amine and the carboxylic acid group in RA (FIG. 1A). Characterization by $^1$H NMR, FT-IR, MALDI-TOF mass spectrometry, and UV-vis spectrophotometry clearly supported the successful synthesis of PEG-RA (FIG. 2). Next, RANPs were prepared by using a film-formation and rehydration method (FIG. 3). The prepared RANPs were measured in TEM images, and showed a spherical morphology with a diameter of 63.5±4.0 nm (mean±S.D.; n=156 nanoparticles) (FIG. 1B).

The hydrodynamic size and zeta potential of RANPs in phosphate buffer solution (pH 7.4), measured by dynamic light scattering (DLS), were 67.5±3.5 nm and −33.70 mV, respectively, indicating the exposure of the PEG layer on the surface of nanoparticles (FIG. 1C and Table 1).

TABLE 1

| Sample | Zeta potential (mV) | Mobility (µm cm/Vs) | Conductivity (mS/cm) | Polydispersity index (PDI) | Particle size (nm) |
|---|---|---|---|---|---|
| Rosmarinic acid (RA) | −15.53 | −1.217 | 24.10 | — | — |
| mPEG-amine | −8.77 | −4.975 | 0.319 | — | — |
| RANPs | −33.70 | −0.688 | 24.76 | 0.580 | 67.53 |

Figure 4:
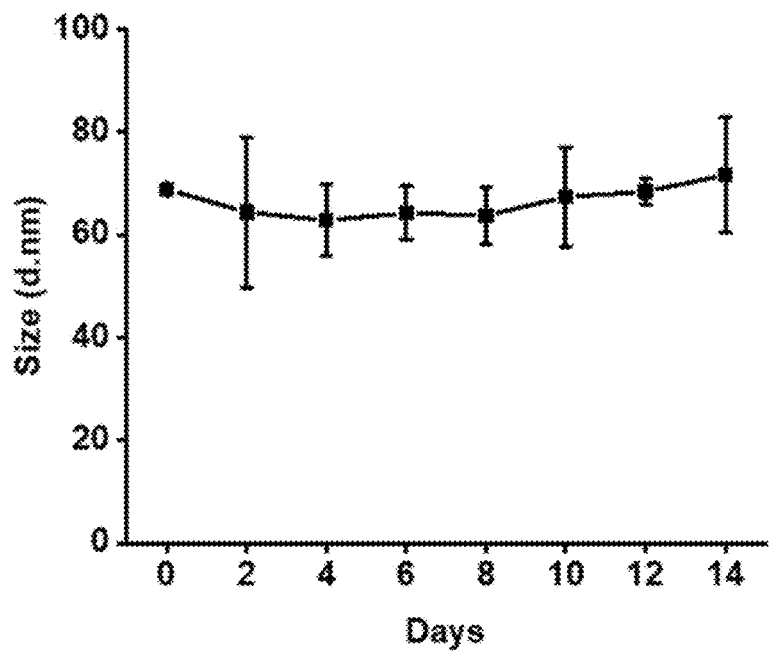
FIG. 4 shows particle size and stability data for RANPs in PBS (pH 7.4) during storage for 14 days at 4° C., measured by DLS.
Figure 5:
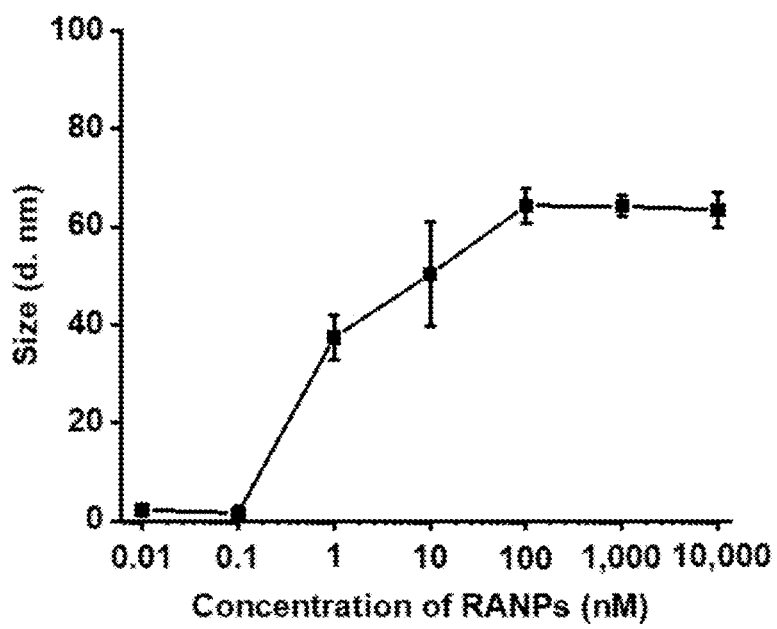
FIG. 5 shows the determination of the critical micelle concentration of RANPs in PBS (pH 7.4) at 25° C. The scattering intensity of the polymer aqueous solution was investigated over a concentration range of 0.01-10,000 nM.
Figure 6:
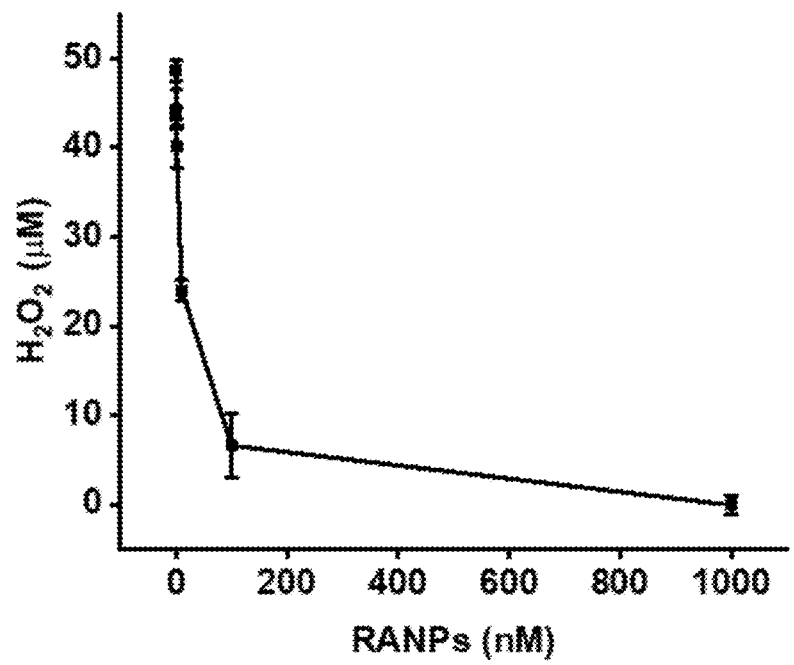
FIG. 6 shows the in vitro cytoprotective effect of RANPs through ROS scavenging, and indicates the evaluation of antioxidative ability of RANPs by measuring $H_2O_2$ scavenging activity. By measuring the fluorescence intensity using HRP/dye reagent, the concentration of $H_2O_2$ remaining after treatment with $H_2O_2$ (50 µM) and RANPs at different concentrations (1-1000 nM) for 40 minutes was quantified.

The size of RANPs was maintained to be unchanged even after 14 days of incubation (FIG. 4), indicating high colloidal stability. RANPs could be formed at concentrations greater than 1 nM (FIG. 5), indicating an ultra-low critical micelle-formation concentration.

Example 2: Antioxidative Effects of RANPs Against Reactive Oxygen Species (ROS)

Next, the present inventors examined whether RANPs prepared by self-assembly of individual PEGylated RA molecules retained the RA's ability to scavenge ROS. Hydrogen peroxide ($H_2O_2$) was selected for this purpose since it is one of the most common endogenous ROS types.

As shown in FIG. 2A, the amount of remaining $H_2O_2$ sharply decreased upon incubation with an increasing amount of RANPs; and ~100 nM of nanoparticles are sufficient to scavenge several tens of micrometers of $H_2O_2$, and thus show strong antioxidative ability of RANPs. Then, it was examined whether RANPs could protect cells from ROS-induced damage by incubating Chinese hamster ovary cells (CHO-K1) with RANPs for 8 hours and then treating them with 50 or 100 µM $H_2O_2$.

Figure 7:
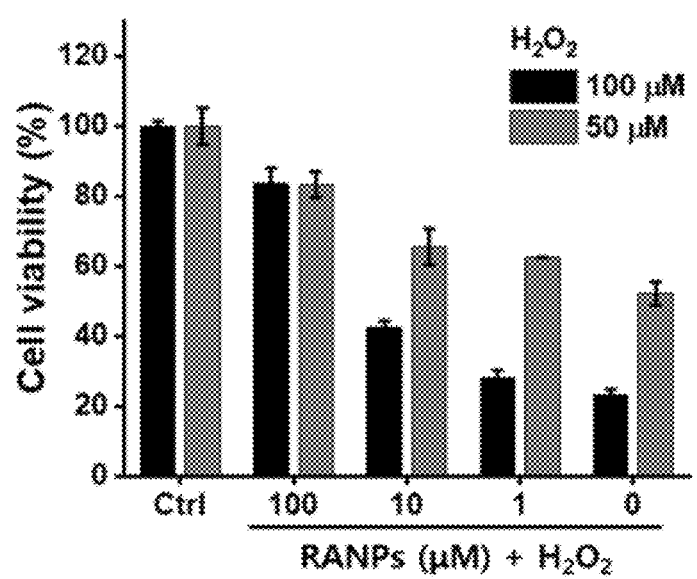
FIG. 7 shows the in vivo cytoprotective effect of RANPs through ROS scavenging, and indicates the cytoprotective effect of RANPs on $H_2O_2$-treated CHO-K1 cells, normalized to controls (culture media). Cells were treated with different concentrations of $H_2O_2$ (50 and 100 µM) and RANP (0, 1, 10, and 100 µM), followed by 24-hour-incubation, and then the cell viability was determined by WST-8 assay.
Figure 8:
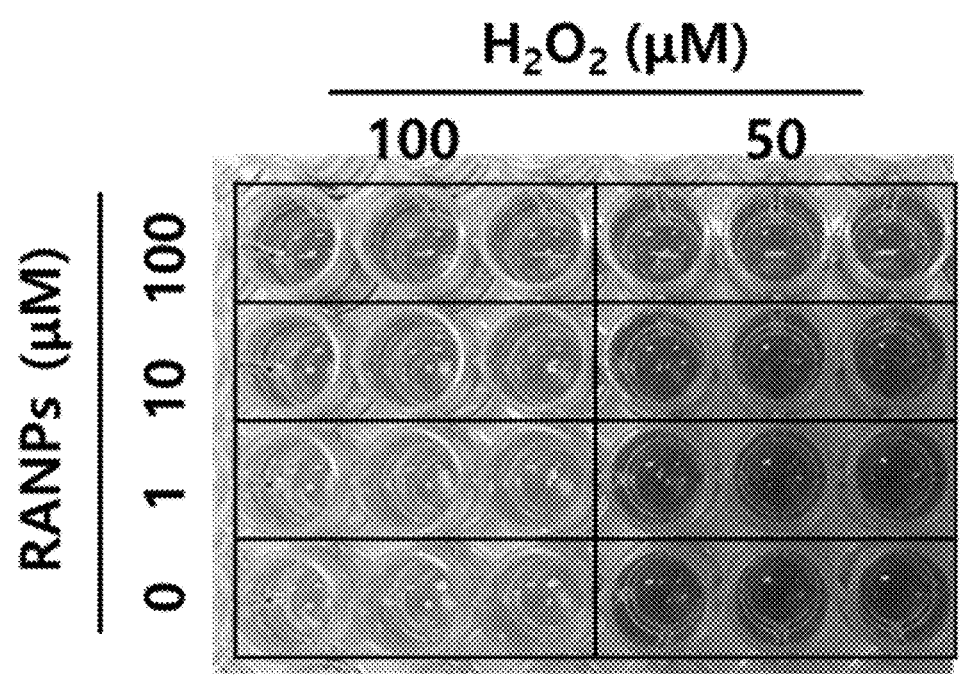
FIG. 8 is an image of WST-8 analysis results showing the cytoprotective effect of RANPs.

The viability assay results showed that cell proliferation was substantially reduced in $H_2O_2$-treated cells, but was significantly restored in the presence of RANPs, which acted in a concentration-dependent manner to restore viability to almost control levels (FIGS. 7 and 8). These results showed that the RANPs of the present disclosure exerted intrinsic antioxidative ability, and thus can protect cells from oxidative damage.

Example 3: Disruption of RANPs in Response to ROS

Since RA may be chemically modified and fragmented into smaller compounds upon reaction with ROS, the present inventors examined whether RANPs become disrupted or disintegrated upon oxidation by measuring the size of RANPs by means of DLS following the incubation with different concentrations of $H_2O_2$ for 10 minutes.

The size of RANPs decreased dramatically with increasing concentrations of $H_2O_2$, so that few nanoparticles remained at the highest concentration of $H_2O_2$ tested (10 mM) (FIG. 9), indicating the disruption or disintegration of nanoparticles in response to ROS. These results indicate that RANPs have the potential for use as a ROS-responsive drug-delivery vehicle. To further explore this possibility, the present inventors performed a drug-loading study by using the same film-formation and rehydration method in which dexamethasone used as a model drug was used in the preparation of drug-unloaded, naked RANPs.

According to the high-performance liquid chromatography (HPLC) analysis, approximately ~16.5 wt % of dexamethasone was loaded into RANPs, indicating that RANPs of the present disclosure have the potential to be used as a drug-delivery carrier.

Example 4: Pharmacokinetics of RANPs After Intravenous Injection in Normal Mice RANPs having high colloidal stability are expected to have a much longer circulation in blood than the parent small molecule RA, which is usually excreted from the body within ~30 minutes. To test this, the present inventors performed pharmacokinetic studies of RANPs in normal mice.

TABLE 2

| Parameter | Value |
|---|---|
| $AUC_{0-\infty}$ (μg h/mL) | 278.953 |
| MRT (h) | 3.919 |
| $t_{1/2}$ (h) | 2.912 |
| Cmax (μg/ml) | 175.798 |

AUC, area under the curve;
MRT, mean residence time;
$t_{1/2}$, elimination half-life;
Cmax, maximal concentration The mean plasma concentration-time curve of RANPs measured after intravenous injection in mice at a dose of 30 mg/kg (equivalent to 4.58 mg RA/kg) is shown in FIG. 11, and the corresponding pharmacokinetic parameters are presented in Table 2. Compared with previously reported reference pharmacokinetics, RANPs, which were determined in rats following intravenous injection of free RA at a dose of 0.625 mg/kg, showed a much greater area under the curve (AUC) (3,667.5 versus 245.4 min·mg/mL) and a much longer circulation (or elimination) half-life ($t_{1/2}$) (174.7 versus 42.9 minutes) and mean residence time (MRT) (254.1 versus 50.1 minute) in blood. In each case, these pharmacokinetic values were at least 4-fold greater than those for free RA. These results suggest that the biological activity of the nanoparticle form of RA is prolonged compared with that of the parent RA in an in-vivo setting.

Example 5: RANPs Preferentially Localize to the Inflamed Colon

Since the inflamed tissues have enhanced vascular permeability due to active angiogenesis and enhanced ROS overproduction, long-circulating nanoparticles are expected to have a higher probability of preferentially localizing to the inflamed tissues compared with parent small molecules. To test this, the present inventors performed a biodistribution study by IV administration of indocyanine green (ICG)-loaded RANPs in both normal controls and DSS-induced acute colitis model mice.

FIG. 12 shows representative ex vivo fluorescence images of major organs (heart, liver, spleen, kidneys, lung, and colon) obtained from healthy normal mice (A) and acute colitis-induced mice (B) injected with ICG-loaded RANPs. Negligible fluorescence emission was observed in the colon of healthy normal mice, indicating that RANPs were little accumulated in the tissue (A). Instead, the nanoparticles seemed to be largely accumulated in the liver, which is a typical reticuloendothelial organ. In contrast, the same dye-loaded RANPs were considerably localized to the inflamed colon (B). Collectively, these results indicate that RANPs were accumulated in the inflammatory colon.

Example 6: Therapeutic Efficacy of RANPs in DSS-Induced Acute Colitis Model (Intravenous Administration)

Encouraged by the potent antioxidative and cell-protection activity of RANPs in vitro and their prolonged blood circulation and preferential localization in the inflamed colon, the present inventors next evaluated the therapeutic efficacy of RANPs in an acute colitis mouse model used as a surrogate model of human IBD. Mice were randomly divided into five groups: normal control mice, phosphate buffered saline (PBS)-treated mice, and mice treated with RANPs at doses of 10 (low), 20 (middle), or 30 (high) mg/kg. Mice received either PBS or RANPs through retro-orbital injection (i.v.) every other day for a total of five times (FIG. 13).

Therapeutic efficacy was determined by assessing various parameters, including changes in body weight, colon length, and bleeding, disease activity index (DAI), myeloperoxidase and eosinophil peroxidase activities, histologic evidence of inflammation, and expression levels of pro-inflammatory cytokines.

All three RANP treatment groups showed a significantly reduced body weight loss compared with the PBS-treated group on day 10 ($p<0.001$) (FIG. 14). In addition, treatment with RANPs visibly decreased the incidence of bloody stools (data not shown).

TABLE 3

| Symptom | Score | Characteristics |
|---|---|---|
| Body weight loss | 0 | No loss |
| | 1 | 1-5% |
| | 2 | 5-10% |
| | 3 | 10-20% |
| | 4 | >20% |
| Stool | 0 | Normal feces |
| | 1 | Loose stool |
| | 2 | Watery diarrhea |
| | 3 | Slimy diarrhea, little blood |
| | 4 | Severe watery diarrhea with blood |
| Bleeding | 0 | No blood |
| | 1 | |
| | 2 | Presence of blood |
| | 3 | |
| | 4 | Visible bleeding |

As shown in Table 3, there was no difference in DAI score (weight loss, stool consistency, and occult blood determined as described in Materials and Methods) in the normal control group throughout the entire treatment period, whereas the PBS-treated colitis group showed a gradual increase in DAI score that reached a maximum value of 4 on day 10 (FIG. 15), indicating a severe disease.

In particular, high-dose RANPs (30 mg/kg) resulted in a substantial decrease in DAI score, reducing disease symptoms by ~82%, compared with PBS-treated mice.

Next, the present inventors measured a change in colon length, which is a key indicator for assessing the severity of DSS-induced acute colitis. Compared with control normal mice, colon length was considerably shortened in PBS-treated colitis induced mice 7.20±0.56 versus 5.56±0.50 cm), whereas, RANP treatment caused a significant dose-dependent attenuation of colon-length shortening (FIG. 16). Similar to the effects of RANPs on DAI scores, low-dose RANPs treatment (10 mg/kg) was not effective in this regard, producing effects comparable to those of PBS treatment (5.70±0.61 versus 5.56±0.50 cm). However, intermediate (20 mg/kg) and high-dose (30 mg/kg) RANP treatment significantly attenuated colon shortening, resulting in colon lengths of 6.28±0.40 and 6.80±0.58 cm, respectively. Notably, the colon length value of the high-dose RANP treatment group was close to that of normal controls (7.20±0.56 cm), indicating that RANPs relieved inflammation in the colon.

Collectively, these results indicate that RANPs can inhibit the progression of acute colitis in a dose-dependent manner.

Example 7: Evaluation of Therapeutic Efficacy of RANPs in Pathophysiological Setting It has been shown that myeloperoxidase (MPO), a glycosylated blood protein enzyme found in granules of neutrophils and monocytes, serves as a biomarker for assessing the disease status in IBD patients. Thus, the infiltration of neutrophils into an inflamed tissue can be assessed by measuring MPO activity.

Figure 17:
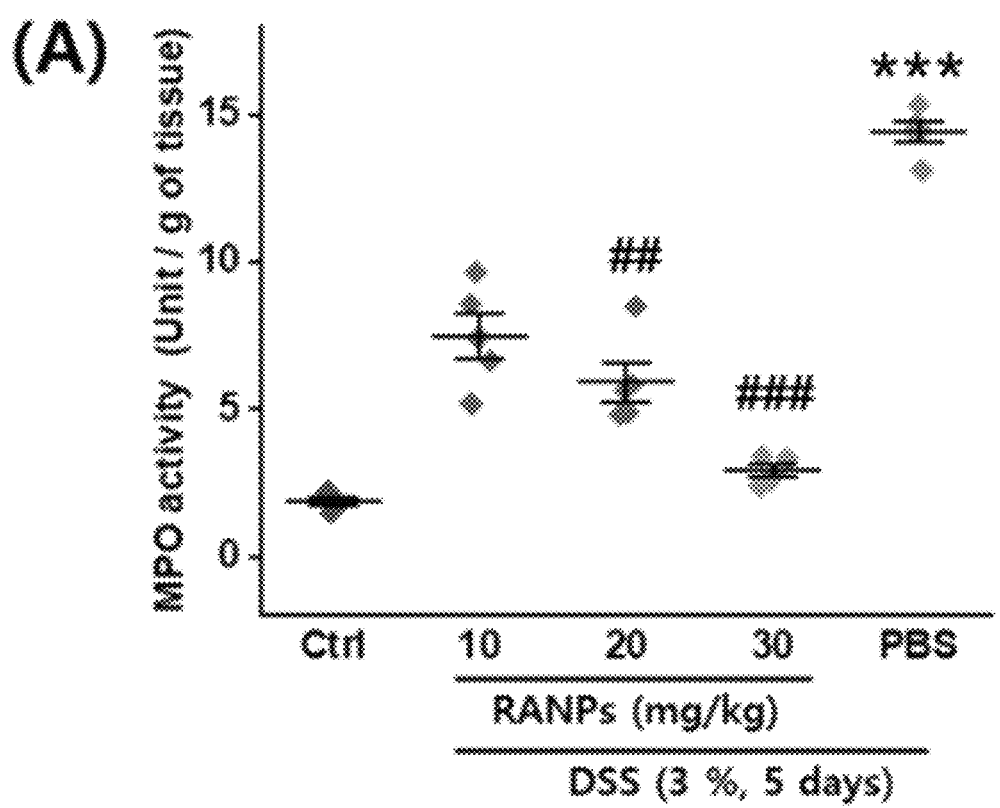
Figure 18:
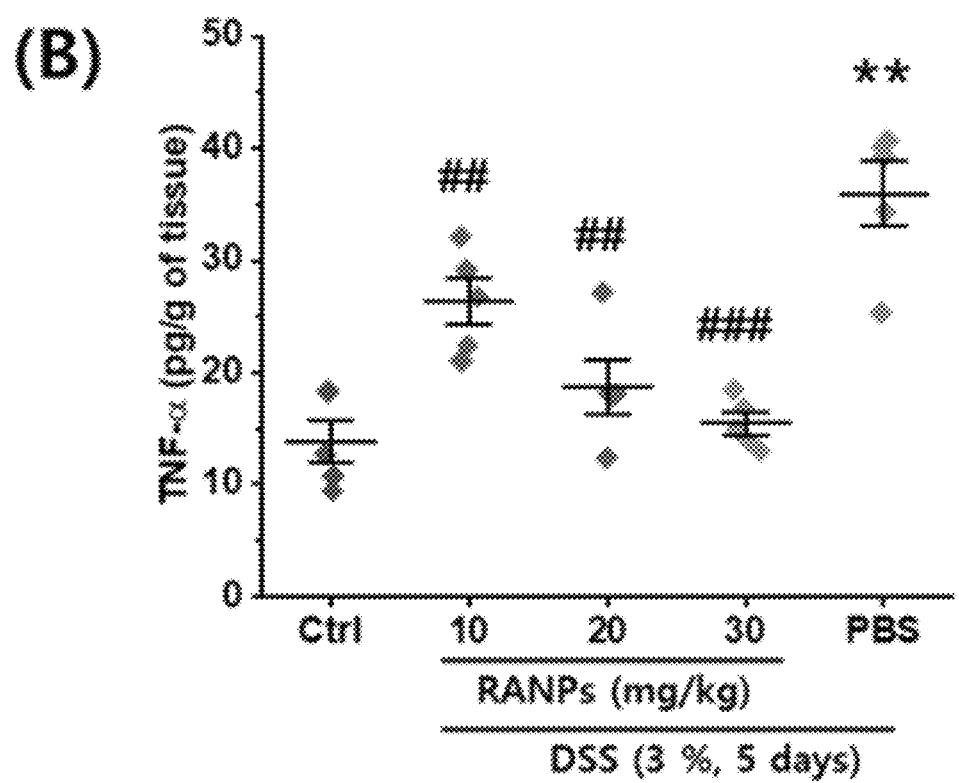
Figure 19:
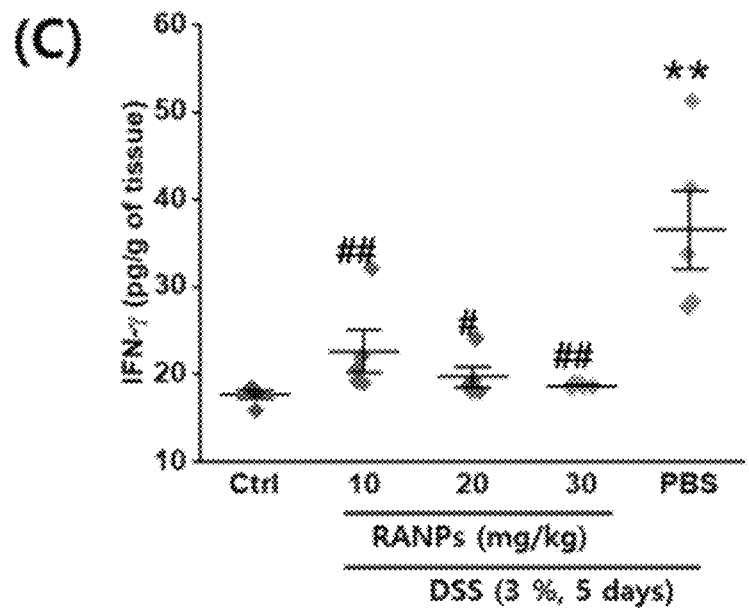
Figure 20:
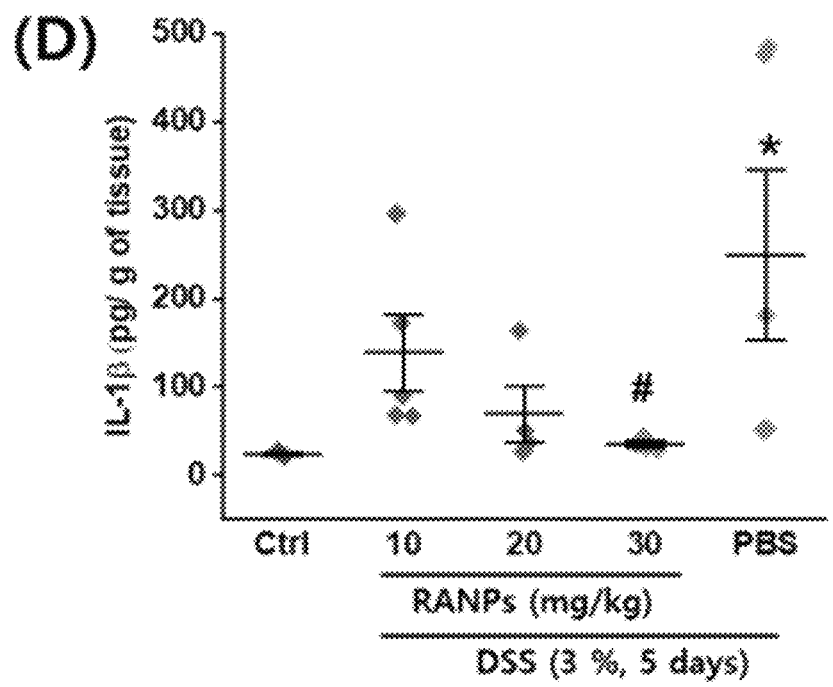
Figure 21:
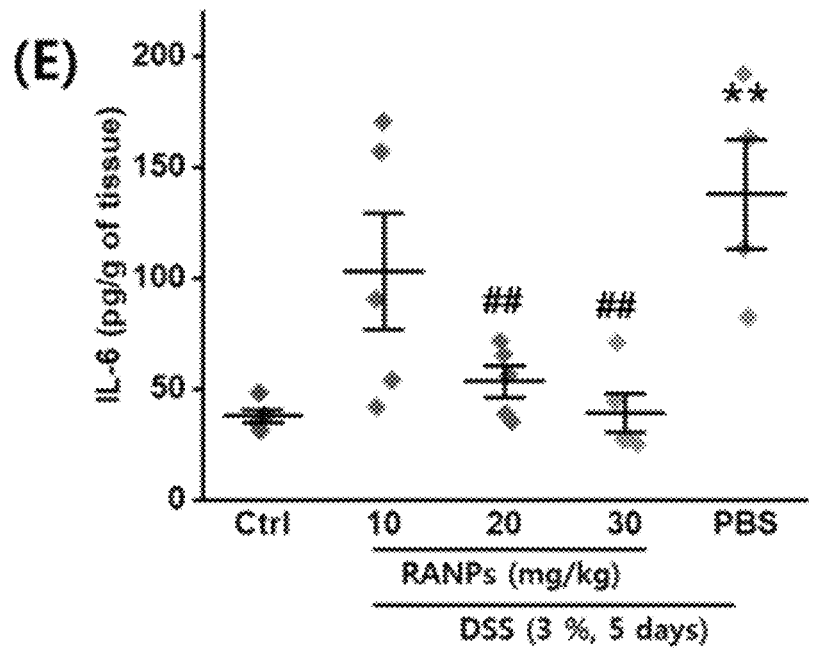
Figure 22:
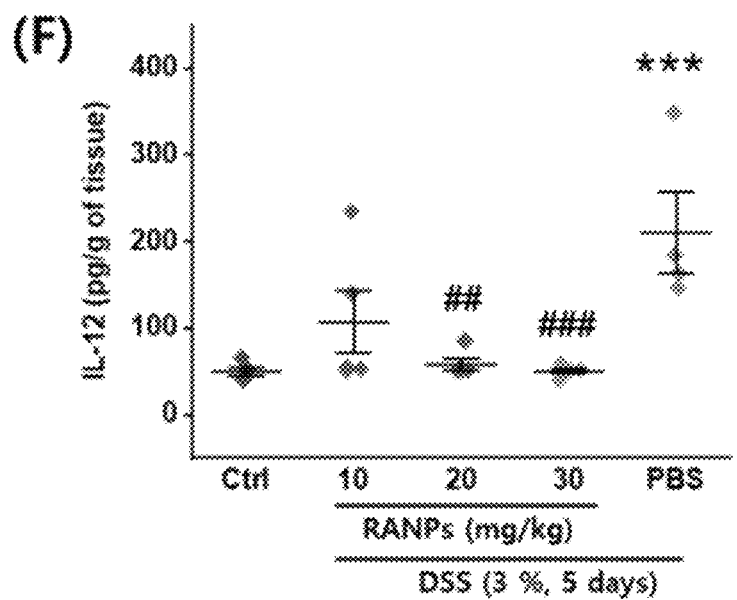

FIG. 17 shows a change in MPO activity for each treatment group. MPO activity was substantially increased in the PBS-treated disease group, and an effect that was significantly attenuated by treatment with RANPs, with reductions in MPO activity, was most evident in the high-dose group (30-mg/kg). This indicates that treatment with RANPs substantially inhibits neutrophil infiltration into the inflamed colon.

Pro-inflammatory cytokine responses are a major pathophysiological factor that governs initiation and progression of IBD. Therefore, the present inventors examined the effects of RANPs on pro-inflammatory cytokine production in inflamed colons, focusing on interferon (IFN)-γ, colonic interleukin (IL)-1β, IL-6, IL-12, and tumor necrosis factor (TNF)-α, which are well-known markers of inflammation that play important roles in the pathogenesis of ulcerative colitis. RANP treatment significantly reduced the production of TNF-α, IFN-γ, IL-1β, IL-6, and IL-12 in a dose-dependent manner in DSS-induced colitis colons (FIGS. 18 to 22).

High-dose RANP treatment (30 mg/kg) reduced all cytokine levels to levels close to those in the healthy control group, indicating that inflammation was completely relieved. The effects of RANPs on the production of these pro-inflammatory cytokines in inflamed colons were similar to those on MPO activity. These results clearly indicate the potent antiinflammatory efficacy of RANPs in DSS-induced acute colitis.

Histopathological scoring that takes into account the degree of structural integrity loss, the presence of crypts, crypt destruction, and mucosal surface changes is a method for understanding the extent of inflammation in the colon. In contrast to the histological findings of a representative colon from a healthy control mouse, PBS-treated colitis colons exhibited a disturbed colonic architecture with irregular morphology, disruption of cryptal glands, severe damage to the surface epithelium, bleeding, cryptal gland destruction, thickened submucosal layer, mucosal ulcers, submucosal edema, and intense infiltration of inflammatory cells (FIG. 23). Mice treated with RANPs at a dose of 10 or 20 mg/kg showed a relatively intact surface epithelium, but still exhibited the disruption of cryptal glands and the infiltration of inflammatory cells. Notably, the colon histology of mice treated with RANPs at 30 mg/kg revealed that the structure of lining layers of the colon was normal, similar to that in the healthy control colon, and showed the preservation of crypts with many goblet cells, indicating epithelial restoration and inflammation relief.

The degree of inflammation was also evaluated by measuring colonic muscle thickness. Compared with healthy controls, PBS-treated colitis mice showed significantly increased colonic muscle thickness. In contrast, the administration of RANPs attenuated colonic muscle thickening in a dose-dependent manner. These histological changes, assessed using a scoring system which measures the severity of inflammatory cell infiltration, ulceration, gland damage, and edema, and total damage score, are summarized in FIG. 24.

Example 8: Biocompatibility of RANPs In Vitro and In Vivo

The present inventors assessed the cytotoxicity of RANPs in vitro and in vivo. WST-8 cell proliferation assays performed on CHO-K1 cells revealed that treatment with RANPs up to a concentration of 100 μM for 48 hours did not affect the viability of CHO-K1 cells, indicating little cytotoxicity in vitro (FIG. 7A).

The toxicity of RANPs was then evaluated in vivo by intravenously injecting nanoparticles at a dose of 30 mg/kg every day for 7 days. RANP treatment caused no overt toxicity in terms of body weight loss or unusual behaviors (FIG. 7B) and did not significantly increase clinical features, such as diarrhea, food or water intake or other symptoms, compared with untreated controls. Moreover, no mortality was observed.

Hematoxylin and eosin (H&E) staining of major organs further revealed that repeated administration of high-dose (30 mg/kg) of RANPs caused no pathological changes compared with healthy control mice (FIG. 7C). These results clearly indicate that, like the parent compound RA, RANPs exhibit high biocompatibility and no toxicity even at doses exceeding the therapeutic dose.

Example 9: Chitosan-RA, Chi-RA Nanoparticles Preparation and Characterization

Synthesis of Chitosan Conjugated RA (Chi-RA) and Preparation of Nanoparticles

Reagents including rosmarinic acid (RA) were purchased from Sigma-Aldrich Chemical Co. (St. Louis, MO, USA), and used without further purification unless otherwise indicated. 0.083 mmol RA and 0.025 mmol chitosan (MW: ~4K) were dissolved together in 5 mL of a dimethylformamide (DMF): distilled water (DW) mixture solution (4:1, v/v). After stirring at room temperature for 10 minutes, 0.025 mmol 1-ethyl-3-(3-dimethylaminopropyl)carbodiimide hydrochloride (EDC) was added to the mixture, and the reaction was carried out overnight with stirring at room temperature under a nitrogen atmosphere. The crude product was precipitated using excess acetone, and purified by a separation method through a centrifuge to yield the product as a pale-yellow solid.

TABLE 4

| Chitosan-RA synthesis | | | | |
|---|---|---|---|---|
| Reagent | MW | Amount | Mmol | EQ |
| Rosmarinic acid | 360.31 | 30 mg | 0.083 | 3.32 |
| Chitosan | ~4K | 100 mg | 0.025 | 1 |
| EDC | 191.7 | ~10 mg | 0.052 | 2 |

In addition, chitosan-RA obtained in order to prepare chitosan-RA nanoparticles was placed in PBS, followed by sonication using a bath sonicator (50 W, 40 kHz) for 10 minutes, thereby yielding uniform-sized chitosan-RA nanoparticles.

Characterization of Chi-RA & Chi-RANP

The product was then analyzed through UV-Vis spectrometry using Beckman Coulter DU-800 UV-Vis spectrometer. In addition, the particle size of Chi-RA nanoparticles was analyzed by photon correlation spectroscopy (PCS) using a Nanosizer ZS90 (Malvern Instrument Ltd., Malvern, UK) equipped with 4.0 mW HeNe laser and an avalanche photodiode detector operating at 633 nm.

The results confirmed that the chitosan-RA conjugate of the present disclosure was synthesized and comparatively uniform-nano-sized Chi-RA particles were formed from the chitosan-RA conjugate of the present disclosure.

Example 10: Hyaluronic Acid-RA, HA-RA Nanoparticles Preparation and Characterization Synthesis of Hyaluronic Acid(HA)-RA (HA-RA) and Preparation of Nanoparticles The present inventors prepared rosmarinic acid-hyaluronic acid (100 K) conjugate through the following steps.

1. Boc Protection

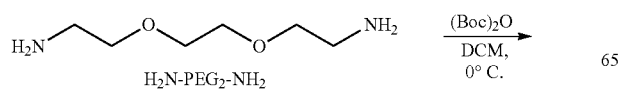

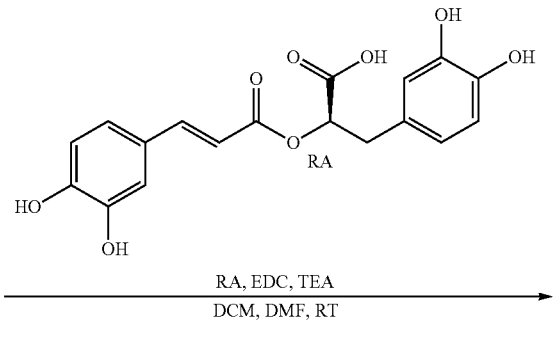

As above, one amine group of $NH_2$-$PEG_2$-$NH_2$ was Boc protected.

2. RA-Boc-$PEG_2$-$NH_2$ Conjugation

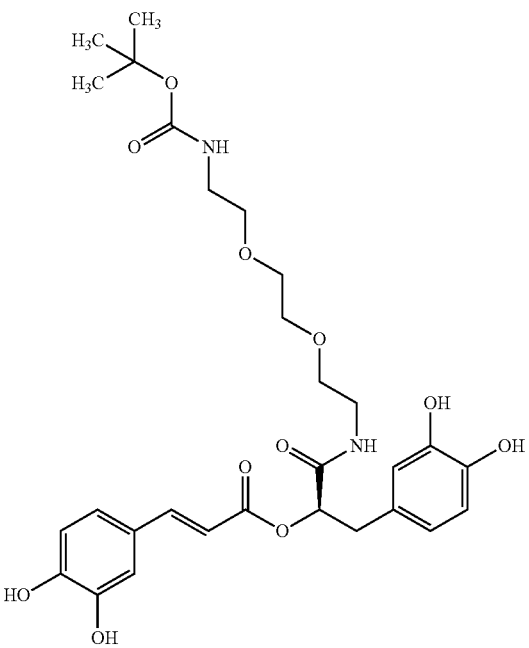

$NH_2$-$PEG_2$-Boc, which has one amine with Boc-protection, was conjugated to the carboxylic acid of rosmarinic acid by a reaction using 1-ethyl-3-(3-dimethylaminopropyl) carbodiimide (EDC) and trimethylamine (TEA) in a DCM/DMF solvent at room temperature overnight.

3. Boc Deprotection
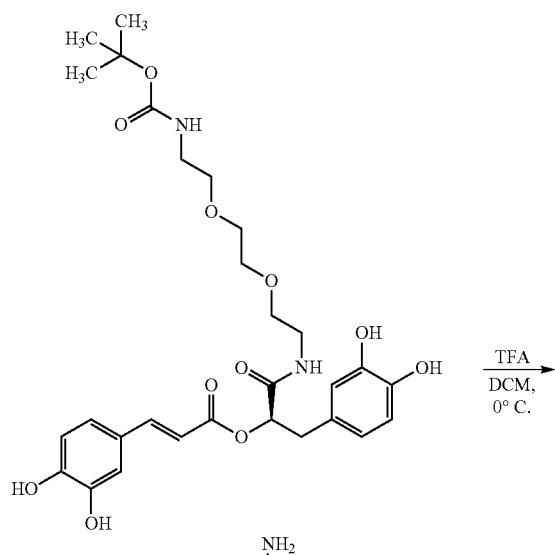
4. Hyaluronic Acid and RA-PEG₂-NH₂ Conjugation
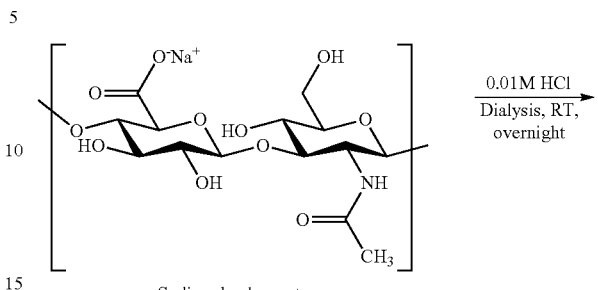
Thereafter, Boc deprotection was carried out using TEA, to prepare RA-PEG$_2$-NH$_2$.
HA-sodium salt was dialyzed in 0.01M HCl solution overnight and then freeze-dried to prepare an acid form of HA.
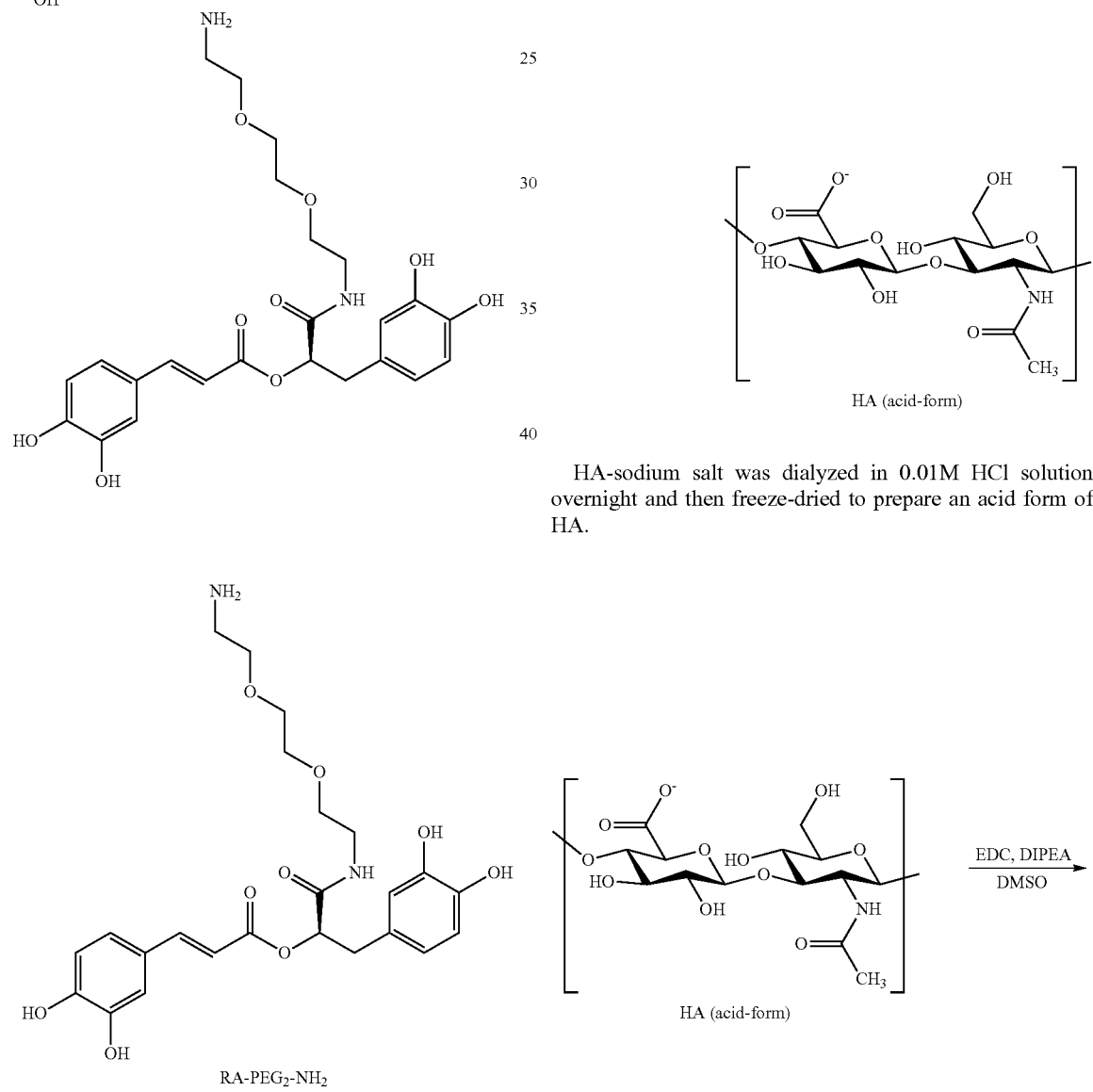

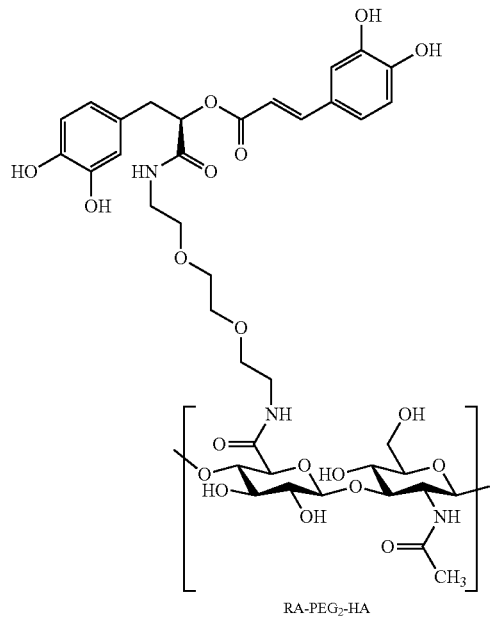

RA-PEG$_2$-HA

Lastly, the HA-RA conjugate was synthesized in a DMSO solvent using EDC and DIPEA for EDC coupling between the amine group of A-PEG$_2$-NH$_2$ and the carboxylic acid group of the HA acid form. Thereafter, the resulting product was subjected to dialysis in 0.01 M NAOH with stirring at RT overnight, dialyzed once more in distilled water at RT for 2 days, and then purified and freeze-dried, to finally obtain RA-PEG$_2$-HA of the present disclosure.

The above procedure was described in detail.

Reagents including rosmarinic acid (RA) were purchased from Sigma-Aldrich Chemical Co. (St. Louis, MO, USA), and used without further purification unless otherwise indicated. First, 1.37 mmol di-tent-butyl dicarbonate was dissolved in 10 ml of dichloromethane (DCM). 6.85 mmol of 2,2'-(ethylenedioxy)bis(ethylamine) was slowly dropped in the dissolved solution and thus added to the mixture, and the reaction was carried out overnight with stirring at room temperature under a nitrogen atmosphere. The crude product was purified by workup using a sodium bicarbonate aqueous solution to yield the product (Boc-PEG$_2$-NH$_2$) as an ivory solid. 0.77 mmol Boc-PEG$_2$-NH$_2$ was dissolved together with 1.54 mmol RA, 2.31 mmol EDC, and 162 µL of DIPEA in 5 mL of dimethyl formamide, and the reaction was carried out overnight with stirring at room temperature under a nitrogen atmosphere. The crude product was purified by silica gel chromatography using a mixture of dichloromethane (DCM) and methanol (10:1) to yield the product (RA-PEG$_2$-Boc) as a yellow solid. 0.74 mmol RA-PEG$_2$-Boc was dissolved in 10 ml of dichloromethane (DCM). The product (RA-PEG$_2$-NH$_2$), which was obtained by slowly dropping 3.7 mmol trifluoroacetic acid (TFA) in the dissolved solution and thus adding the same to the mixture and carrying out the reaction overnight with stirring at room temperature under a nitrogen atmosphere, was subjected to solvent removal by using a rotary evaporator. 0.1 mmol hyaluronic acid (MW: ~100K, Lifecore Biomedical, USA) and 1 mmol N-hydroxysuccinimide (NHS) were dissolved together with 1 mmol EDC in distilled water. After the mixture was stirred at room temperature for 10 minutes, RA-PEG$_2$-NH$_2$ was added, and the reaction was carried out overnight with stirring at room temperature under a nitrogen atmosphere. The crude product was precipitated using excess acetone, and purified by a separation method through a centrifuge to yield the product as a pale-yellow solid. The mixture was slowly poured into 30 ml of 0.01 M NaOH, followed by dialysis against 0.01 M NaOH for 5 hours. Additional dialysis was carried out three times for 1 day against a 1:1 ratio of water/acetonitrile, followed by dialysis three times for two days against distilled water. The resulting solution was finally freeze-dried to yield A-PEG$_2$-RA.

In addition, hyaluronic acid-RA obtained in order to prepare hyaluronic acid-RA nanoparticles was placed in PBS, followed by sonication using a bath sonicator (50 W, 40 kHz) for 10 minutes, thereby yielding uniform-sized hyaluronic acid-RA nanoparticles.

Characterization of HA-RA and HA-RANP

The product was then analyzed through UV-Vis spectrometry using Beckman Coulter DU-800 UV-Vis spectrometer. The particle size of the HA-RA nanoparticles was obtained by measuring the hydrodynamic size of HA-RA nanoparticles in phosphate buffer solution (pH 7.4), measured by dynamic light scattering (DLS). The morphological characteristics of HA-RA nanoparticles were examined using negative-staining transmission electron microscopy (TEM).

The results are shown in FIGS. 28 to 30.

It was confirmed from FIG. 28 that the HA-RA conjugate of the present disclosure was synthesized and it was confirmed from FIGS. 29 and 30 that comparatively uniform-nano-sized (about 140 nm) HA-RA particles were formed from the HA-RA conjugate of the present disclosure.

Example 11: In Vitro Characterization of HA-RA Nanoparticles

ROS Scavenging Ability of HA-RA Nanoparticles (Antioxidative Ability)

In order to examine whether the HA-RA nanoparticles (HA-RANPs) could protect cells from ROS-caused damage through antioxidative ability thereof, HA-RA was prepared with various concentrations, with which CHO cells (Chines Hamster Ovarian cell) were then treated, followed by incubation for about 8 hours. Thereafter, the cells were treated with 100 μM hydrogen peroxide, and it was examined by using WST-8 assay kits how much ROS-caused toxicity decreased cell viability. The results are shown in FIG. 33.

As shown in FIG. 31, the cell viability was reduced in the non-treated group, and the cell viability of CHO cells were increased in a dose-dependent manner of HA-RANPs. It could be seen from the above results that the HA-RANPs of the present disclosure have excellent antioxidative ability and thus can protect cells from ROS-causing damage.

Cytotoxicity of HA-RANPs

To investigate the cytotoxicity of HA-RANPs, the present inventors incubated CHO cells, which were treated with samples obtained by a serial dilution of HA-RANPs of the present disclosure, for 8 hours or longer and then cell viability was checked using a WST-8 assay kit. The results are shown in FIG. 32.

As shown in FIG. 32, the cell viability even at a high concentration of 10 mg/ml of HA-RANPs were measured to be nearly as high in cell viability as that in the normal group, indicating that HA-RANPs did not show cytotoxicity.

Macrophage Polarization Test

To examine the correlation between the HA-RANP treatment of the present disclosure and the M1/M2 polarization of macrophages, the present inventors treated macrophages with LPS and evaluated mRNA levels in a time-dependent manner.

Specifically, mouse monocyte macrophage J774.1 cells were cultured, treated with 0.5 μg/mL of LPS, and incubated for 5, 10, 15, and 20 hours. The cytokine mRNA levels of the groups treated with HA-RA at different concentrations (1 mg/ml and 10 mg/ml) were measured by qPCR. The results are shown in FIG. 33.

FIG. 33 is a diagram showing the relative cytokine mRNA expression levels in macrophages treated with HA-RANPs in order to examine the effect of HA-RANPs on macrophage polarization.

As a result, the M1-related pro-inflammatory cytokines TNF-α, IL-1β, and IL-6 were highest about 5 hours after LPS treatment (maximum inflammatory cytokine RNA expression level being confirmed), but were reduced after treatment with HA-RANPs. This means that HA-RANPs inhibit M1 macrophage polarization and exhibit antiinflammatory effects.

However, there were no changes in M2-related antiinflammatory cytokines TGF-β and IL-10.

Example 12: In Vitro Characterization of HA-RA Nanoparticles

Effect of HA-RANPs on Inflammatory Bowel Disease Model Mice

To investigate the antiinflammatory therapeutic efficacy of HA-RANPs in inflammatory bowel disease model mice, the present inventors performed the following tests. By using the inflammatory bowel disease model in which 3% DSS and drinking water were administered to mice (C57BL/6, 6 weeks old, female, 7-day acclimatization) for 5 days, three dose concentrations (20, 50, and 100 mg/kg) of HA-RANPs were orally administered for 5 days (D+1 to D+5, one time/day) for a total of 5 times. The degree of disease progression and the antiinflammatory effect of HA-RANPs were examined through weight changes (measured daily) of all groups of mice and the extraction and tests of the large intestine on the last day. The summary of the present example is shown in FIG. 34.

FIG. 35 shows the effect of HA-RANPs on body weight change in inflammatory bowel disease model mice.

FIG. 36 shows the effect of HA-RANPs on colon length in inflammatory bowel disease model mice.

First, the body weight and colon length, which are key indicators for evaluating the severity of acute colitis of DSS-induced symptoms, were analyzed. As shown in FIG. 37, it was verified that as a result of measuring the body weight for 10 days, the PBS-treated group (control) had significant weight loss. By comparison, it was verified that in all the groups treated with three concentrations of HA-RANPs, the body weight loss was significantly decreased, indicating restoration. In particular, HA-RANP at a high dose of 100 mg/kg significantly reduced the weight loss and thus decreased disease symptoms (body weight loss) by ~90% compared with the PBS-treated mice.

As shown in FIG. 36, the colon length was significantly shortened in the PBS-treated colitis-induced mice compared with the control normal mice, but in the HA-RANP-treated mice, the colon length shortening was significantly reduced in a HA-RANP dose-dependent manner and thus the colon length was restored to a normal colon length.

In addition, the myeloperoxidase (MPO) activity and inflammatory cytokine expression were examined through ELISA assay. Specifically, the same portion of each mouse colon sample was cut, pre-treated, and minced, and then a predetermined amount thereof was centrifuged to obtain a supernatant, and thereafter, the supernatant was subjected to the following assay. The MPO activity is an index to evaluate the infiltration of neutrophils into the inflamed tissue. The measurement of MPO activity is disclosed in Grisham et al. (1990) or the like.

MPO activity measurement results are shown in FIG. 37.

As shown in FIG. 37, the MPO activity was increased in the PBS-treated disease groups, but was significantly reduced by HA-RANP treatment in a dose-dependent manner.

In addition, the expression levels of the pro-inflammatory cytokines IL-1β, IL-6, IFN-γ, and TNF-α, determined by ELISA, are shown in FIGS. 38 to 41, respectively.

As shown in FIGS. 38 to 41, the expression levels of the pro-inflammatory cytokines IL-1β, IL-6, IFN-γ, and TNF-α were significantly reduced in a HA-RANP dose-dependent manner. In particular, all the cytokine levels in the high-dose HA-RANP treatment (100 mg/kg) group were reduced to be close to those in the healthy control group, indicating that inflammation was completely relieved.

The change in extent of inflammation in the colon was investigated by histopathological examination, that is, examining the degrees of structural integrity loss, crypt destruction, and mucosal surface changes.

The histopathological findings are shown in FIG. 42.

As a result, unlike the healthy control mouse, the colon histology of the PBS-treated control exhibited irregular morphology. Specifically, the disruption of cryptal glands, severe damage to the surface epithelium, thickened submucosal layer, mucosal ulcers, submucosal edema, and intense infiltration of inflammatory cells could be confirmed. However, the comparatively intact surface epithelium and the preserved crypts with many goblet cells could be confirmed in the HA-RANP treated groups.

Effects of HA, RA, and HA-RANPs on Inflammatory Bowel Disease Model Mice

The present inventors evaluated the effect of the HA-RANPs of the present disclosure on inflammatory bowel disease model mice through the comparison with HA and RA. The inflammatory bowel disease model was induced by the same method as in the above-described experiment, wherein 100 mg/kg of HA-RANPs as a drug and the equal amounts of Free HA (85 mg/kg), RA (15 mg/kg), and 5-amino salicylic acid (5-ASA) (100 mg/kg) as positive drug controls were administered orally (a total of 5 times, one time/day, D+1 to D+5).

In particular, two mice per cage were housed to prevent the sharing of intestinal bacteria through each other's excreta, and excreta samples were collected on Days 0, 4, and 9.

First, the body weight and colon length, which are key indicators for evaluating the severity of acute colitis of DSS-induced symptoms, were analyzed.

FIGS. 43 and 44 show body weights and colon lengths of inflammatory bowel disease mouse models treated with HA, RA, 5-ASA, or HA-RANP.

Expectedly, as in the previous experiment, it was verified that the body weight loss and the colon length shortening were significantly reduced on day 10, leading to recovery, in the HA-RANP treatment compared with the PBS treatment group (control group). However, HA showed no effect and thus the experimental results were almost the same as those in the control, and RA showed slight efficacy. Unlike expectations, the efficacy of 5-ASA was investigated to be significantly low. The reasoning was thought to be that 5-ASA had low bioavailability due to very low solubility in water.

The present inventors also evaluated MPO activity and pro-inflammatory cytokine levels.

FIG. 45 shows MPO activity of inflammatory bowel disease mouse models treated with HA, RA, 5-ASA, or HA-RANP.

FIGS. 46 to 49 show the expression levels of pro-inflammatory cytokines (IL-1beta, IL-6, IFN-gamma, and TNF-alpha, sequentially) in inflammatory bowel disease mouse models treated with HA, RA, 5-ASA, or HA-RANP.

As a result, the HA-RANP treatment at a dose of 100 mg/kg recovered MPO and all cytokines to levels similar to those of the healthy control group, and then the inflammation was somewhat relieved in the RA and 5-ASA groups. However, the HA group was investigated to show little effect.

The present inventors also examined the histopathological findings of the colon for each sample.

FIG. 50 shows the colon histology of inflammatory bowel disease mouse models treated with HA, RA, 5-ASA, or HA-RANPs.

As a result, the H&E stained biopsy also showed that the treatment with HA-RANP at a dose of 100 mg/kg showed almost similar effects to the healthy control group. Next, the inflammation was shown to be slightly relieved in the RA and 5-ASA groups. However, the HA group was verified to have little effect.

The present inventors also examined the effect of HA, RA, or HA-RANPs on the mRNA expression levels of marker genes related to the tight junction influencing the health of the intestinal barrier.

The tight junctions mainly consist of ZO-1, claudin, and occludin, which influence mucosal permeability. The intestinal epithelium is covered with mucus membranes to prevent the invasion of the intestinal microflora into underlying tissues. Negative changes in intestinal epithelial tight junction and colonic mucosa layer integrity and permeability in the inflammatory bowel disease cause the invasion of intestinal microflora and exacerbate inflammation and infection.

FIGS. 51 to 53 show the mRNA expression levels of ZO-1, claudin-1, and occludin-1 genes in the colonic tissues of inflammatory bowel disease mouse models treated with HA, RA, 5-ASA, or HA-RANPs.

As expected, the expression of the genes related to tight junctions was reduced and HA, RA, HA-RANPs, and 5-ASA improved the protein levels of ZO-1, claudin-1, and occludin, in the colon of the inflammatory bowel disease mice. Of these, HA-RANPs showed the highest effects in the increasing of the expression of the tight junction-related genes.

The present inventors also examined the effect of HA, RA, or HA-RANPs on the mRNA expression levels of marker genes related to the tight junction influencing the health of the intestinal barrier.

FIGS. 54 to 56 show the mRNA expression levels of NF-KB p65, COX-2, and INOS genes in the colonic tissues of inflammatory bowel disease mouse models treated with HA, RA, 5-ASA, or HA-RANPs.

As a result, RA, HA-RANPs, and 5-ASA significantly reduced the expression of the inflammation-related genes, and out of these, HA-RANPs showed the highest effect in the reduction of the expression of inflammation-related genes. Whereas, HA had the slightest effects in the reduction of inflammation-related gene expression.

The present inventors also tested the biocompatibility of HA-RANPs by extracting major organs (liver, lung, heart, kidneys, spleen, and large intestine) after the treatment with HA-RANPs at a high dose (100 mg/kg) and performing H&E stained biopsy.

FIG. 57 shows the results of H&E stained biopsy performed on the major organs (liver, lung, heart, kidneys, spleen, and large intestine) extracted after the treatment with HA-RANPs at a high dose (100 mg/kg).

As a result, the histological findings are almost similar between the high-dose (100 mg/kg) HA-RANP treatment group and the healthy control, indicating that HA-RANPs had excellent compatibility.

Example 13: Preparation and Characterization of Low Molecular Weight Chitosan-RA and Low Molecular Weight Chitosan-RA Nanoparticles Synthesis of Low Molecular Weight Chitosan-Conjugated RA (LMWC-RA) and Preparation of Nanoparticles The present inventors prepared low molecular weight chitosan-RA conjugate (LMWC-RA) by forming a stable amide bond through a reaction of the amine group of fractionated low molecular weight chitosan (LMWC, 5 K to 10 K) and the carboxylic group of RA using EDC. Reaction times and conditions were the same as in the method of Example 8.

Solubility of LMWC-RA

For comparison of the solubility of LMWC-RA of the present disclosure, the present inventors dissolved non-fractionated high molecular weight chitosan (HMWC, exceeding 10 K), LMWC, RA, and LMWC-RA in distilled water or DMSO at a concentration of 5 mg/ml each. The results are shown in FIG. 58.

As shown in FIG. 58, HMWC was not dissolved in distilled water, and LMWC was dissolved in distilled water. RA was dissolved up to a concentration of 25 mg/ml in DMSO, but dissolved only up to a concentration of 41 μg/ml in distilled water, indicating that RA was only partially dissolved in distilled water. LMWC-RA of the present disclosure was confirmed to dissolve well even at a concentration of 5 mg/ml in distilled water, indicating high water solubility.

FIG. 58 shows the solubility of LMWC-RA of the present disclosure in distilled water.

Measurement of 1H NMR Spectrum and UV/vis Absorbance of LMWC-RA

The synthesis of LMWC-RA was investigated by comparison of 1H (proton) NMR wavelengths (FIG. 61) and measurement of UV/vis absorbance spectra (FIG. 62).

FIG. 59 shows the 1H NMR spectrum of LMWC-RA of the present disclosure, indicating the synthesis or not of LMWC-RA.

FIG. 60 shows the UV/vis absorbance spectrum of LMWC-RA of the present disclosure, indicating the synthesis or not of LMWC-RA (RA peak: about 330 nm).

Hydrodynamic Size and Zeta Potential Value of LMWC-RA Nanoparticles

The LMWC-RA of the present disclosure was prepared into nanoparticles by the method shown in Example 8, and then the hydrodynamic size and zeta potential value thereof were measured. The results are shown in FIGS. 61 and 62.

As shown in FIG. 61, the LMWC-RA nanoparticles of the present disclosure have a mean particle size of 128.5 nm and had a comparatively uniform particle size of approximately 100 nm. As shown in FIG. 62, the LMWC-RA nanoparticles were confirmed to be positively charged with a zeta potential of 4.38±4.38 mV, which was similar to the zeta potential of low molecular weight chitosan.

FIG. 61 shows the hydrodynamic size of LMWC-RA nanoparticles of the present disclosure.

FIG. 62 shows the zeta potential value of LMWC-RA nanoparticles of the present disclosure.

Particle Stability and CMC of LMWC-RA Nanoparticles

To investigate the particle stability of the LMWC-RA nanoparticles of the present disclosure, the hydrodynamic size of the particles in PBS was measured for 8 days, and as a result, the size of the particles was maintained, indicating excellent particle stability in the aqueous solution (FIG. 63). In addition, as a result of measuring the particle size depending on the content of RA in the LMWC-RA nanoparticles of the present disclosure, the hydrodynamic size of the nanoparticles was constantly measured when RA is contained at 1 µM or more, and thus the critical micelle concentration (CMC) was confirmed to be 1 µM, which is the minimum concentration of RA at which RA exist in the form of particles (FIG. 64).

Measurement of RA Content in LMWC-RA Nanoparticles

In addition, the present inventors measured the RA content in the LMWC-RA nanoparticles of the present disclosure. As a result of analyzing UV/vis absorbance spectra, it was confirmed that about 30% (w/w) of RA was contained in the LMWC-RA nanoparticles of the present disclosure (FIG. 65 and Table 5).

TABLE 5

| LMWC-BR | |
| --- | --- |
| Concentration of LMWC-RA | 0.1 mg/ml |
| Absorbance Intensity ($\lambda$ = 330 nm) | 0.618 |
| Concentration of RA from standard curve | 30 µg/ml (= 0.03 mg/ml) |
| Amount of RA in 1 mg LMWC-RA | 300 µg (= 0.3 mg/ml) |
| RA content (%) | 30 % |

ROS Scavenging Ability of LMWC-RA Nanoparticles

To measure the ROS scavenging ability of LMWC-RA nanoparticles of the present disclosure, the present inventors measured the UV absorbance over time while reacting 0.1 mg/ml LMWC-RA nanoparticles with DPBS, $H_2O_2$, NaOH, and AAPH. In addition, the hydrodynamic particle sizes thereof were measured after the reaction. The results are shown in FIGS. 66 and 67.

FIG. 66 shows the UV absorbance over time while the LMWC-RA nanoparticles of the present disclosure reacted with reactive oxygen species. FIG. 67 shows the particle size of the LMWC-RA nanoparticles of the present disclosure after the reaction with reactive oxygen species.

As shown in FIG. 66, the UV absorbance at a wavelength of 320 nm was reduced for all three different types of ROS, indicating that the LMWC-RA nanoparticles reduced these. As a result, the particle size of the LMWC-RA nanoparticles was reduced, which was confirmed through the measurement of hydrodynamic size on DLS (FIG. 67).

In addition, the degree of reduction of hydrogen peroxide by LMWC-RA was evaluated by reaction of the LMWC-RA nanoparticles of the present disclosure with hydrogen peroxide (FIG. 68). As a result, it was confirmed that the concentration of hydrogen peroxide, 100 µM, was significantly reduced by reaction with a high-concentration of LMWC-RA nanoparticles (FIG. 68).

Example 14: In Vitro Characterization of LMWC-RA Nanoparticles

The present inventors characterized in vitro characteristics of the LMWC-RA nanoparticles of the present disclosure.

Investigation of ROS-Scavenging Ability in CHO Cells

The effect of LMWC-RA nanoparticles of inhibiting hydrogen peroxide (ROS)-caused cell damage was investigated by examining cell viability through WST-8 assay when CHO cells were treated with a hydrogen peroxide solution (100 µM) causing cell damage and then treated with the LMWC-RA nanoparticles.

FIG. 69 shows the effect of LMWC-RA nanoparticles on inhibiting hydrogen peroxide (ROS)-caused cell damage.

As shown in FIG. 69, as the concentration of the LMWC-RA of the present disclosure increased, the cell viability gradually increased, indicating excellent ROS scavenging ability. However, chitosan (LMWC) itself did not have any influence on the ROS treatment, indicating no ROS scavenging ability.

Pro-Inflammatory Cytokine Inhibitory Effect in Macrophages

When macrophages with antiinflammatory markers (IL-1beta, IL-6, and TNF-alpha) increased by LPS treatment (=activated macrophages) were treated with LMWC-RA nanoparticles at different concentrations, the reduction of inflammatory markers was confirmed by qPCR.

FIG. 70 shows the pro-inflammatory cytokine inhibitory effect of LMWC-RA in macrophages treated with LPS.

As shown in FIG. 70, the LMWC-RA nanoparticles of the present disclosure could achieve effective inflammation inhibition on macrophages even on the cell stages. However, chitosan (LMWC) itself had no inflammation inhibitory effect.

Anti Inflammatory Cytokine Increasing Effect in Macrophages

In addition, it was verified that LMWC-RA increased the expression levels of the antiinflammatory cytokines TGF-beta and IL-10 in LPS-treated macrophages (FIG. 71). It was verified from the M2 marker increase results as above that the LMWC-RA of the present disclosure had the potential to make recovery-related actions as well as antiinflammatory effects.

Example 15: In Vivo Characterization of LMWC-RA Nanoparticles

The present inventors characterized in vitro characteristics of the LMWC-RA nanoparticles of the present disclosure. The summary of the present test is shown in FIG. 72.

Mouse models, obtained by acclimating female C57BL/6 mice aged 7 weeks for 7 days and then inducing acute colitis through the administration of 3% DSS (36 K to 50 K), were allowed to receive LMWC-RA nanoparticles by oral administration, unlike Example 6, and the therapeutic effect was evaluated. The mice were randomly divided into four groups: Normal control mice, phosphate buffered saline (DPBS)-treated mice, 60 mg/kg LMWC-bilirubin nanoparticles (LMWC-BR) treated mice (15 mg/kg on the basis of the BR content), and 50 mg/kg LMWC-RA nanoparticle-treated mice (15 mg/kg on the basis of the RA content). As for the dose of the test substances, on the basis of substances (BR and RA) having a therapeutic effect, in the in vivo experiment results through the administration of HA-RA nanoparticles, the best effect was shown in 15 mg/kg on the basis of RA, and by applying the same standard, 15 mg/kg was set on the basis of RA and BR.

The body weight and disease activation index (DAI) are shown in FIGS. 73 and 74. In body weight changes and DAI results, symptoms, such as bloody stool, were not observed in both the LMWC-BR and LMWC-RA administration groups, and thus there was no significant difference in efficacy therebetween, and the LMWC-RA of the present disclosure also showed an excellent antiinflammatory effect in the acute colitis models.

The colonic length is shown in FIGS. 75 and 76. There was no significant difference in efficacy with respect to the colonic length between the LMWC-BR and LMWC-RA administration groups, and thus the LMWC-RA of the present disclosure also showed an excellent antiinflammatory effect in the acute colitis models.

The spleen weight is shown in FIGS. 77 and 78. The inflammation of the large intestine occurring by DSS intake causes the infiltration of immune cells in the spleen and the arrival of inflammatory cytokines from the intestine to the spleen, thereby increasing the size of the spleen. However, it was verified that in the LMWC-RA administration group of the present disclosure, the spleen weight was similar to that of normal mice, indicating that the delivery of inflammation to the spleen did not occur due to excellent antiinflammatory effect, and these results are interpreted to show the potential to inhibit the systemic inflammation as well as spleen inflammation.

What is claimed is:

1. A method for treating inflammatory disease, comprising administering a pharmaceutical composition to a subject in need thereof,
wherein the inflammatory disease is inflammatory bowel disease (IBD) or colitis,
wherein the pharmaceutical composition comprises microparticles comprising a rosmarinic acid derivative and a pharmaceutically acceptable carrier,
wherein the rosmarinic acid derivative is represented by the following chemical formula:

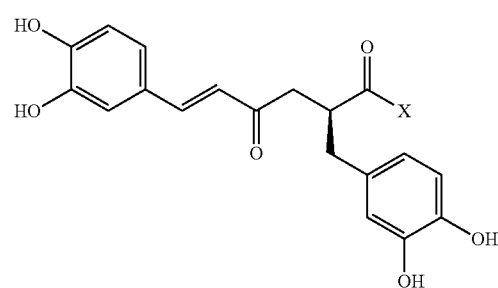

wherein —X is a (Y—Z), and
i) —Y— is —NH—, and —Z is methoxy polyethyleneglycol (mPEG) residue,
ii) —Y is —NH—, and —Z is hyaluronic acid residue, or
iii) —Y— is —NH—, and —Z is chitosan residue.

2. The method of claim 1, wherein the mPEG of has a molecular weight of about 2 kDa, wherein the chitosan has a molecular weight of 3 to 10 kDa, and wherein the hyaluronic acid has a molecular weight of 30 to 100 kDa.

* * * * *